(12) United States Patent
Notaro et al.

(10) Patent No.: US 7,351,020 B1
(45) Date of Patent: Apr. 1, 2008

(54) HIGH SECURITY FASTENER CONSTRUCTIONS

(75) Inventors: David F. Notaro, Amherst, NY (US); Adam W. Schreckengost, Hamburg, NY (US)

(73) Assignee: McGard, LLC, Orchard Park, NY (US)

( * ) Notice: Subject to any disclaimer, the term of this patent is extended or adjusted under 35 U.S.C. 154(b) by 0 days.

(21) Appl. No.: 10/818,705

(22) Filed: Apr. 6, 2004

Related U.S. Application Data

(63) Continuation-in-part of application No. 10/087,616, filed on Mar. 1, 2002, now Pat. No. 6,719,511.

(51) Int. Cl.
*F16B 37/14* (2006.01)
*F16B 23/00* (2006.01)

(52) U.S. Cl. .................... 411/430; 411/910
(58) Field of Classification Search ............ 411/430, 411/910, 402, 403, 375
See application file for complete search history.

(56) References Cited

U.S. PATENT DOCUMENTS

| | | | |
|---|---|---|---|
| 3,241,408 A | 3/1966 | McCauley | |
| 3,519,979 A * | 7/1970 | Bodenstein | 439/133 |
| 4,618,299 A | 10/1986 | Bainbridge et al. | 411/374 |
| 4,726,723 A | 2/1988 | Bainbridge | 411/432 |
| 4,897,008 A | 1/1990 | Parks | 411/432 |
| 5,112,176 A | 5/1992 | McCauley et al. | 411/432 |
| 5,360,304 A | 11/1994 | Notaro et al. | 411/432 |
| 5,730,567 A | 3/1998 | Haseley et al. | 411/403 |
| 5,730,568 A * | 3/1998 | Lanham et al. | 411/432 |
| 5,791,848 A * | 8/1998 | Lanham | 411/373 |
| 6,036,419 A | 3/2000 | Lanham et al. | 411/405 |
| 6,062,787 A * | 5/2000 | Maddalena | 411/429 |
| 6,092,968 A | 7/2000 | Lanham et al. | 411/431 |
| 6,571,588 B1 * | 6/2003 | Yuen | 70/233 |

* cited by examiner

*Primary Examiner*—Flemming Saether
(74) *Attorney, Agent, or Firm*—Walter W. Duft

(57) ABSTRACT

A series of high security fastener constructions feature rotatable anti-theft shrouds mounted on locking wheel nuts and wheel bolts designed for vehicular wheels. Each construction features (1) a fastener body having a first body end adapted to accommodate a key receiving pattern or member, a second body end having thread pattern extending therefrom, and a shroud receiving portion located between the first and second body ends, (2) a shroud concentrically mounted on the shroud receiving, and (3) a shroud retaining system for retaining the shroud for rotation relative to the fastener body such that the shroud will rotate under an applied torque prior to the fastener rotating when it is installed at a design installation torque. Exemplary shroud retaining systems include (1) designs in which the shroud is retained by interference engagement of its inner side with the fastener body, (2) designs in which the shroud is retained by staking or swaging to the fastener body, and (3) designs in which the shroud is retained by first and second retaining members that are mounted on the fastener body in facing relationship with first and second annular faces of the shroud.

30 Claims, 39 Drawing Sheets

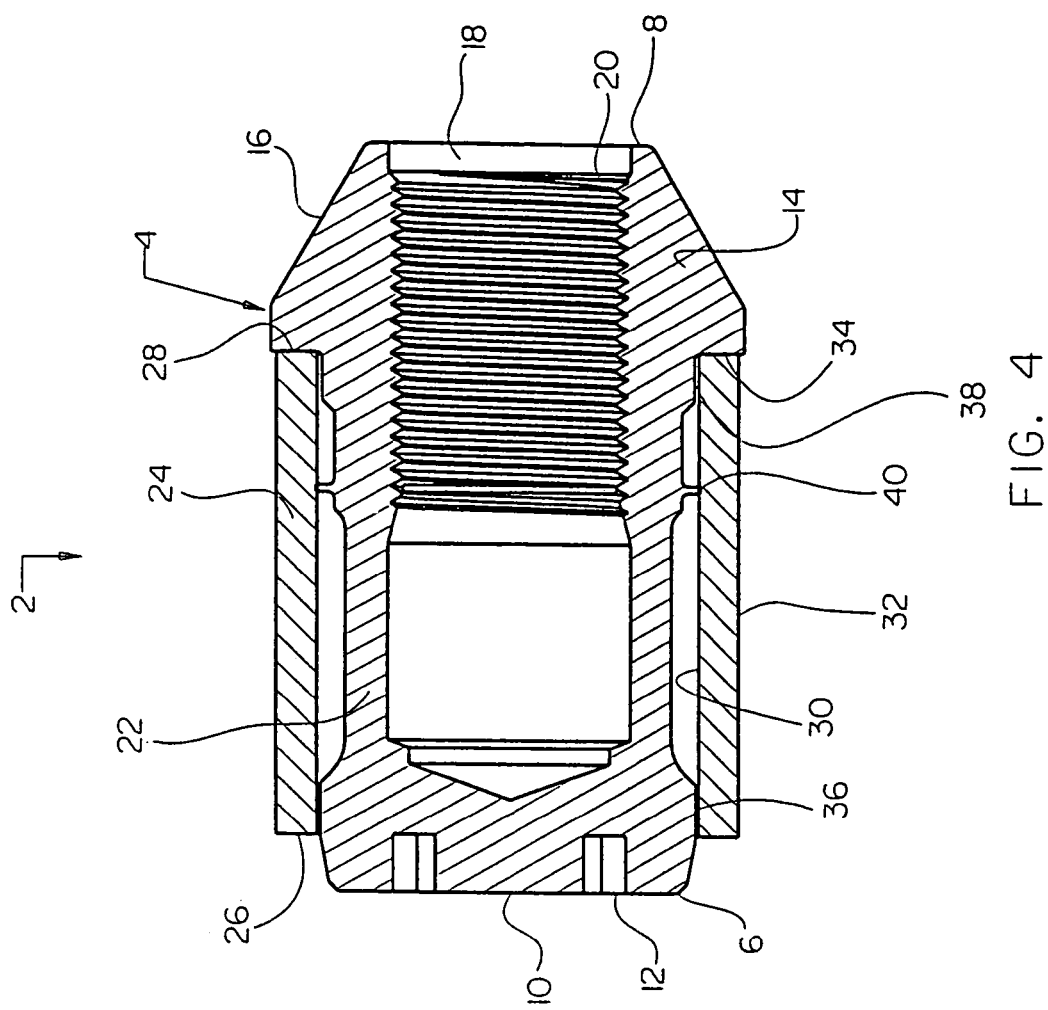
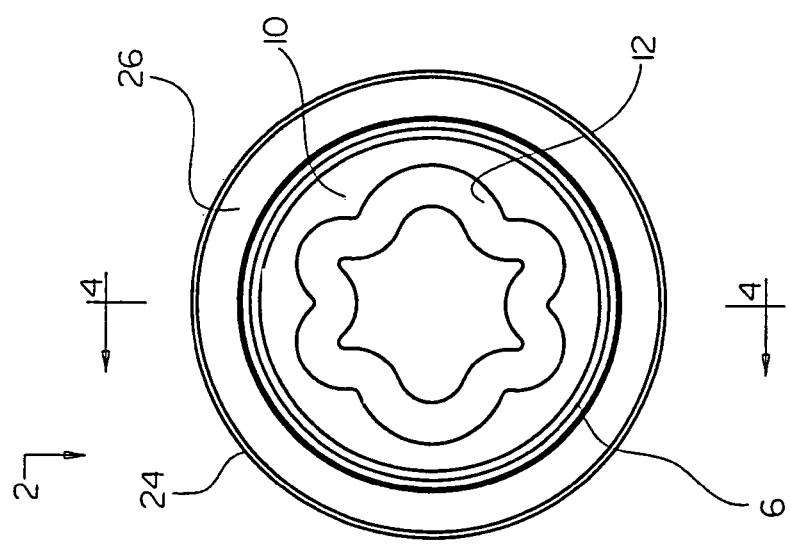
FIG. 4
FIG. 3

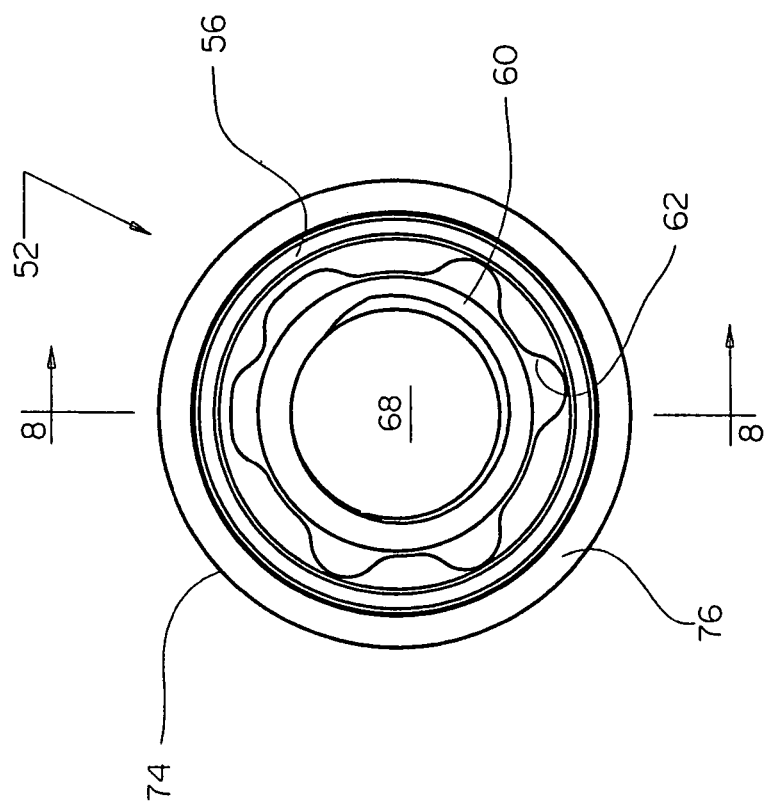
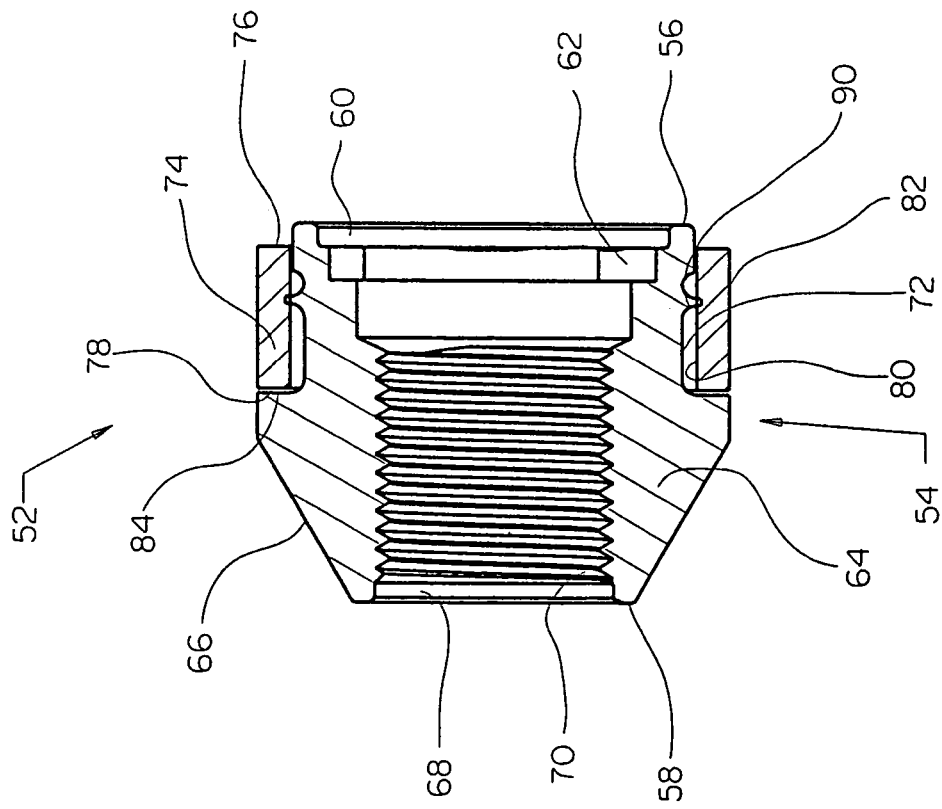
FIG. 7
FIG. 8

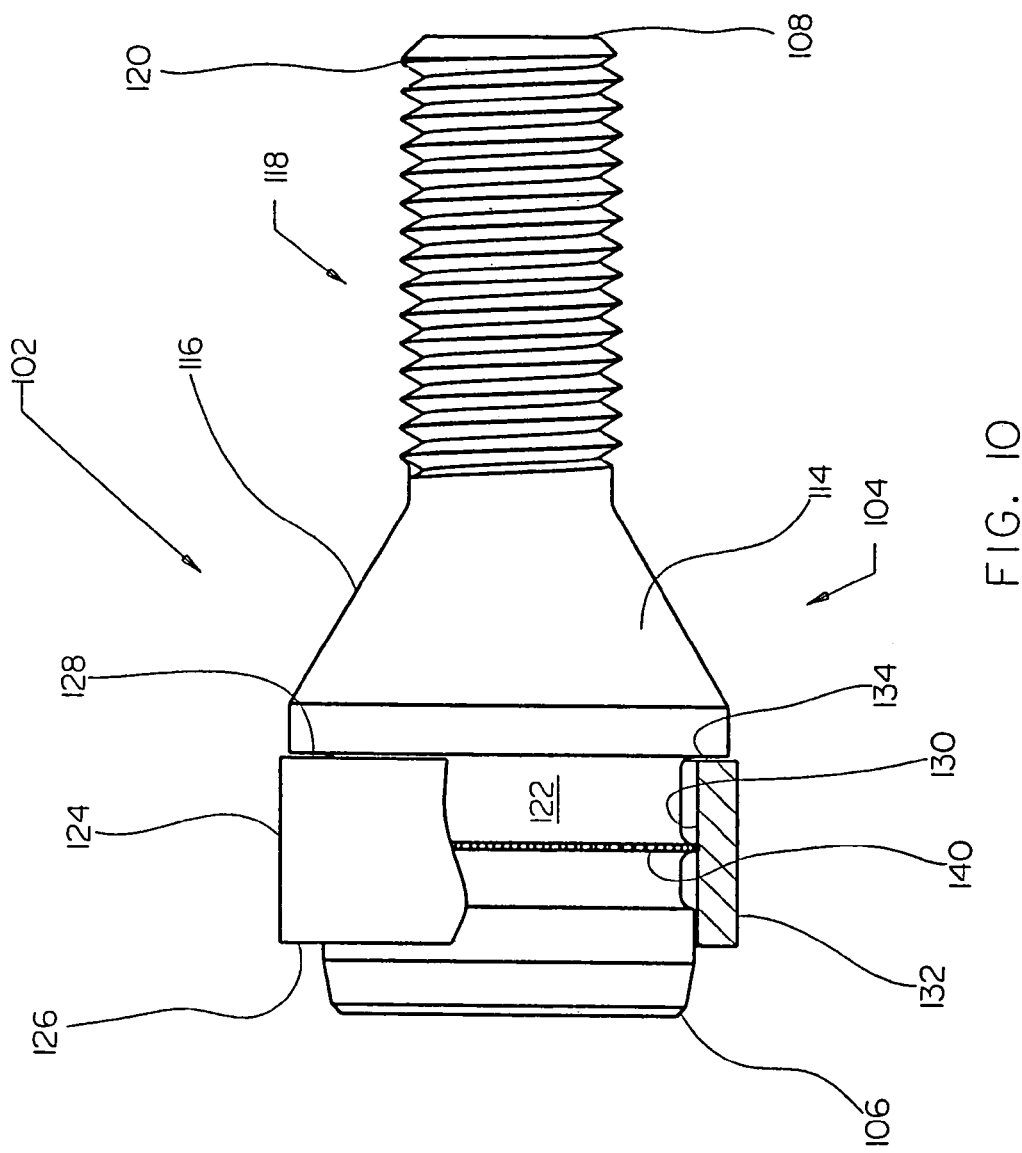
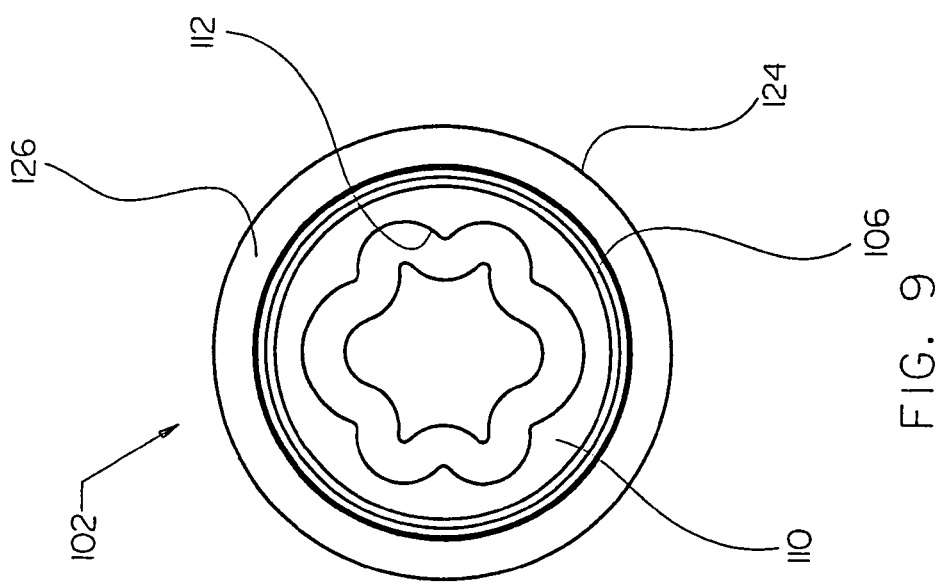
FIG. 10
FIG. 9

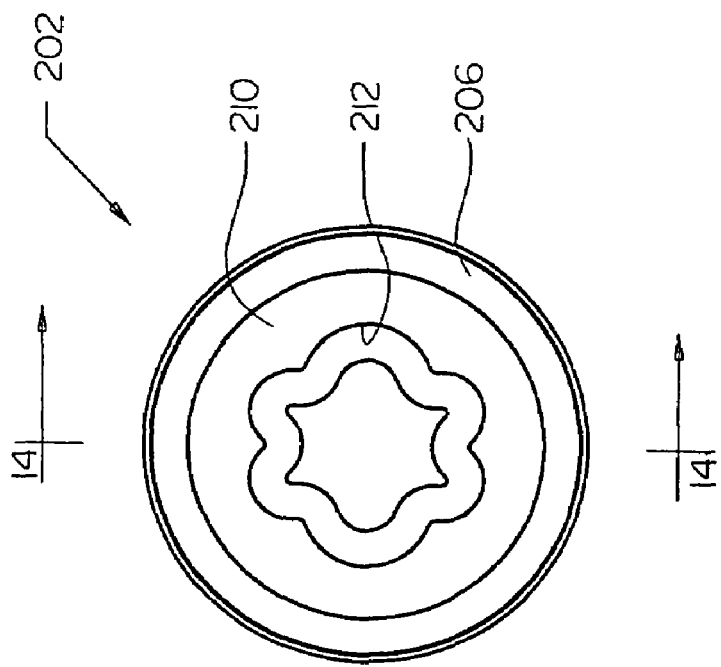
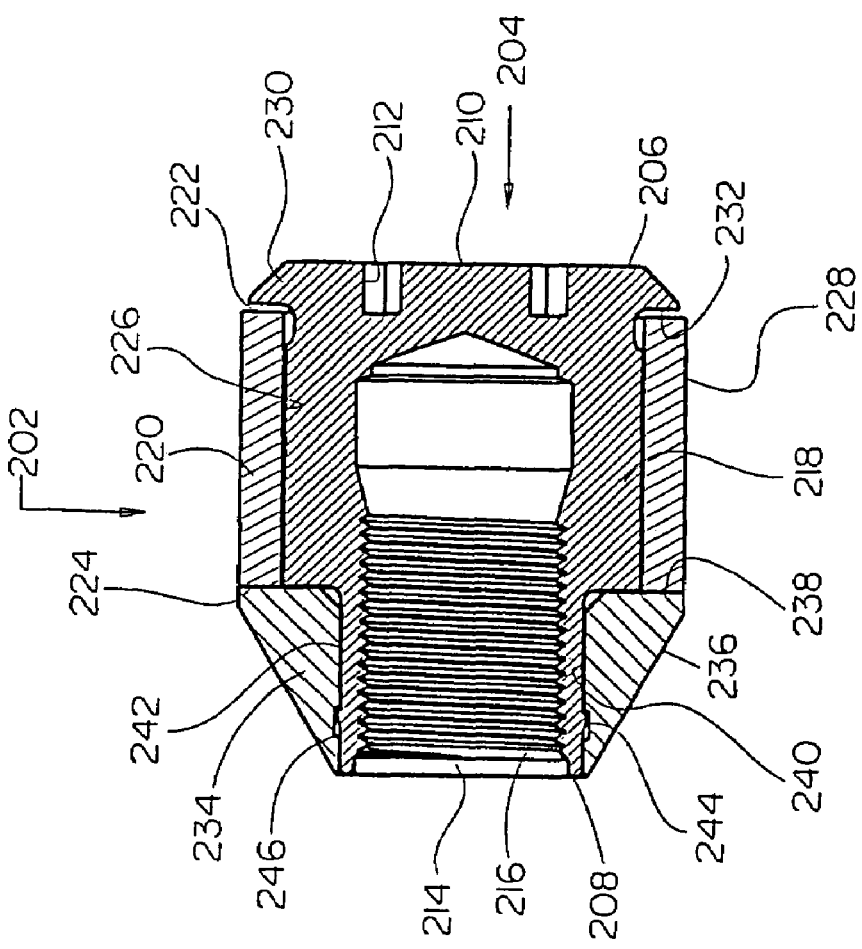

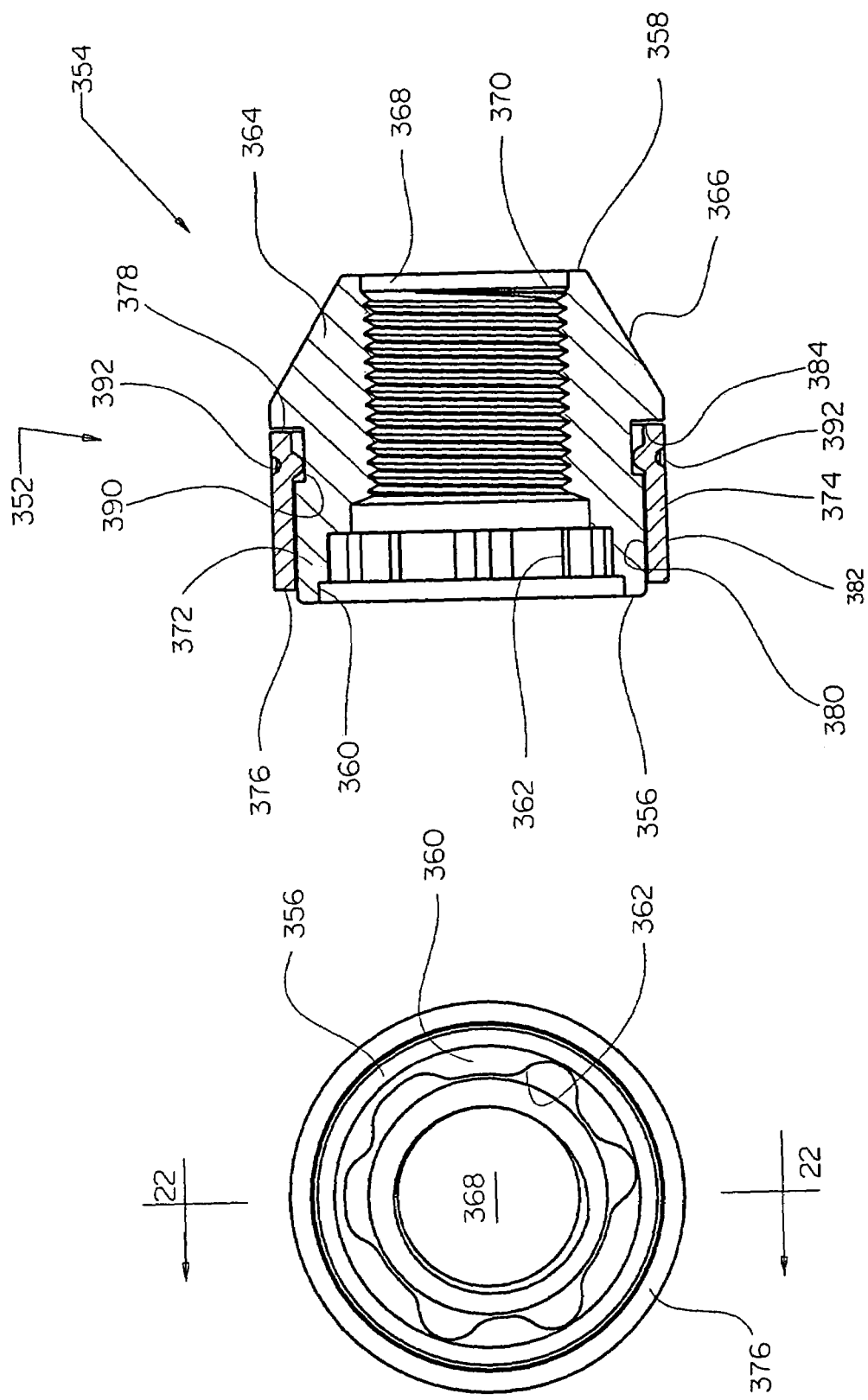

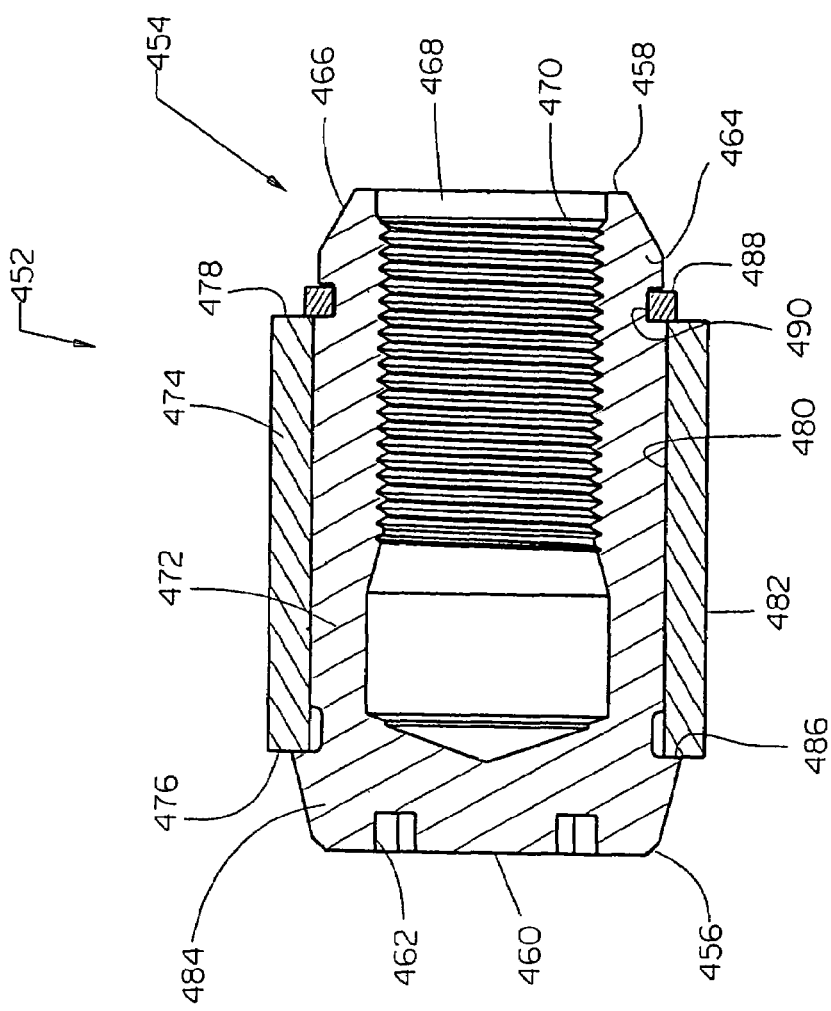
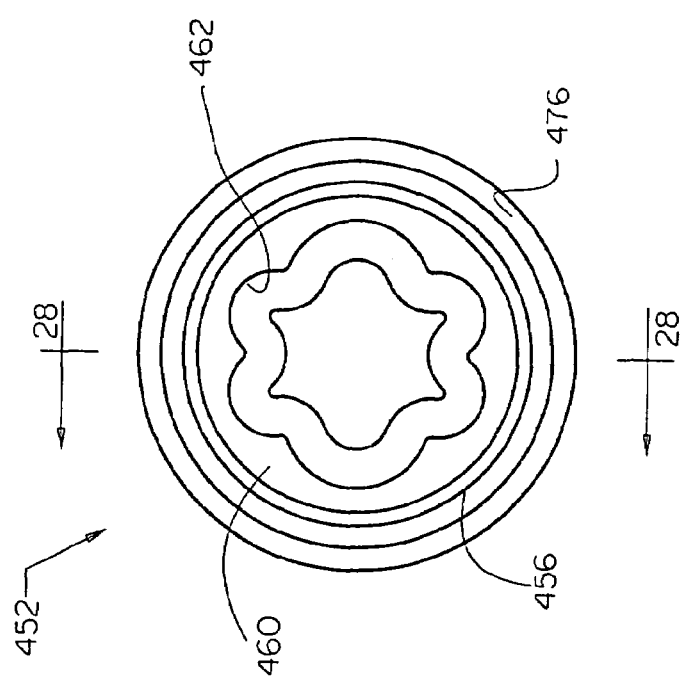
FIG. 28
FIG. 27

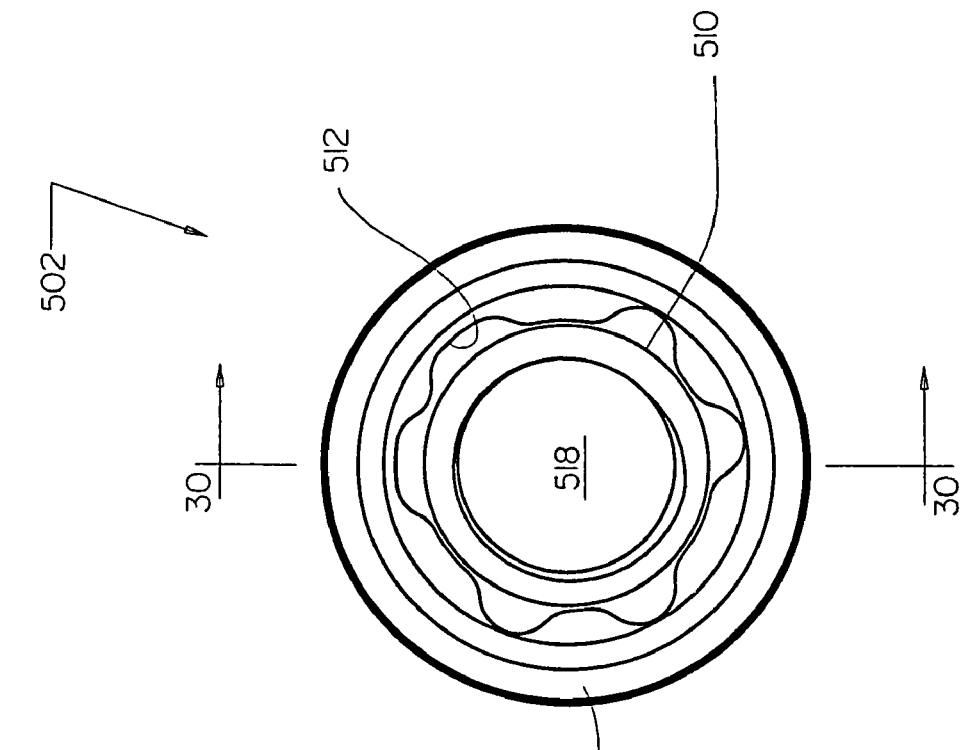
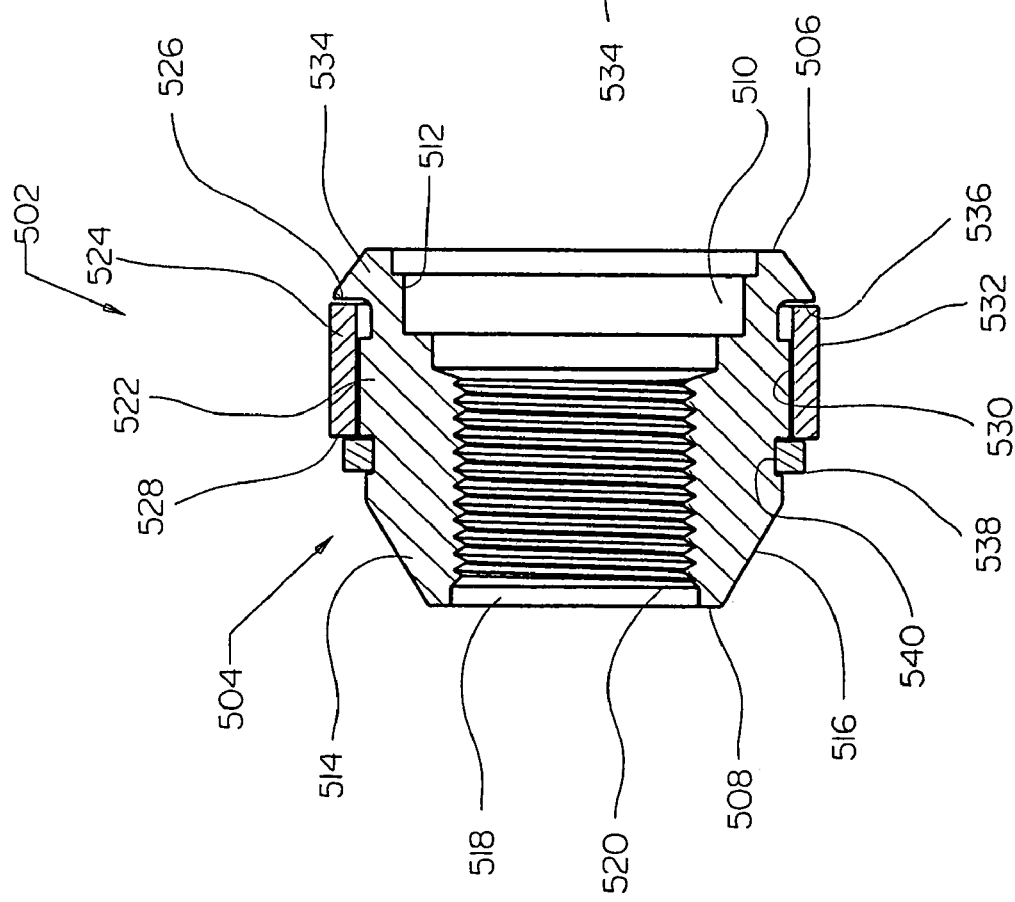
FIG. 29
FIG. 30

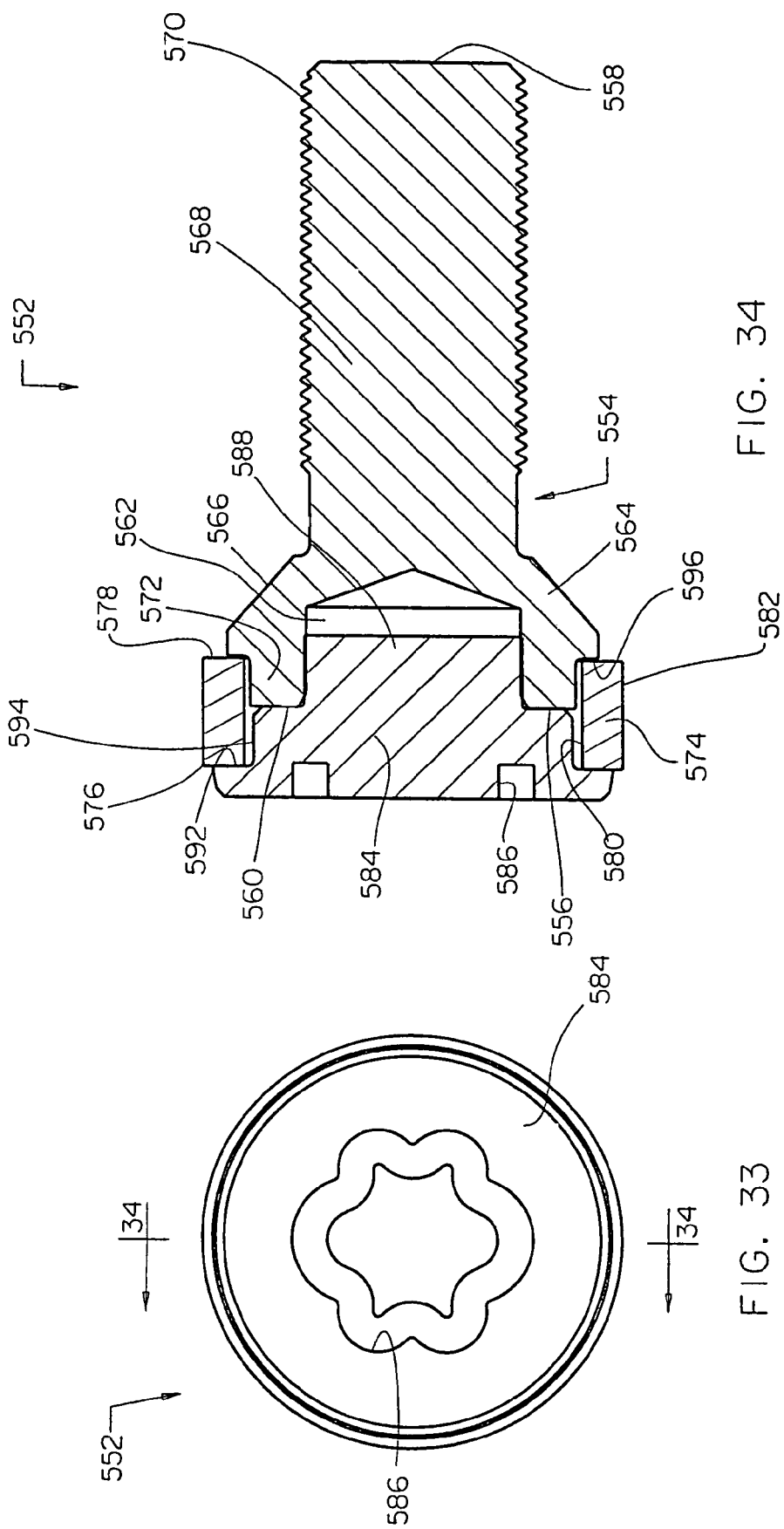

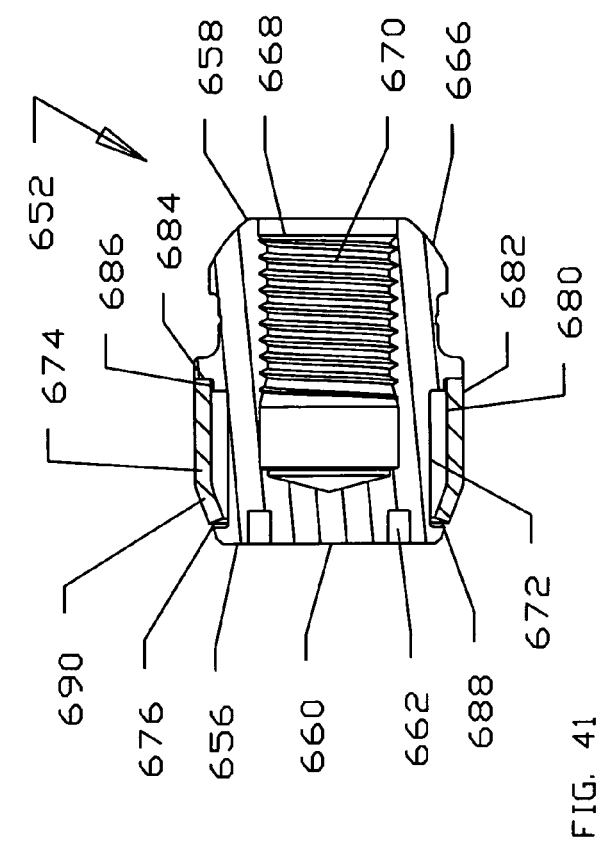
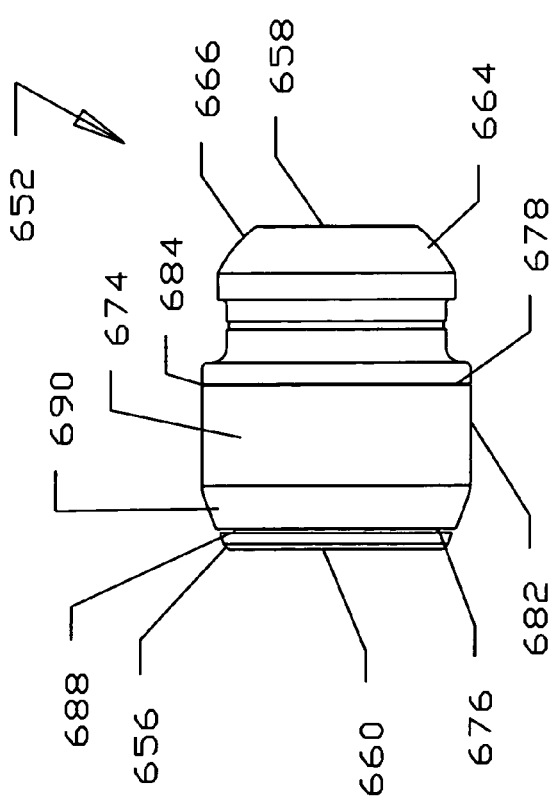

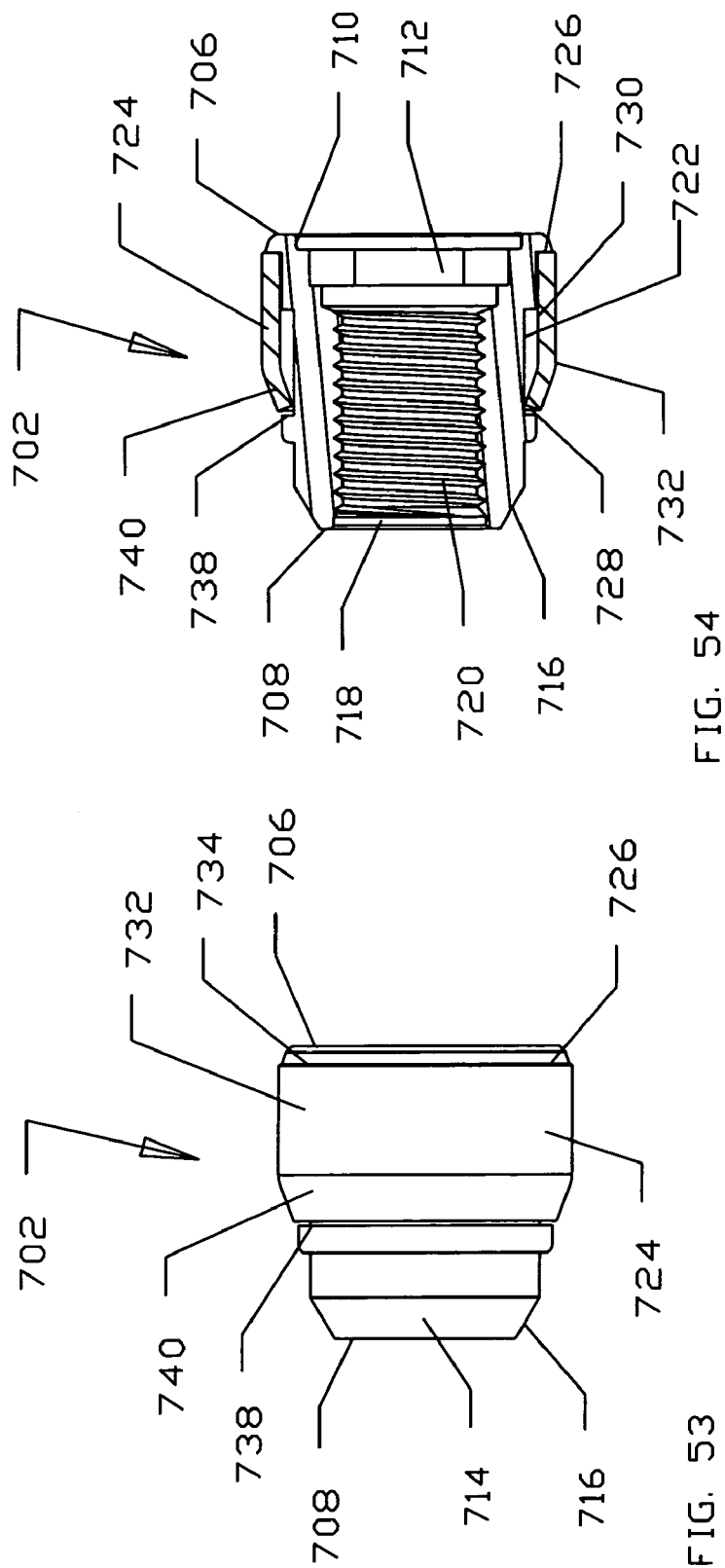

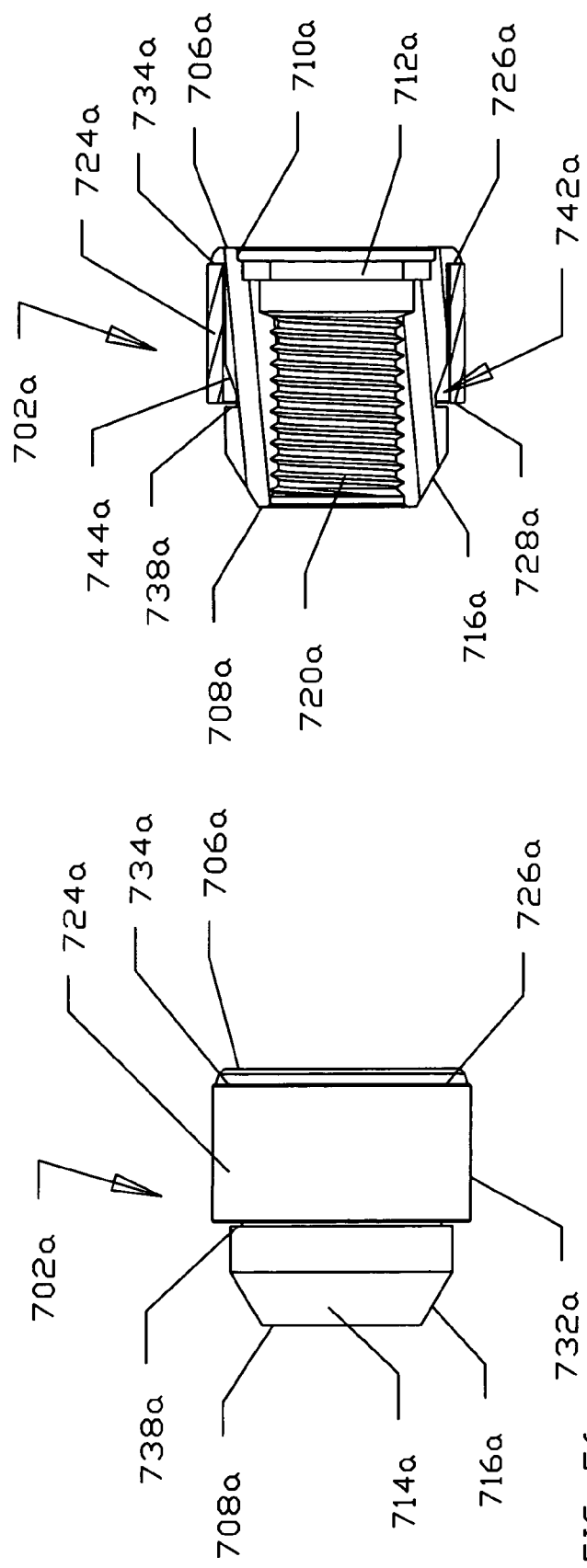

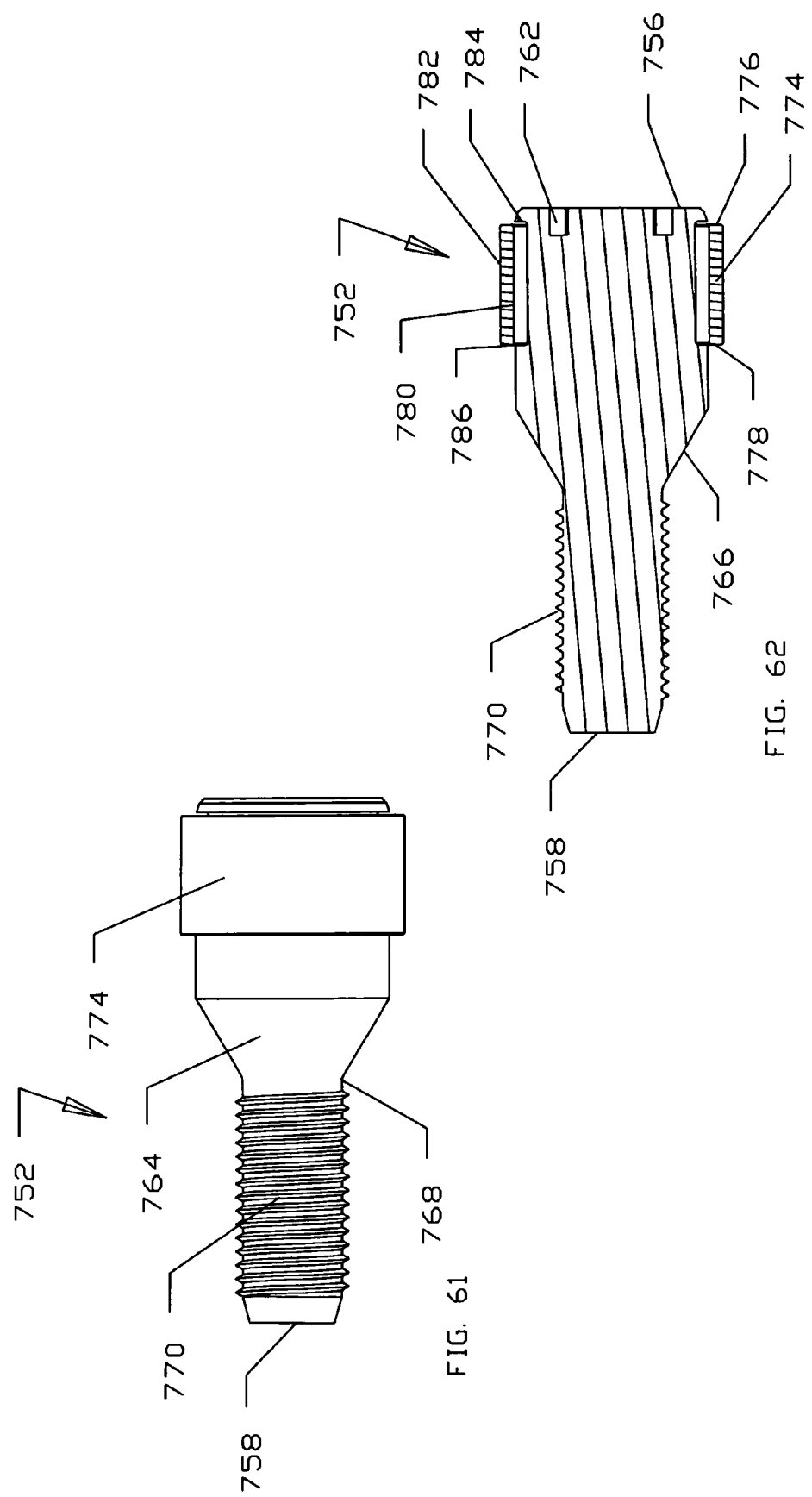

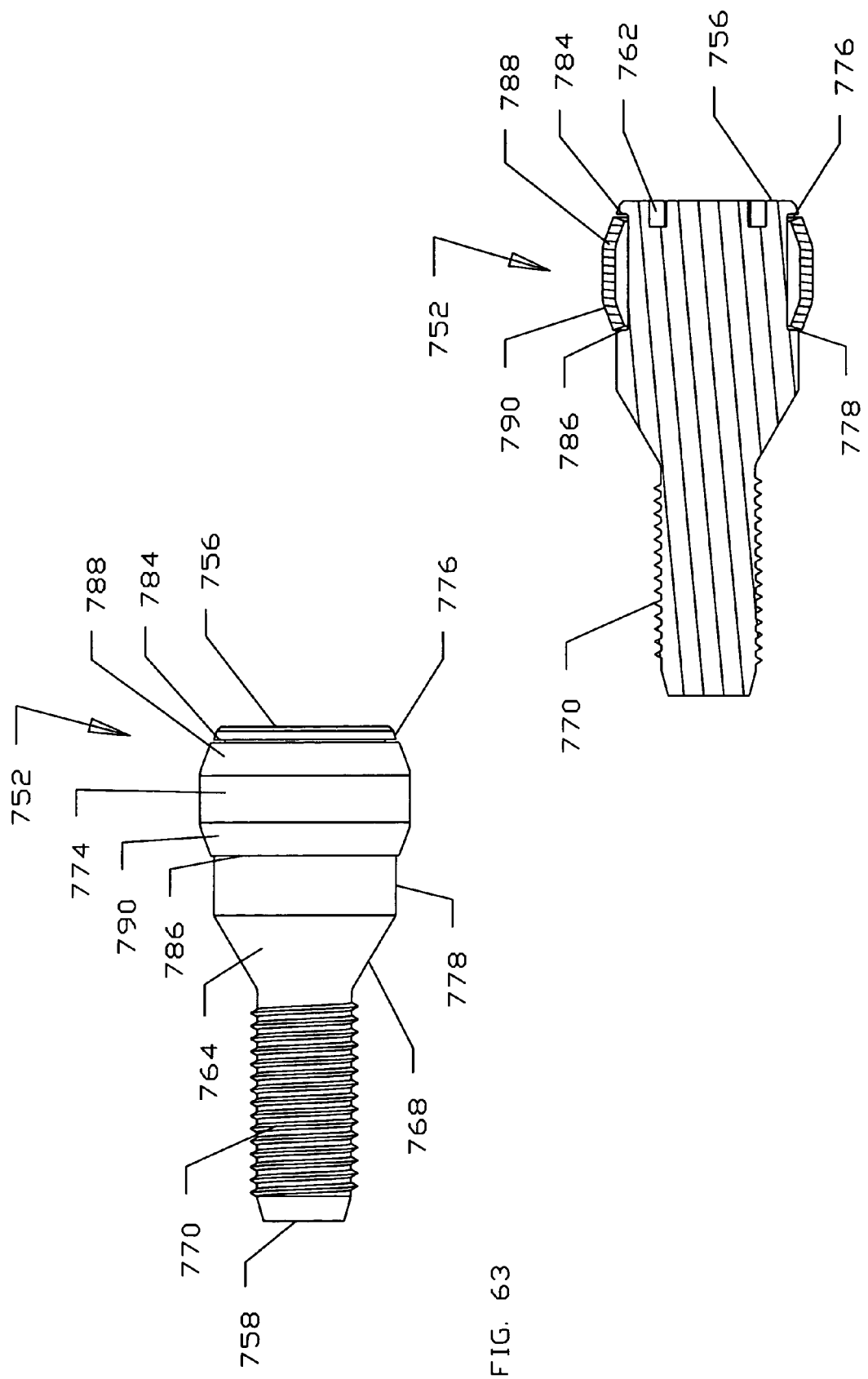

HIGH SECURITY FASTENER CONSTRUCTIONS

CROSS-REFERENCE TO RELATED APPLICATIONS

This application is a continuation-in-part of application Ser. No. 10/087,616, entitled "High Security Fastener Constructions," filed on Mar. 1, 2002 now U.S. Pat. No. 6,719,511.

STATEMENT REGARDING FEDERALLY SPONSORED RESEARCH OR DEVELOPMENT

Not Applicable

BACKGROUND OF THE INVENTION

1. Field of the Invention

The present invention relates to high security (anti-theft) constructions for fasteners, and particularly locking wheel nuts and wheel bolts used to secure vehicular wheels.

2. Description of the Prior Art

By way of background, locking wheel nuts and wheel bolts are commonly used to attach wheels to axle hub assemblies of automobiles and other vehicles. These fasteners are designed with security features that are intended to thwart theft by rendering the fasteners difficult to remove with conventional tools. In particular, the fasteners do not have the usual hexagonal head pattern found on conventional nuts and bolts, and instead have smooth cylindrical sidewalls that cannot be gripped by standard wrenches. Fastener removal requires the use of a special security tool having a unique key pattern that matches a corresponding groove pattern formed in the fastener end face.

Additional security can be obtained by fitting a free-spinning shroud over the security fastener's cylindrical sidewalls, such that the shroud is in concentric relationship therewith. The shroud discourages the use of theft devices that could otherwise be used to grip the sidewalls and remove the fastener without an authorized security tool. Because the shroud substantially surrounds all exposed surfaces of the sidewalls, no rotational purchase can be obtained on the fastener. The theft device can only engage the shroud, which freely spins under action of the theft device while the main body of the fastener remains stationary.

Commonly assigned U.S. Pat. Nos. 4,618,299, 4,726,723, 4,897,008, 5,112,176, 5,360,304, and 5,730,567 are directed to shrouded fastener designs of the foregoing type. The patented designs feature shrouds of various shape and size for both locking wheel nuts and wheel bolts. It is to such security fasteners that the present invention is directed. In particular, the present invention offers alternative security fastener constructions in which security shrouds are combined with locking wheel nuts and wheel bolts in a manner that minimizes design complexity and manufacturing expense while maintaining the requisite anti-theft characteristics.

BRIEF SUMMARY OF THE INVENTION

The foregoing goals are achieved and an advance in the art is provided by a series of high security fastener constructions featuring rotatable anti-theft shrouds mounted on locking wheel nuts and wheel bolts designed for vehicular wheels. Each construction features (1) a fastener body having a first body end adapted to accommodate a key receiving pattern or member, a second body end having a thread pattern extending therefrom, and a shroud receiving portion located between the first and second body ends, (2) a shroud concentrically mounted on the shroud receiving portion, and (3) a shroud retaining system retaining the shroud for rotation relative to the fastener body such that the shroud will rotate under an applied torque prior to the fastener rotating when it is installed at a design installation torque.

In a first exemplary fastener construction, the shroud retaining system includes a shroud securement structure formed on the fastener's shroud receiving portion. The shroud securement structure is adapted to axially secure the shroud on the body via radial engagement therewith. In particular, the shroud securement structure has a radial face configured to radially engage the shroud in interfering relationship to form a radial interference connection. The radial interference connection provides an engagement torque that is less than a design installation torque of the fastener. Thus, when the fastener is secured in engagement with an external structure at the design installation torque, the shroud will rotate before the fastener rotates.

In a second exemplary fastener construction, the shroud retaining system includes first and second shroud retaining members respectively disposed in facing relationship with first and second annular faces of the shroud. The first shroud retaining member is preferably integrally formed as part of the fastener body. The second shroud retaining member is implemented as a discrete seat member having a suitably shaped exterior face that provides a mounting seat for the fastener.

In a third exemplary fastener construction, the shroud retaining system includes a staking region formed on the fastener's shroud receiving portion to allow staking of the shroud to the fastener body. The shroud is staked at the staking region to retain the shroud in rotatable relationship with the fastener body.

In a fourth exemplary fastener construction, the shroud retaining system includes first and second shroud retaining members respectively disposed in facing relationship with first and second annular faces of the shroud. The first shroud retaining member is preferably integrally formed as part of the fastener body. The second shroud retaining member is formed as a retaining ring retained on the fastener body.

In a fifth exemplary fastener construction, the shroud retaining system includes first and second shroud retaining members respectively disposed in facing relationship with first and second annular faces of the shroud. The first shroud retaining member is a discrete key receiving member mounted on the fastener body and having a key receiving pattern formed therein. The second shroud retaining member is preferably integrally formed as part of the fastener body.

In a sixth exemplary fastener construction, the shroud retaining system includes one or more swaging regions formed on the fastener's shroud receiving portion to allow swaging of the shroud to the fastener body. The shroud is swaged at the swaging region(s) to retain the shroud in rotatable relationship with the fastener body.

In each of the foregoing fastener constructions, the shroud can be formed as a substantially tubular member in order to simplify the fastener's construction and reduce manufacturing costs. Shrouds of other shape are not necessarily precluded, however, and it should be understood that a variety of shroud configurations may be used in the various fastener constructions of the invention.

BRIEF DESCRIPTION OF THE SEVERAL VIEWS OF THE DRAWINGS

The foregoing and other features and advantages of the present invention will be apparent from the following more particular description of the preferred embodiments of the invention, as illustrated in the accompanying Drawings, in which:

FIG. 3 is an end view of the fastener of FIG. 1;

FIG. 4 is a cross-sectional view taken along line 4-4 in FIG. 3;

FIG. 7 is an end view of a fastener according to a modification of the first high security fastener construction of FIG. 1;

FIG. 8 is a cross-sectional view taken along line 8-8 in FIG. 7;

FIG. 9 is an end view of a fastener according to another modification of the first high security fastener construction of FIG. 1;

FIG. 10 is a partial sectional view of the fastener of FIG. 9;

FIG. 13 is an end view of the fastener of FIG. 11;

FIG. 14 is a cross-sectional view taken along line 14-14 in FIG. 13;

FIG. 21 is an end view of a fastener according to a modification of the high security fastener construction of FIG. 17;

FIG. 22 is a cross-sectional view taken along line 22-22 in FIG. 21;

FIG. 27 is an end view of the fastener of FIG. 25;

FIG. 28 is a cross-sectional view taken along line 28-28 in FIG. 27;

FIG. 29 is an end view of a fastener according to a modification of the high security fastener construction of FIG. 25;

FIG. 30 is a cross-sectional view taken along line 30-30 in FIG. 29;

FIG. 33 is an end view of the fastener of FIG. 31;

FIG. 34 is a cross-sectional view taken along line 34-34 in FIG. 33;

FIG. 40 is a side view of the fastener of FIG. 37 following continuous circumferential swaging of the fastener's shroud;

FIG. 41 is a longitudinal cross-sectional view taken along the centerline of the fastener as shown in FIG. 40;

FIG. 53 is a side view of the fastener of FIG. 51 following continuous circumferential swaging of the fastener's shroud;

FIG. 54 is a longitudinal cross-sectional view taken along the centerline of the fastener as shown in FIG. 53;

FIG. 56 is a side view of the fastener of FIG. 55 prior to swaging of the fastener's shroud;

FIG. 57 is a longitudinal cross-sectional view taken along the centerline of the fastener of FIG. 56;

FIG. 61 is a side view of the fastener of FIG. 60 prior to swaging of the fastener's shroud;

FIG. 62 is a longitudinal cross-sectional view taken along the centerline of the fastener of FIG. 61;

FIG. 63 is a side view of the fastener of FIG. 61 following continuous circumferential swaging of the fastener's shroud; and FIG. 64 is a longitudinal cross-sectional view taken along the centerline of the fastener as shown in FIG. 56.

DETAILED DESCRIPTION OF THE INVENTION

Figure 1:
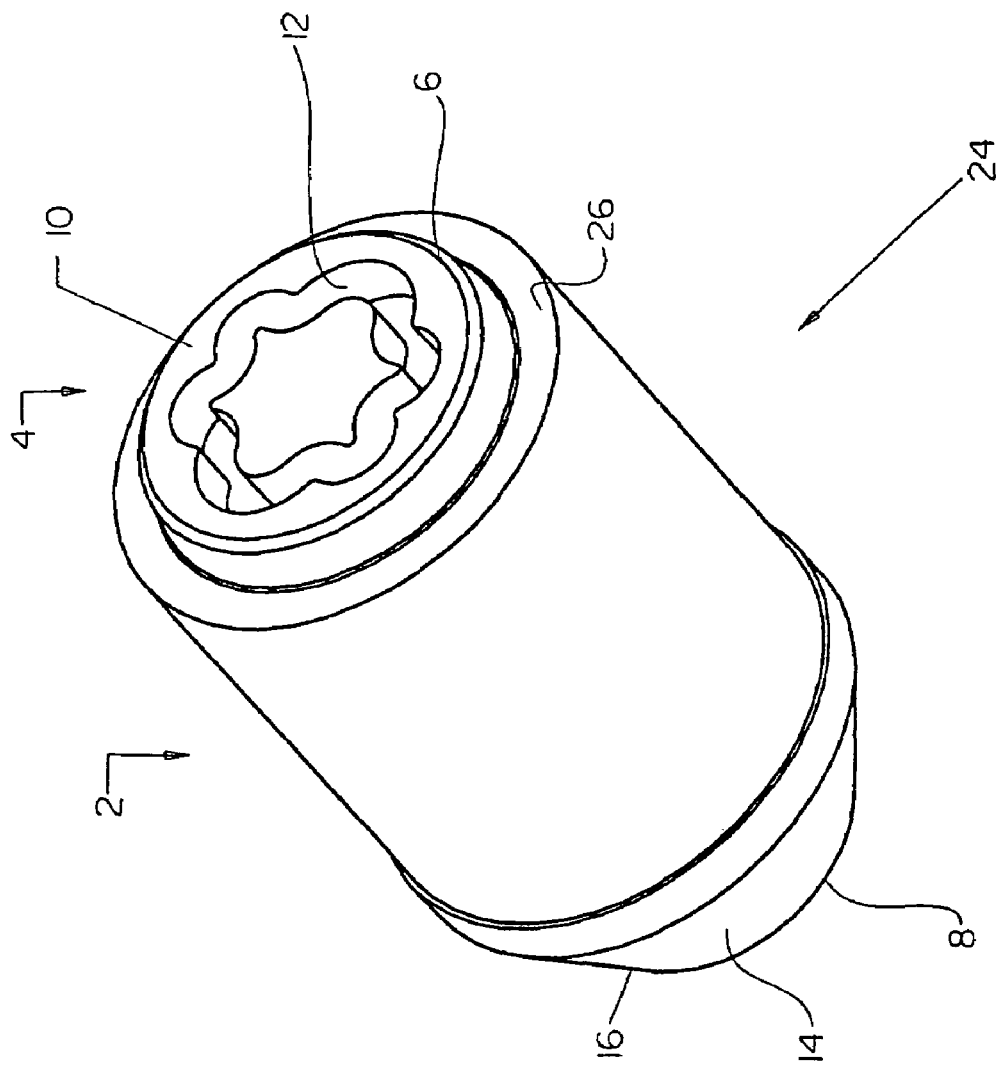
FIG. 1 is a perspective view of a first high security fastener construction in accordance with the invention.
Figure 2:
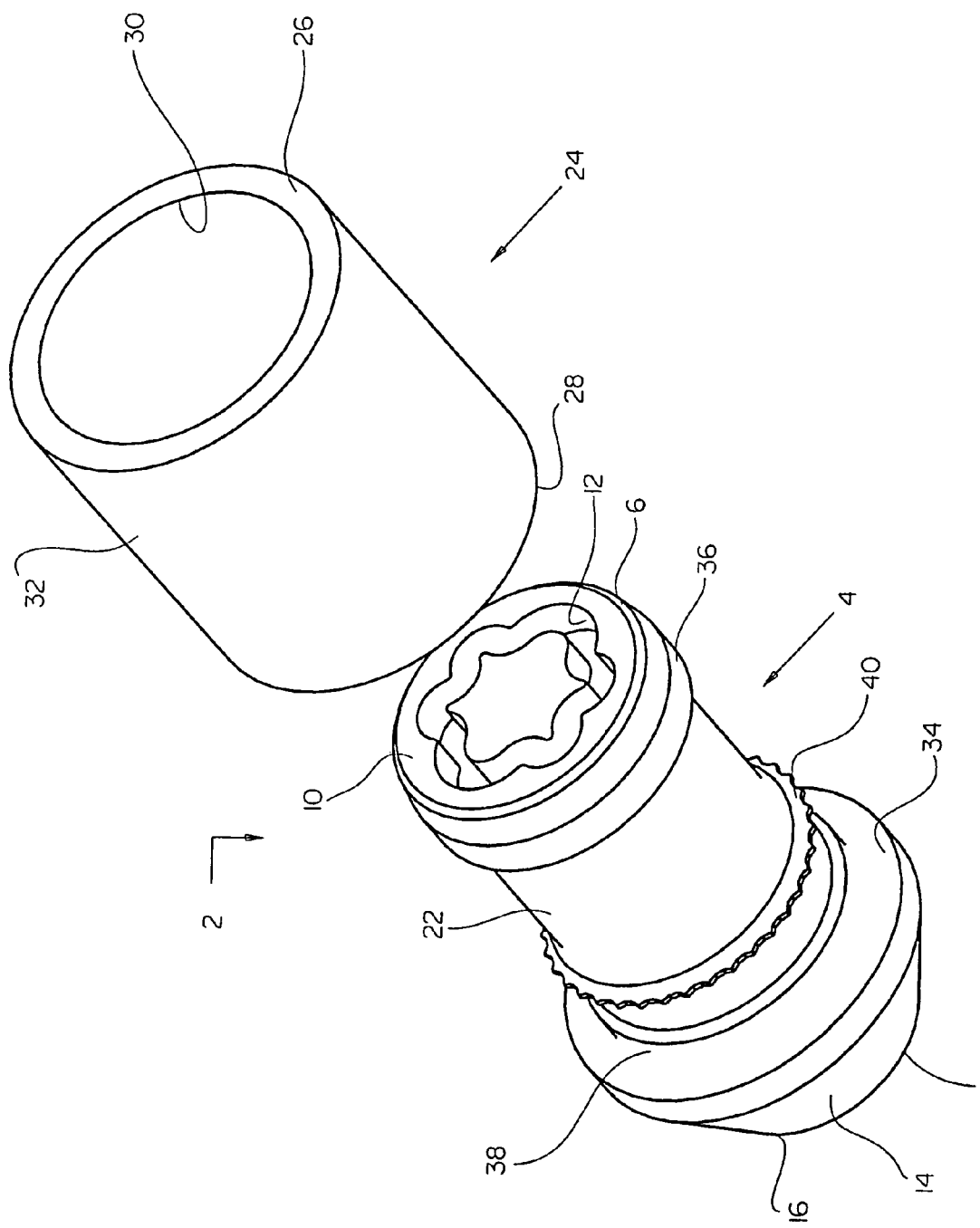
FIG. 2 is an exploded perspective view of the fastener of FIG. 1.

With reference now to the above-identified Drawings, wherein like reference numbers designate like elements in all of the several views, embodiments of the invention will now be presented by way of six exemplary high security fastener constructions representing preferred implementations of the inventive subject matter. The six exemplary constructions are respectively shown in FIGS. 1-10, 11-16, 17-24, 25-30, 31-36 and 37-64. Unless otherwise indicated, all components used in the disclosed fastener constructions are fabricated from steel, titanium, high-strength aluminum or other durable suitable materials for automotive and vehicular use. Coatings of Nickel/Chrome or the like may also be used according to conventional practice. It should also be understood that the various shroud structures described hereinafter could be made from alternative materials such as durable plastic, brass, etc., provided such materials can maintain fastener security.

I. First Exemplary Fastener Construction

A. Closed-End Locking Wheel Nut

Turning now to FIGS. 1-6, a fastener 2 according to a first exemplary fastener construction of the invention is configured as a closed-end locking wheel nut adapted to thread onto a threaded bolt shank extending from a vehicle hub or other wheel mounting structure. The fastener 2 includes a fastener body 4 having a first body end 6 and a second body end 8. The first body end 6 has a generally planar surface 10 in which is formed a continuous curvilinear key receiving pattern 12. The key receiving pattern 12 is configured to mate with a security key (not shown) of the usual type. As is well known in the art, the key can is used to turn the fastener 2 into and out of locking engagement in a vehicle wheel installation in which a vehicle wheel (not shown) is secured to a hub or other mounting structure (not shown).

The second body end 8 of the fastener 2 is formed with a mounting seat 14 having a generally frustoconical outer surface 16 (other shapes could also be used). The mounting seat 14 functions to seat the fastener 2 in a mating counterbore (not shown) formed around a bolt hole in the rim of a wheel to be fastened. As is well known in the art, the frustoconical surface 16 frictionally engages the mating counterbore when the fastener 2 is secured. This seats the fastener 2 and helps to develop the required installation torque needed to properly secure the wheel. This required torque shall be referred to hereinafter as the fastener's design installation torque.

As best shown in FIG. 4, an internal bore 18 is formed within the fastener body 4 along its axial centerline. The bore 18 extends from the second body end 8 toward the first body end 6 a sufficient distance to accommodate the bolt shank on which the fastener 2 is to be mounted. An internal thread pattern 20 is formed on the wall of the bore 18. The thread pattern 20 begins at the second body end 8 and extends for part (or all) of the length of the bore 18.

A shroud receiving portion 22 of the fastener body 4 is situated between the first body end 6 and the second body end 8. More specifically, the shroud receiving portion 22 extends from a location proximate the first body end 6 to the mounting seat 14. The shroud receiving portion 22 is designed to receive a generally tubular anti-theft shroud 24 so that the shroud is concentrically mounted on the fastener body 4. The shroud 24 has first and second annular end faces 26 and 28, and inner and outer sidewalls 30 and 32. The first annular end face 26 is located proximate the first body end 6 so that very little of the first body end is exposed to tampering. The second annular end face 28 lies in facing (and preferably contacting) engagement with an annular shoulder 34 formed on the back side of the mounting seat 14. The inner sidewall 30 is concentrically supported on the shroud receiving portion 22 by a pair of radial seats 36 and 38. The radial seat 36 is located proximate the first body end 6 and the radial seat 38 is located proximate the annular shoulder 34.

Figure 6:
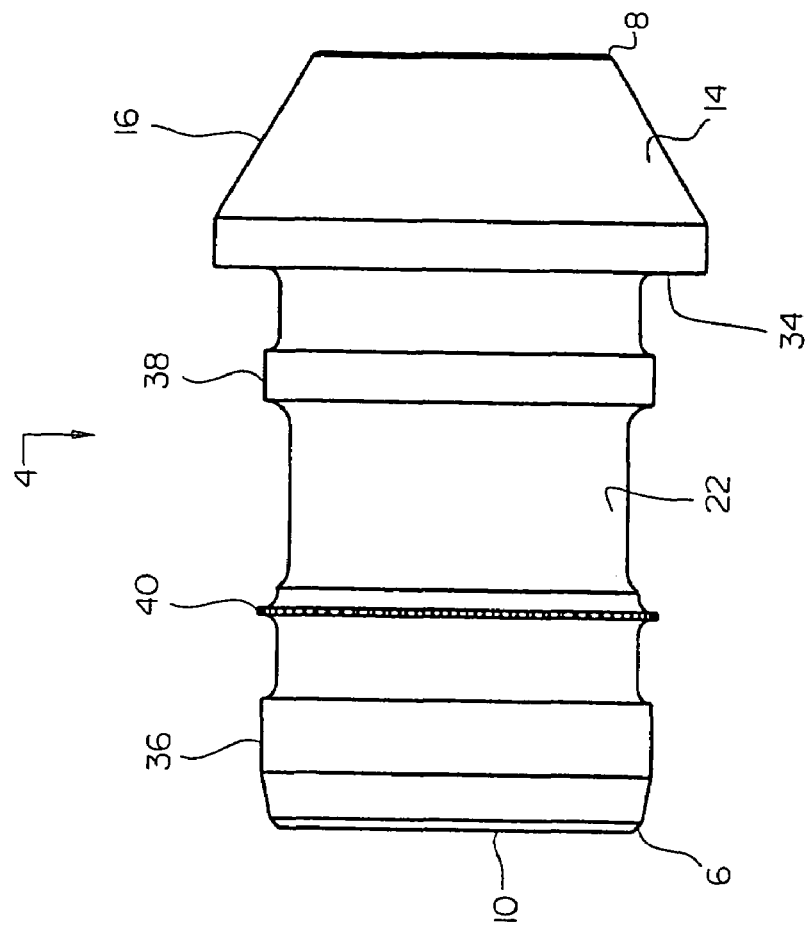
FIG. 6 is a side view of the fastener body portion of FIG. 5 and showing a shroud securement structure at a different location than in FIG. 1.
Figure 5:
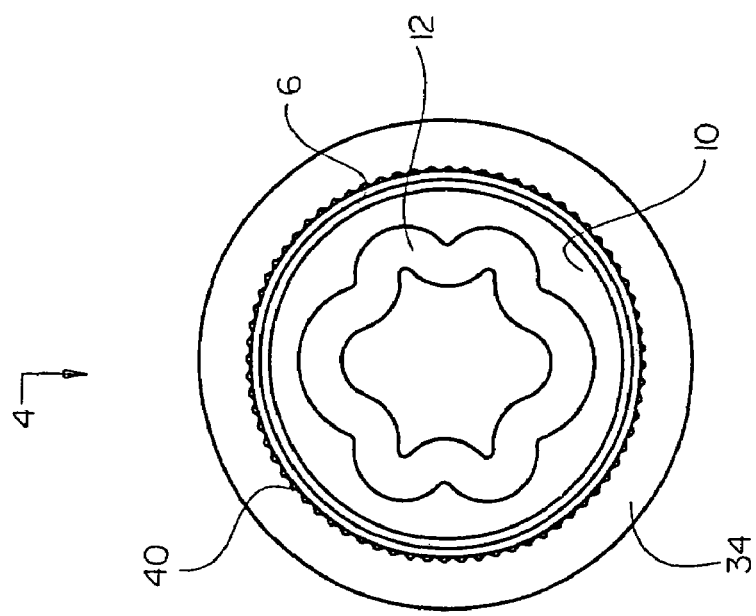
FIG. 5 is an end view of a fastener body portion that can be used in the fastener of FIG. 1.
Figure 11:
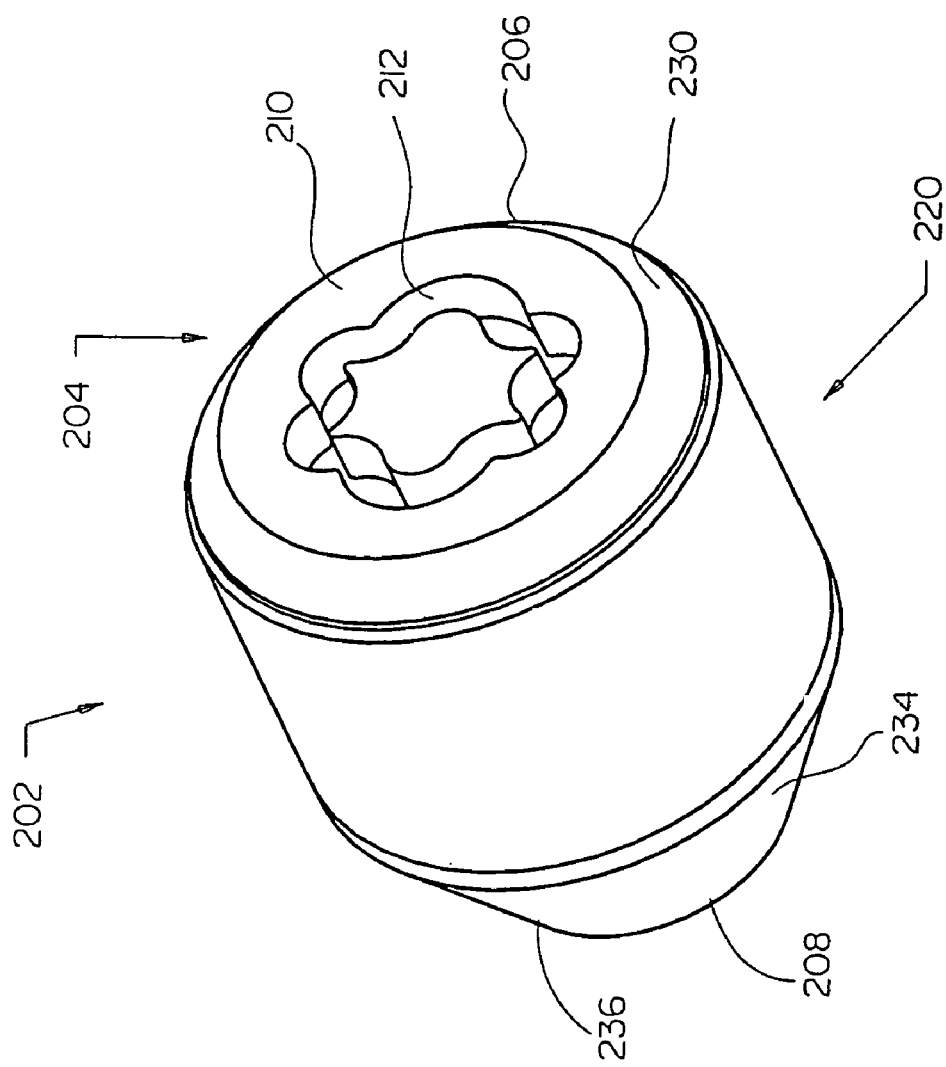
FIG. 11 is a perspective view of a second high security fastener construction in accordance with the invention.
Figure 12:
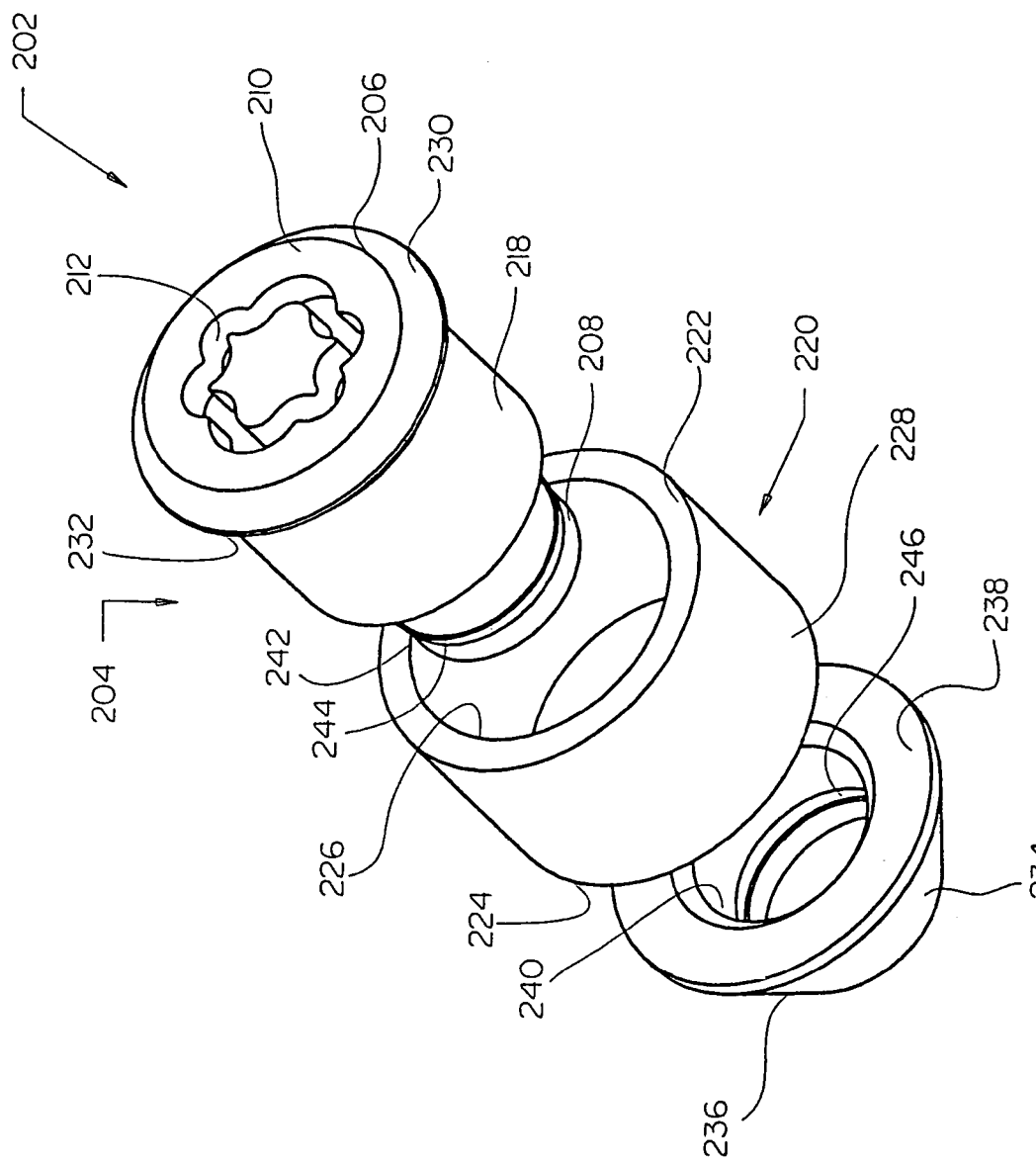
FIG. 12 is a an exploded perspective view of the fastener of FIG. 11.

A shroud retaining system is used to retain the shroud 24 for rotation relative to the fastener body 4 such that the shroud will rotate under an applied torque prior to the fastener 2 rotating when it is installed at the design installation torque. The shroud retaining system is provided by a shroud securement structure 40 formed on the fastener's shroud receiving portion 22. The shroud securement structure 40 is generally ring-shaped and has a knurled radial outer surface to facilitate gripping of the inner side wall 30 of the shroud 24. The purpose of the knurling is to engage the shroud 24 in an interference fit so as to axially retain the shroud on the fastener body 4 with sufficient force to prevent axial pull-off, yet allow the shroud to rotate under an applied torque in order to provide anti-theft properties. The shroud 24 is sized relative to the outside diameter of the knurling so as to be in radial interfering engagement with the shroud securement structure 40. A radial interference connection will thus be formed when the shroud is mounted on the fastener body 4, with the tips of the knurls being compressed by the shroud's inner sidewall 30. The radial interference connection is designed to provide an interference engagement torque that is less than the design installation torque of the fastener 2. Thus, when the fastener 2 is seated against a wheel at the design installation torque, the shroud 24 will rotate prior to the onset of rotation of the fastener so as to provide the required security function. Note that the design installation torque can vary from one fastener design to another. Thus, the design of the shroud securement structure 40 can likewise vary to achieve the desired interference engagement torque. This can be done by varying the size and shape of the individual knurls and indentations therebetween, as well as their spacing. Note that axially oriented splines could also be used in place of knurling, as could other surface texturing configurations that are capable of developing the required interference engagement torque and axial pull-off resistance. The location of the shroud securement structure 40 can also be varied, as illustrated in FIGS. 1 and 6 in which two alternative locations for the shroud securement structure are shown. The same holds true for the fastener designs of sections I.B and I.C below.

Advantageously, it will be seen that the fastener 2 requires only two components, the fastener body 4 and the shroud 24, to provide a fully functional high security fastener construction. It will additionally be seen that the shroud 24 can be formed as a simple tubular structure that requires no additional configuration features to facilitate its mounting on the fastener body 4.

B. Open-End Locking Wheel Nut

Turning now to FIGS. 7 and 8, a modification of the first exemplary fastener construction is shown in which a fastener 52 is configured as an open-end locking wheel nut. Apart from the fact that the fastener 52 is an open end design, it is similar in all respects to the fastener 2 of FIGS. 1-6. The fastener 52 thus includes a fastener body 54 having a first body end 56 and a second body end 58. The first body end 56 has a stepped opening 60 in which is formed a continuous curvilinear key receiving pattern 62. The second body end 58 is formed with a mounting seat 64 having a generally frustoconical outer surface 66 (other shapes could also be used). An internal bore 68 is formed within the fastener 52 along its axial centerline. The bore 68 extends from the second body end 58 toward the first body end 56. An internal thread pattern 70 is formed on the wall of the bore 68. The thread pattern 70 begins at the second body end 58 and extends for part (or all) of the length of the bore 68.

A shroud receiving portion 72 of the fastener body 54 is situated between the first body end 56 and the second body end 58. More specifically, the shroud receiving portion 72 extends from a location proximate the first body end 56 to the mounting seat 64. The shroud receiving portion 72 is designed to receive an anti-theft shroud 74 so that the shroud is concentrically mounted on the fastener body 54. The shroud 74 has first and second annular end faces 76 and 78, and inner and outer sidewalls 80 and 82. The first annular end face 76 is located proximate the body end 56 so that very little of the body end is exposed to tampering. The second annular end face 78 lies in facing (and preferably contacting) engagement with an annular shoulder 84 formed on the back side of the mounting seat 64.

A shroud retaining system is used to retain the shroud 74 for rotation relative to the fastener body 54. The shroud retaining system is provided by a shroud securement structure 90 formed on the fastener's shroud receiving portion 72. The shroud securement structure 90 is generally ring-shaped and has a textured (e.g., knurled, splined, etc.) radial outer surface to facilitate gripping of the inner side wall 80 of the shroud 74 and to provide the desired radial interference connection. Thus, when the fastener 52 is seated against a wheel at the design installation torque, the shroud 74 will rotate prior to the onset of rotation of the fastener so as to provide the required security function, and will also resist axial pull-off.

C. Locking Wheel Bolt

Turning now to FIGS. 9 and 10, another modification of the first exemplary fastener construction is shown in which a fastener 102 is configured as a locking wheel bolt. Apart from the fact that the fastener 102 has an externally threaded shank instead of an internally threaded bore, it is similar in all respects to the fastener 2 of FIGS. 1-6. The fastener 102 thus includes a fastener body 104 having a first body end 106 and a second body end 108. The first body end 106 has a generally planar surface 110 in which is formed a continuous curvilinear key receiving pattern 112. A mounting seat portion 114 of the fastener body 104 has a generally frustoconical outer surface 116 (other shapes could also be used). A bolt shank 118 extends from the mounting seat 114 to the second body end 108. An external thread pattern 120 is formed on the surface of the shank 118. The thread pattern 120 begins at the second body end 108 and extends for part (or all) of the length of the shank 118.

A shroud receiving portion 122 of the fastener body 104 is situated between the first body end 106 and the second body end 108. More specifically, the shroud receiving portion 122 extends from a location proximate the first body end 106 to the mounting-seat 114. The shroud receiving portion 122 is designed to receive an anti-theft shroud 124 so that the shroud is concentrically mounted on the fastener body 104. The shroud 124 has first and second annular end faces 126 and 128, and inner and outer sidewalls 130 and 132. The first annular end face 126 is located proximate the body end 106 so that very little of the body end is exposed to tampering. The second annular end face 128 lies in facing (and preferably contacting) engagement with an annular shoulder 134 formed on the back side of the mounting seat 114.

A shroud retaining system is used to retain the shroud 124 for rotation relative to the fastener body 104. The shroud retaining system is provided by a shroud securement structure 140 formed on the fastener's shroud receiving portion 122. The shroud securement structure 140 is generally ring-shaped and has a textured (e.g., knurled, splined) radial outer surface to facilitate gripping of the inner side wall 130 of the shroud 124 and provide the desired radial interference connection. Thus, when the fastener 102 is seated against a wheel at the design installation torque, the shroud 124 will rotate prior to the onset of rotation of the fastener so as to provide the required security function, and will also resist axial pull-off.

II. Second Exemplary Fastener Construction

A. Closed-End Locking Wheel Nut

Turning now to FIGS. 11-14, a fastener 202 according to a second exemplary fastener construction of the invention is configured as a closed-end locking wheel nut adapted to thread onto a threaded bolt shank extending from a vehicle hub or other wheel mounting structure. The fastener 202 includes a fastener body 204 having a first body end 206 and a second body end 208. The first body end 206 has a generally planar surface 210 in which is formed a continuous curvilinear key receiving pattern 212. As best shown in FIG. 14, an internal bore 214 is formed within the fastener 202 along its axial centerline. The bore 214 extends from the second body end 208 toward the first body end 206 a sufficient distance to accommodate the bolt shank on which the fastener 202 is to be mounted. An internal thread pattern 216 is formed on the wall of the bore 214. The thread pattern 216 begins at the second body end 208 and extends for part (or all) of the length of the bore 214.

A shroud receiving portion 218 of the fastener body 204 is situated between the first body end 206 and the second body end 208. The shroud receiving portion 218 is designed to receive an anti-theft shroud 220 so that the shroud is concentrically mounted on the fastener body 204. The shroud 220 has first and second annular end faces 222 and 224, and inner and outer sidewalls 226 and 228. The first annular end face 222 is located proximate to a first shroud retaining member (see below) on the first body end 206 so that very little of the first body end is exposed to tampering. The second annular end face 224 is located proximate to a second shroud retaining member (see below). The inner sidewall 226 is concentrically supported on the exterior cylindrical surface of the shroud receiving portion 218.

A shroud retaining system is used to retain the shroud 220 for rotation relative to the fastener body 204 such that the shroud will rotate under an applied torque prior to the fastener 202 rotating when it is installed at the design installation torque. The shroud retaining system is provided by first and second shroud retaining members respectively disposed in facing relationship with the shroud's first and second annular end faces 222 and 224. The first shroud retaining member is implemented as a flange 230 that is integrally formed as part of the fastener body 204 at the first body end 206. The flange 230 provides an annular shoulder 232 that is sized to oppose all or a portion of the first annular end face 222 of the shroud 220. This provides enhanced security by making it difficult, if not impossible, to attack the fastener by inserting a chisel or other tool between the shroud's inner wall 226 and the fastener's shroud receiving portion 218 in an effort to split or pry off the shroud. Note that the shroud's first annular end face 222 is preferably in contacting or closely spaced relationship with the annular shoulder 232 to further discourage attack on the fastener 454 by preventing access to the shroud receiving portion 218 at this location.

The second shroud retaining member is implemented as a discrete seat member 234 having a shaped exterior face 236 that provides a mounting seat for the fastener 202. Although the exterior face 236 is shown as being frustoconical in shape, it will be understood that other configurations, such as radial facing, flat facing, etc., could also be used. Moreover, although the seat member 234 will typically be made of the same material as the fastener body 204, it could also be a different material. For example, if the fastener body 204 is made from steel or titanium, it may be desirable in some applications to form the seat member 234 out of aluminum. Other material combinations would also be possible.

It will be seen that the seat member 234 includes an annular face 238 that opposes the second annular end face 224 of the shroud 220. The seat member 234 also has a central longitudinal bore 240 that allows the seat member 234 to be received on a reduced diameter section 242 of the fastener body 202. The reduced diameter section 242 extends from the second body end 208 to the shroud receiving portion 218. The seat member 234 is retained on the reduced diameter section 242 by way of a ramped annular detent structure 244 formed adjacent to the second body end 208. The detent structure 244 engages an annular groove 246 formed in the wall of the seat member's longitudinal bore 242.

Advantageously, it will be seen that the fastener 202 requires only three components, the fastener body 204, the shroud 220 and the seat member 234, to provide a fully functional high security fastener construction. It will additionally be seen that the shroud 220 can be formed as a simple tubular structure that requires no additional configuration features to facilitate its mounting on the fastener body 204.

B. Open End Locking Wheel Nut

Figures 15, 16:
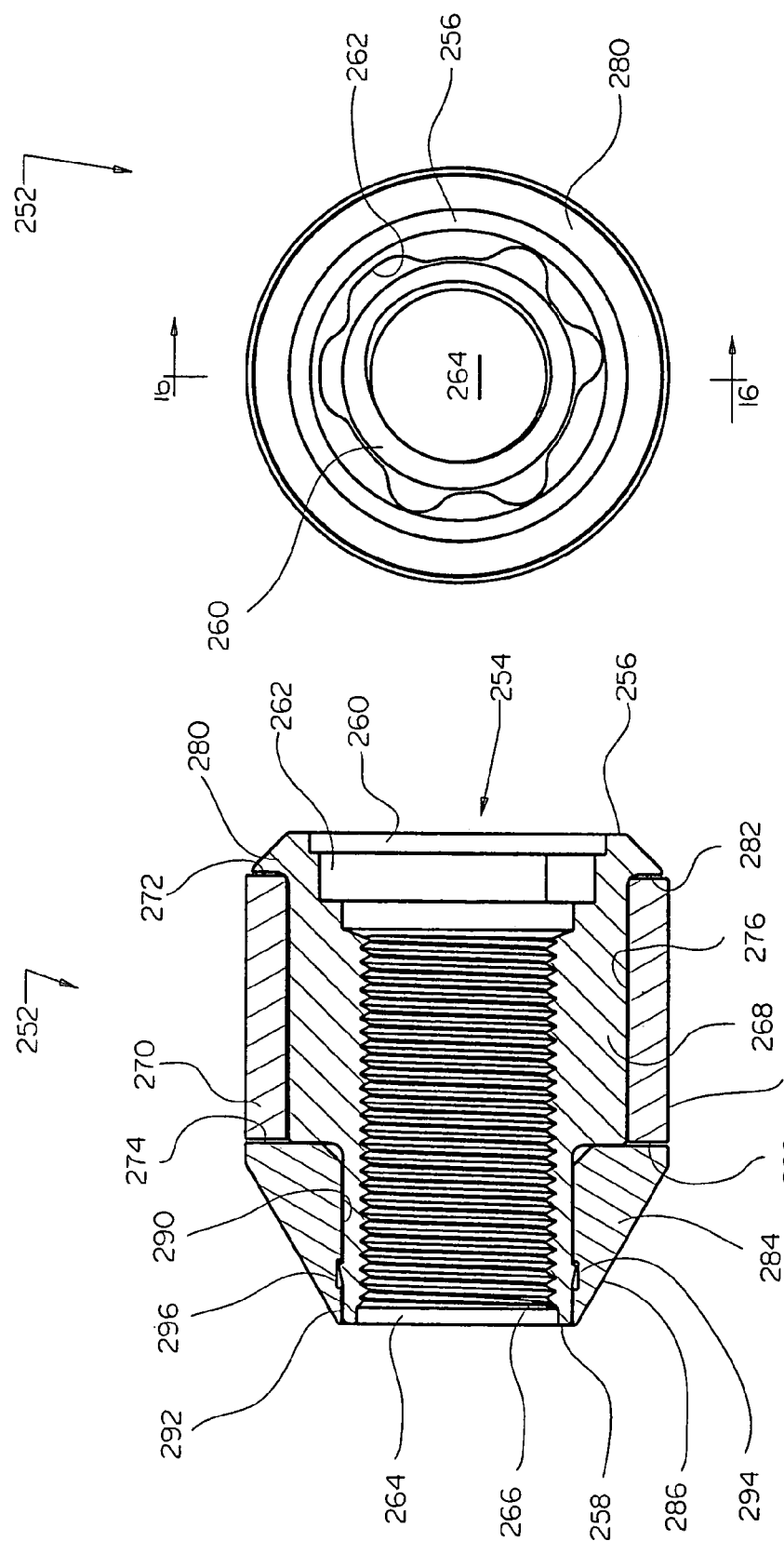
FIG. 15 is an end view of a fastener according to a modification of the high security fastener construction of FIG. 11.
FIG. 16 is a cross-sectional view taken along line 16-16 in FIG. 15.
Figure 17:
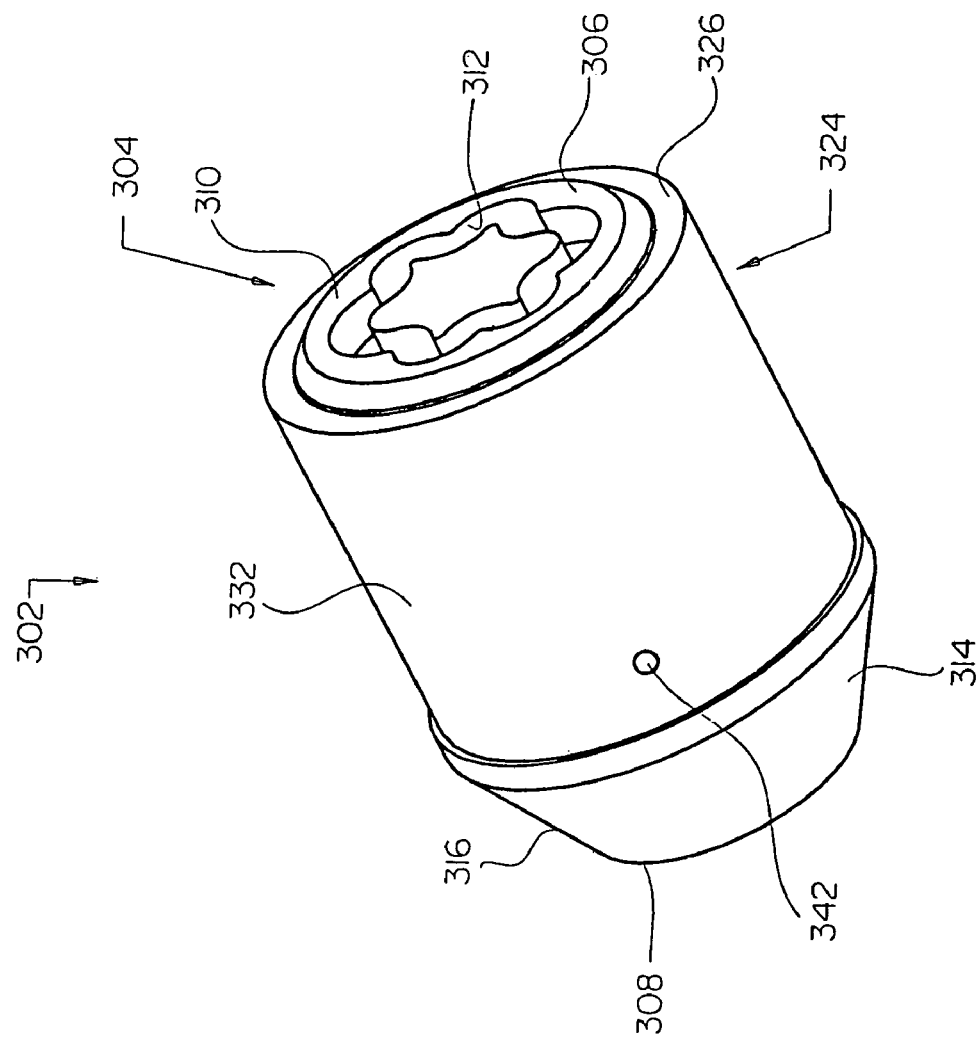
FIG. 17 is a perspective view of a third high security fastener construction in accordance with the invention.
Figure 18:
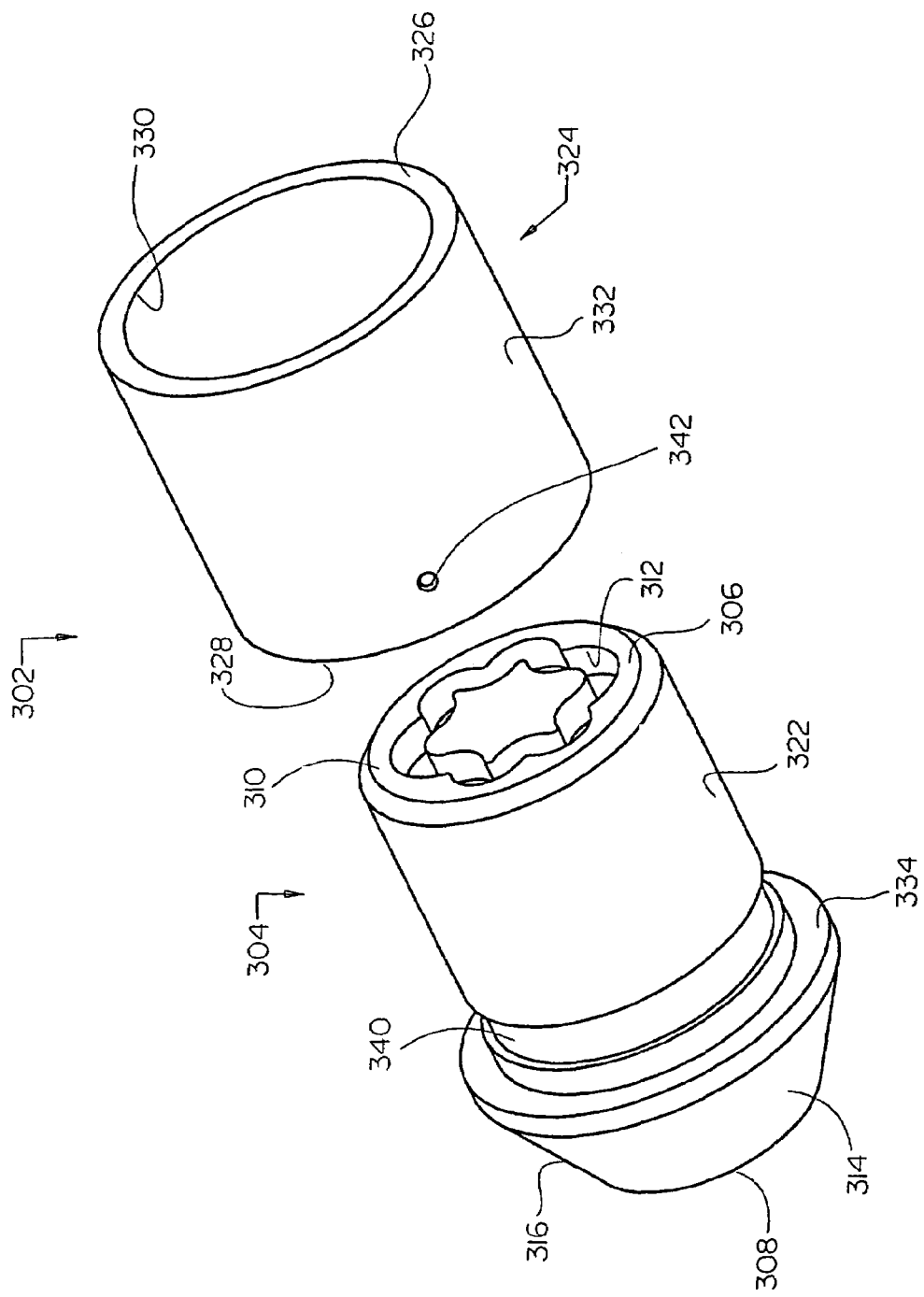
FIG. 18 is an exploded perspective view of the fastener of FIG. 17.

Turning now to FIGS. 15 and 16, a modification of the second exemplary fastener construction is shown in which a fastener 252 is configured as an open-end locking wheel nut. Apart from the fact that the fastener 252 is an open end design, it is similar in all respects to the fastener 202 of FIGS. 11-14. The fastener 252 thus includes a fastener body 254 having a first body end 256 and a second body end 258. The first body end 256 has a stepped opening 260 in which is formed a continuous curvilinear key receiving pattern 262. An internal bore 264 is formed within the fastener 252 along its axial centerline. The bore 264 extends from the second body end 258 toward the first body end 256. An internal thread pattern 266 is formed on the wall of the bore 264. The thread pattern 266 begins at the second body end 258 and extends for part (or all) of the length of the bore 264.

A shroud receiving portion 268 of the fastener body 254 is situated between the first body end 256 and the second body end 258. The shroud receiving portion 268 is designed to receive an anti-theft shroud 270 so that the shroud is concentrically mounted on the fastener body 254. The shroud 270 has first and second annular end faces 272 and 274, and inner and outer sidewalls 276 and 278. The first annular end face 272 is located proximate to a first shroud retaining member (see below) on the first body end 256 so that very little of the first body end is exposed to tampering. The second annular end face 274 is located proximate to a second shroud retaining member (see below). The inner sidewall 276 is concentrically supported on the exterior cylindrical surface of the shroud receiving portion 268.

A shroud retaining system is used to retain the shroud 270 for rotation relative to the fastener body 254 such that the shroud will rotate under an applied torque prior to the fastener 252 rotating when it is installed at the design installation torque. The shroud retaining system is provided by first and second shroud retaining members respectively disposed in facing relationship with the shroud's first and second annular end faces 272 and 274. The first shroud retaining member is implemented as a flange 280 that is integrally formed as part of the fastener body 254 at the first body end 256. The flange 280 includes an annular shoulder 282 that is sized to oppose all or a portion of the first annular end face 272 of the shroud 270 for enhanced security (as earlier described relative to the construction of FIGS. 11-14). The shroud's first annular end face 272 is preferably also in contacting or closely spaced relationship with the annular shoulder 282, for additional security. The second shroud retaining member is implemented as a discrete seat member 284 (made from the same or different material as the fastener body 254) having a frustoconical exterior face 286 (other shapes could also be used) that provides a mounting seat for the fastener 252. The seat member 284 further includes an annular face 288 that opposes the second annular end face 274 of the shroud 270. The seat member 284 also has a central longitudinal bore 290 that is allows the seat member 284 to be received on a reduced diameter section 292 of the fastener body 252. The reduced diameter section 292 extends from the second body end 258 to the shroud receiving portion 268. The seat member 284 is retained on the reduced diameter section 292 by way of a ramped annular detent structure 294 formed adjacent to the second body end 258. The detent structure 294 engages an annular groove 296 formed in the wall of the seat member's longitudinal bore 292.

III. Third Exemplary Fastener Construction

A. Closed-End Locking Wheel Nut

Figure 20:
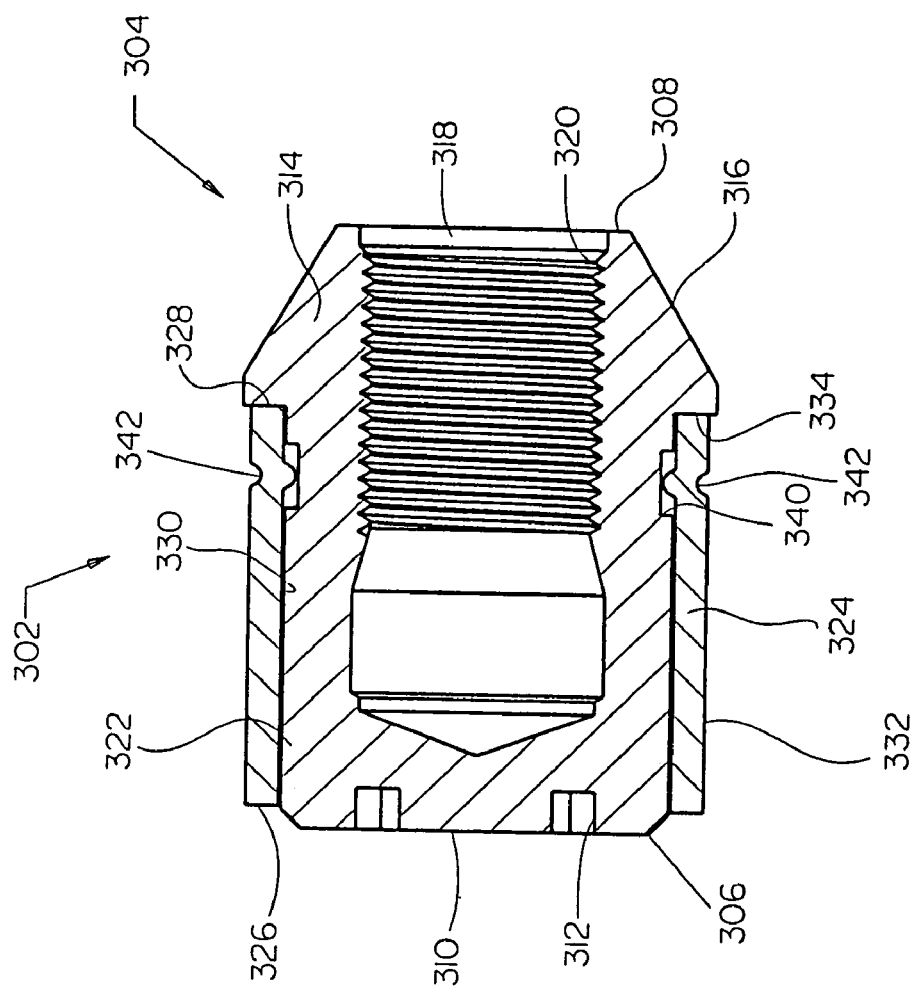
FIG. 20 is a cross-sectional view taken along line 20-20 in FIG. 19.
Figure 19:
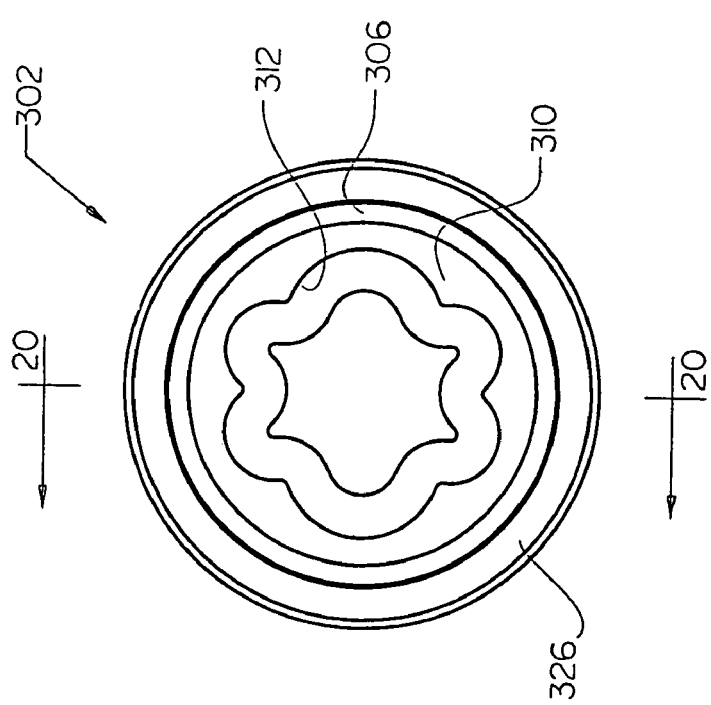
FIG. 19 is an end view of the fastener of FIG. 17.

Turning now to FIGS. 17-20, a fastener 302 according to a third exemplary fastener construction of the invention is configured as a closed-end locking wheel nut adapted to thread onto a threaded bolt shank extending from a vehicle hub or other wheel mounting structure. The fastener 302 includes a fastener body 304 having a first body end 306 and a second body end 308. The first body end 306 has a generally planar surface 310 in which is formed a continuous curvilinear key receiving pattern 312. The second body end 308 of the fastener 302 is formed with a mounting seat 314 having a generally frustoconical outer surface 316 (other shapes could also be used). As best shown in FIG. 20, an internal bore 318 is formed within the fastener 302 along its axial centerline. The bore 318 extends from the second body end 308 toward the first body end 306 a sufficient distance to accommodate the bolt shank on which the fastener 302 is to be mounted. An internal thread pattern 320 is formed on the wall of the bore 318. The thread pattern 320 begins at the second body end 308 and extends for part (or all) of the length of the bore 318.

A shroud receiving portion 322 of the fastener body 304 is situated between the first body end 306 and the second body end 308. More specifically, the shroud receiving portion 322 extends from a location proximate the first body end 306 to the mounting seat 314. The shroud receiving portion 322 is designed to receive an anti-theft shroud 324 so that the shroud is concentrically mounted on the fastener body 304. The shroud 324 has first and second annular end faces 326 and 328, and inner and outer sidewalls 330 and 332. The first annular end face 326 is located proximate the first body end 306 so that very little of the first body end is exposed to tampering. The second annular end face 328 lies in facing (and preferably contacting) engagement with an annular shoulder 334 formed on the back side of the mounting seat 314. The inner sidewall 330 is concentrically supported on the cylindrical outer surface of the shroud receiving portion 322.

A shroud retaining system is used to retain the shroud 324 for rotation relative to the fastener body 304 such that the shroud will rotate under an applied torque prior to the fastener 302 rotating when it is installed at the design installation torque. The shroud retaining system includes a staking region 340 formed on the shroud receiving portion 322 to allow staking of the shroud 324 to the fastener body 304. The staking region 340 is formed as an annular groove in the shroud receiving portion 322. The annular groove is preferably located proximate to the mounting seat 314, but could be situated at other locations on the shroud receiving portion 322. As shown by the staking indentations 342 in FIGS. 17, 18 and 20, the shroud 324 is staked at multiple circumferential locations around the staking region 340 to retain the shroud in rotatable relationship with the shroud receiving portion 322.

Advantageously, it will be seen that the fastener 302 requires only two components, the fastener body 304 and the shroud 322, to provide a fully functional high security fastener construction. It will additionally be seen that the shroud 324 can be formed as a simple tubular structure that requires no additional configuration features to facilitate its mounting on the fastener body 304.

B. Open-End Locking Wheel Nut

Turning now to FIGS. 21 and 22, a modification of the third exemplary fastener construction is shown in which a fastener 352 is configured as an open-end locking wheel nut. Apart from the fact that the fastener 352 is an open end design, it is similar in all respects to the fastener 302 of FIGS. 17-20. The fastener 352 thus includes a fastener body 354 having a first body end 356 and a second body end 358. The first body end 356 has a stepped opening 360 in which is formed a continuous curvilinear key receiving pattern 362. The second body end 358 of the fastener 352 is formed with a mounting seat 364 having a generally frustoconical outer surface 366 (other shapes could also be used). An internal bore 368 is formed within the fastener 352 along its axial centerline. The bore 368 extends from the second body end 358 toward the first body end 356. An internal thread pattern 370 is formed on the wall of the bore 368. The thread pattern 370 begins at the second body end 358 and extends for part (or all) of the length of the bore 368.

A shroud receiving portion 372 of the fastener body 354 is situated between the first body end 356 and the second body end 358. More specifically, the shroud receiving portion 372 extends from a location proximate the first body end 356 to the mounting seat 364. The shroud receiving portion 372 is designed to receive an anti-theft shroud 374 so that the shroud is concentrically mounted on the fastener body 354. The shroud 374 has first and second annular end faces 376 and 378, and inner and outer sidewalls 380 and 382. The first annular end face 376 is located proximate the first body end 356 so that very little of the first body end is exposed to tampering. The second annular end face 378 lies in facing (and preferably contacting) engagement with an annular shoulder 384 formed on the back side of the mounting seat 364. The inner sidewall 380 is concentrically supported on the cylindrical outer surface of the shroud receiving portion 372.

A shroud retaining system is used to retain the shroud 374 for rotation relative to the fastener body 354 such that the shroud will rotate under an applied torque prior to the fastener 352 rotating when it is installed at the design installation torque. The shroud retaining system includes a staking region 390 formed on the shroud receiving portion 372 to allow staking of the shroud 374 to the fastener body 354. The staking region 390 is formed as an annular groove in the shroud receiving portion 372. The annular groove is preferably located proximate to the mounting seat 364, but could be situated at other locations on the shroud receiving portion 372. As shown by the staking indentations 392 in FIG. 22, the shroud 374 is staked at multiple circumferential locations around the staking region 390 to retain the shroud in rotatable relationship with the shroud receiving portion 372.

C. Locking Wheel Bolt

Figures 23, 24:
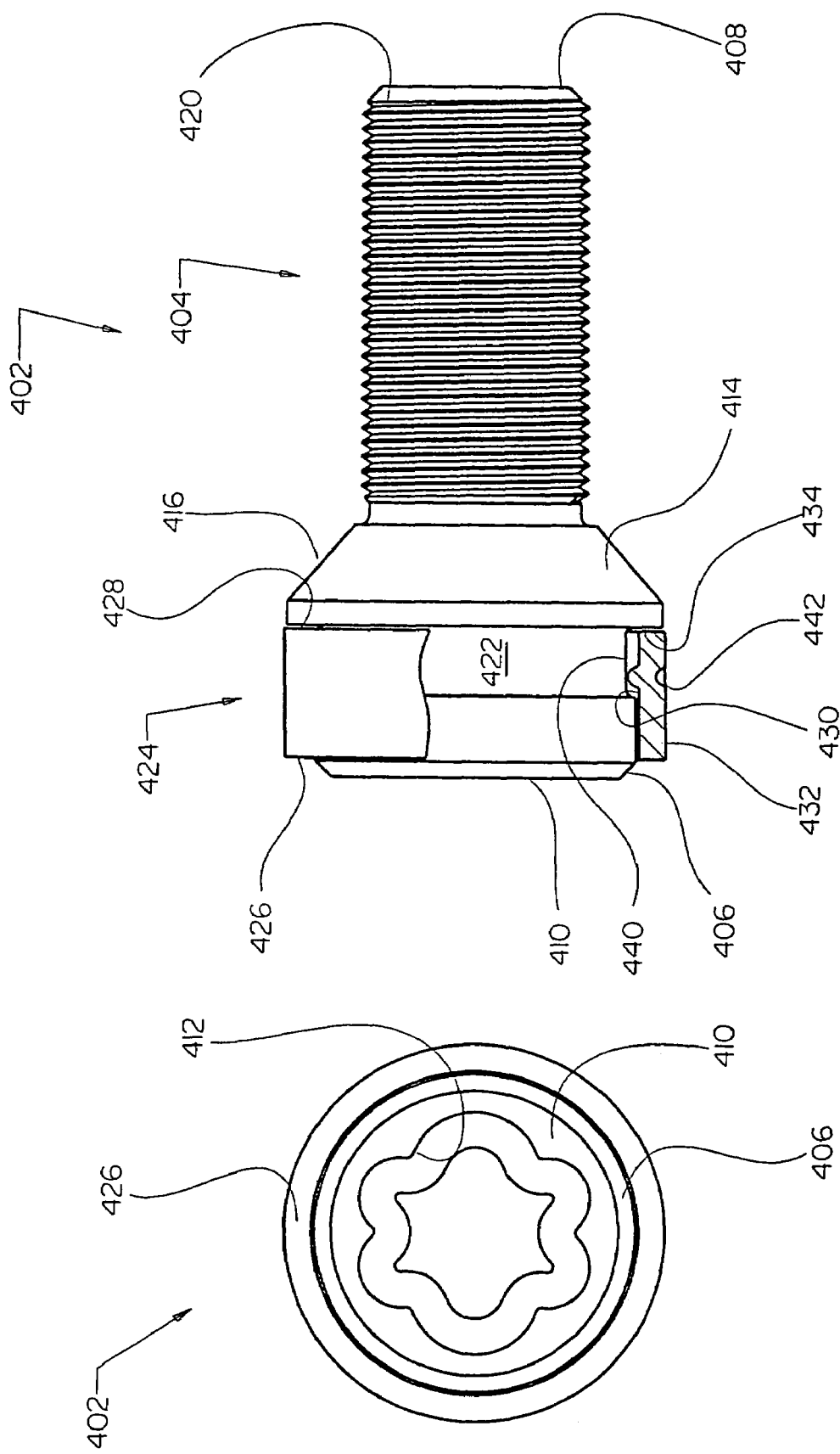
FIG. 23 is an end view of a fastener according to another modification of the high security fastener construction of FIG. 17.
FIG. 24 is a partial sectional view of the fastener of FIG. 23.
Figure 25:
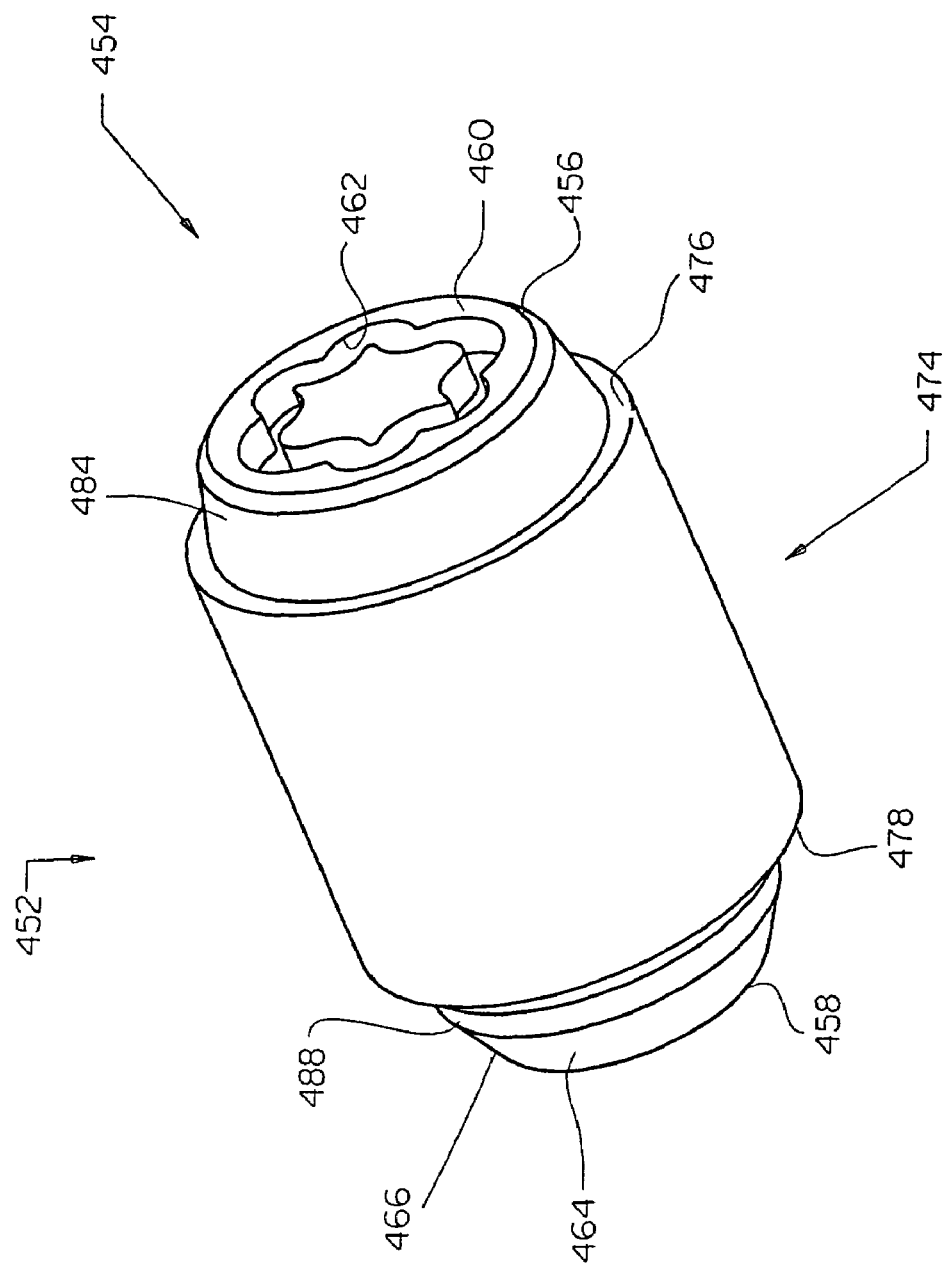
FIG. 25 is a perspective view of a fourth high security fastener construction in accordance with the invention.
Figure 26:
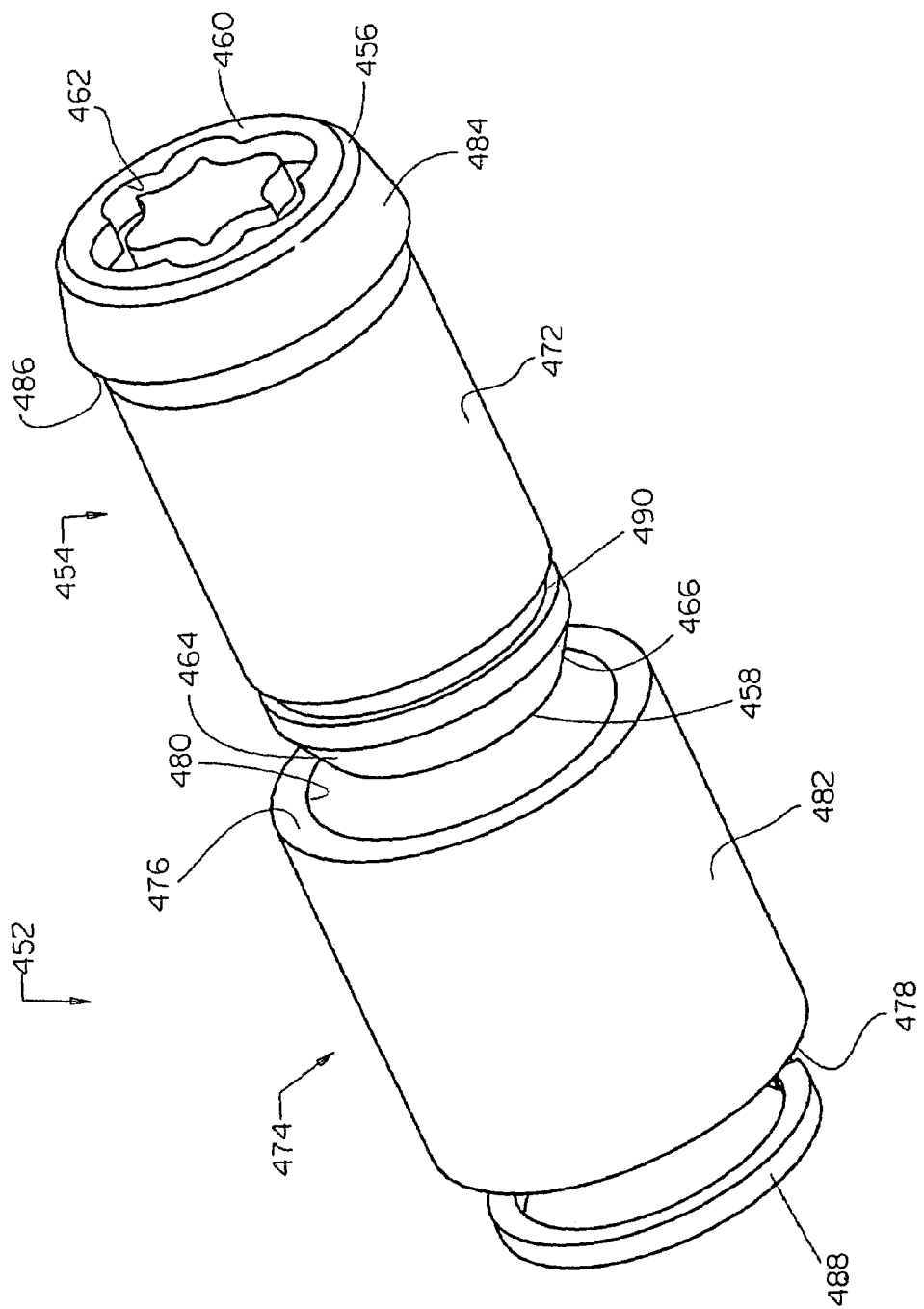
FIG. 26 is an exploded perspective view of the fastener of FIG. 25.
Figure 31:
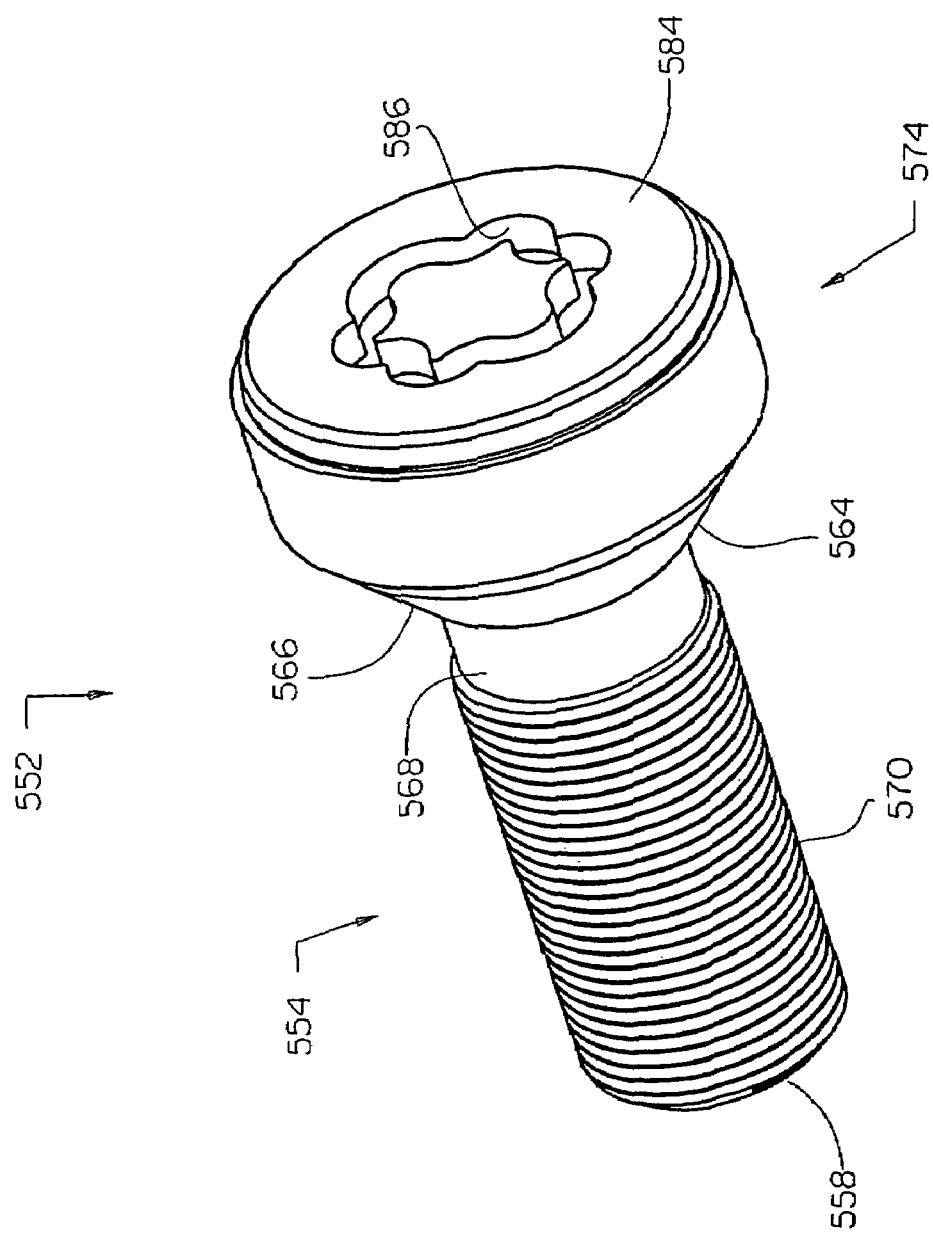
FIG. 31 is a perspective view of a fifth high security fastener construction in accordance with the invention.

Turning now to FIGS. 23 and 24, another modification of the third exemplary fastener construction is shown in which a fastener 402 is configured as a locking wheel bolt. Apart from the fact that the fastener 402 has an externally threaded shank instead of an internally threaded bore, it is similar in all respects to the fastener 302 of FIGS. 17-20. The fastener 402 thus includes a fastener body 404 having a first body end 406 and a second body end 408. The first body end 406 has a generally planar surface 410 in which is formed a continuous curvilinear key receiving pattern 412. A mounting seat portion 414 of the fastener body 404 has a generally frustoconical outer surface 416 (other shapes could also be used). A bolt shank 418 extends from the mounting seat 414 to the second body end 408. An external thread pattern 420 is formed on the surface of the shank 418. The thread pattern 420 begins at the second body end 408 and extends for part (or all) of the length of the shank 418.

A shroud receiving portion 422 of the fastener body 404 is situated between the first body end 406 and the second body end 408. More specifically, the shroud receiving portion 422 extends from a location proximate the first body end 406 to the mounting seat 414. The shroud receiving portion 422 is designed to receive an anti-theft shroud 424 so that the shroud is concentrically mounted on the fastener body 404. The shroud 424 has first and second annular end faces 426 and 428, and inner and outer sidewalls 430 and 432. The first annular end face 426 is located proximate the body end 406 so that very little of the body end is exposed to tampering. The second annular end face 428 lies in facing (and preferably contacting) engagement with an annular shoulder 434 formed on the mounting seat 414.

A shroud retaining system is used to retain the shroud 424 for rotation relative to the fastener body 404 such that the shroud will rotate under an applied torque prior to the fastener 402 rotating when it is installed at the design installation torque. The shroud retaining system includes a staking region 440 formed on the shroud receiving portion 422 to allow staking of the shroud 424 to the fastener body 404. The staking region 440 is formed as an annular groove in the shroud receiving portion 422. As shown by the staking indentation 442 in FIG. 24, the shroud 424 is staked at the staking region 440 (preferably at multiple circumferential locations) to retain the shroud in rotatable relationship with the shroud receiving portion 422.

IV. Fourth Exemplary Fastener Construction

A. Closed-End Locking Wheel Nut

Turning now to FIGS. 25-28, a fastener 452 according to a fourth exemplary fastener construction of the invention is configured as a closed-end locking wheel nut adapted to thread onto a threaded bolt shank extending from a vehicle hub or other wheel mounting structure. The fastener 452 includes a fastener body 454 having a first body end 456 and a second body end 458. The first body end 456 has a generally planar surface 460 in which is formed a continuous curvilinear key receiving pattern 462. The second body end 458 of the fastener 452 is formed with a mounting seat 464 having a generally frustoconical outer surface 466 (other shapes could also be used). As best shown in FIG. 28, an internal bore 468 is formed within the fastener 452 along its axial centerline. The bore 468 extends from the second body end 458 toward the first body end 456 a sufficient distance to accommodate the bolt shank on which the fastener 452 is to be mounted. An internal thread pattern 470 is formed on the wall of the bore 468. The thread pattern 470 begins at the second body end 458 and extends for part (or all) of the length of the bore 468.

A shroud receiving portion 472 of the fastener body 404 is situated between the first body end 456 and the second body end 458. More specifically, the shroud receiving portion 472 extends from a location proximate the first body end 456 to a location proximate the mounting seat 464. The shroud receiving portion 472 is designed to receive an annular anti-theft shroud 474 so that the shroud is concentrically mounted on the fastener body 454. The shroud 474 has first and second annular end faces 476 and 478, and inner and outer sidewalls 480 and 482. The first annular end face 476 is located proximate to a first shroud retaining member (see below) on the first body end 456 so that very little of the first body end is exposed to tampering. The second annular end face 478 is located proximate to a second shroud retaining member (see below). The inner sidewall 480 is concentrically supported on the cylindrical outer surface of the shroud receiving portion 472.

A shroud retaining system is used to retain the shroud 474 for rotation relative to the fastener body 454 such that the shroud will rotate under an applied torque prior to the fastener 452 rotating when it is installed at the design installation torque. The shroud retaining system is provided by first and second shroud retaining members respectively disposed in facing relationship with the shroud's first and second annular end faces 476 and 478. The first shroud retaining member is implemented as a flange 484 that is integrally formed as part of the fastener body 454 at the first body end 456. The flange 484 includes an annular shoulder 486 that is sized to oppose all or a portion of the first annular end face 476 of the shroud 474 for enhanced security (as earlier described relative to the construction of FIGS. 11-14). The shroud's first annular end face 476 is preferably also in contacting or closely spaced relationship with the annular shoulder 486, for additional security. The second shroud retaining member is implemented as a retaining ring 488 that opposes the shroud's second annular face 478. The shroud receiving portion 472 includes a ring retaining area formed as an annular groove 490 for supporting the ring member 488 in an axially fixed position. Preferably, the annular groove 490 is located so that the ring member 488 is substantially inaccessible when the fastener 452 is seated in operational engagement with a wheel being secured by the fastener. In most (but not all) cases, this will entail locating the annular groove 490 immediately behind the mounting seat 464, as best shown in FIG. 28. For most wheels, this location will allow the ring member 488 to be substantially protected by the counterbore that is conventionally formed in the rim of the wheel to receive the mounting seat 464. For some wheels, a deep counterbore above the wheel seat will allow an alternate ring member location further away from the mounting seat 464. Because a deep counterbore protects more of the outside of the fastener 452, a shorter shroud 474 with the ring member 488 located nearer the first body end 456 will provide the same security protection. The foregoing ring protection arrangements prevent unauthorized removal of the retaining ring member 488. Without such protection, a thief could potentially dislodge the retaining ring member 488 and slide the shroud 474 axially away from the flange 484. As mentioned above, this would expose the fastener 474 to attack via a chisel or other tool. Note that it is also desirable to size the ring member 488 so that it is radially recessed relative to the shroud's outer sidewall 482. This will tend to hide the ring member 488 from view and make it less accessible to tampering.

Advantageously, it will be seen that the fastener 452 requires only three components, the fastener body 454, the shroud 474 and the retaining ring 488, to provide a fully functional high security fastener construction. It will additionally be seen that the shroud 474 can be formed as a simple tubular structure that requires no additional configuration features to facilitate its mounting on the fastener body 454.

B. Open End Locking Wheel Nut

Turning now to FIGS. 29 and 30, a modification of the fourth exemplary fastener construction is shown in which a fastener 502 is configured as an open-end locking wheel nut. Apart from the fact that the fastener 502 is an open end design, it is similar in all respects to the fastener 452 of FIGS. 25-28. The fastener 502 thus includes a fastener body 504 having a first body end 506 and a second body end 508. The first body end 506 has a stepped opening 510 in which is formed a continuous curvilinear key receiving pattern 512. The second body end 508 of the fastener 502 is formed with a mounting seat 514 having a generally frustoconical outer surface 516 (other shapes could also be used). An internal bore 518 is formed within the fastener 502 along its axial centerline. The bore 518 starts at the second body end 508 and extends toward the first body end 506. An internal thread pattern 520 is formed on the wall of the bore 518. The thread pattern 520 begins at the second body end 508 and extends for part (or all) of the length of the bore 518.

A shroud receiving portion 522 of the fastener body 504 is situated between the first body end 506 and the second body end 508. More specifically, the shroud receiving portion 522 extends from a location proximate the first body end 506 to a location proximate the mounting seat 514. The shroud receiving portion 522 is designed to receive an annular anti-theft shroud 524 so that the shroud is concentrically mounted on the fastener body 504. The shroud 524 has first and second annular end faces 526 and 528, and inner and outer sidewalls 530 and 532. The first annular end face 526 is located proximate to a first shroud retaining member (see below) on the first body end 506 so that very little of the first body end is exposed to tampering. The second annular end face 528 is located proximate to a second shroud retaining member (see below). The inner sidewall 530 is concentrically supported on the cylindrical outer surface of the shroud receiving portion 522.

A shroud retaining system is used to retain the shroud 524 for rotation relative to the fastener body 504 such that the shroud will rotate under an applied torque prior to the fastener 502 rotating when it is installed at the design installation torque. The shroud retaining system is provided by first and second shroud retaining members respectively disposed in facing relationship with the shroud's first and second annular end faces 526 and 528. The first shroud retaining member implemented as a flange 534 that is integrally formed as part of the fastener body 504 at the first body end 506. The flange 534 includes an annular shoulder 536 that is sized to oppose all or a portion of the first annular end face 526 of the shroud 524 for enhanced security (as earlier described relative to the construction of FIGS. 11-14). The shroud's first annular end face 526 is preferably also in contacting or closely spaced relationship with the annular shoulder 536, for additional security. The second shroud retaining member is implemented as a retaining ring 538 that opposes the shroud's second annular face 528. The shroud receiving portion 522 includes a ring retaining area formed as an annular groove 540 for supporting the ring member 538 in an axially fixed position. As in the case of the fastener 452 of FIGS. 25-28, the annular groove 540 is preferably sized and located so that the ring member 538 is substantially inaccessible when the fastener 502 is seated in operational engagement with a wheel being secured by the fastener.

V. Fifth Exemplary Fastener Construction

A. Locking Wheel Bolt

Turning now to FIGS. 31-34, a fastener 552 according to a fifth exemplary fastener construction of the invention is configured as a locking wheel bolt adapted to thread into a threaded bore in a vehicle hub or other wheel mounting structure. The fastener 552 includes a fastener body 554 having a first body end 556 and a second body end 558. As best seen in FIG. 34, the first body end 556 has a generally planar surface 560 with a central bore 562 formed therein that extends a short distance toward the second body end 558. A mounting seat portion 564 of the fastener body 554 has a generally frustoconical outer surface 566 (other shapes could also be used). A bolt shank 568 extends from the mounting seat 564 to the second body end 558. An external thread pattern 570 is formed on the surface of the shank 568. The thread pattern 570 begins at the second body end 558 and extends for part (or all) of the length of the shank 568.

A shroud receiving portion 572 of the fastener body 554 is situated between the first body end 556 and the second body end 558. More specifically, the shroud receiving portion 572 extends from the first body end 556 to the mounting seat 564. The shroud receiving portion 572 is designed to receive an annular anti-theft shroud 574 so that the shroud is concentrically mounted on the fastener body 554. The shroud 574 has first and second annular end faces 576 and 578, and inner and outer sidewalls 580 and 582. The first annular end face 576 extends beyond the first body end 556 and is located proximate to a first shroud retaining member (see below). The second annular end face 578 is located proximate to a second shroud retaining member (see below). The inner sidewall 580 is concentrically supported on the exterior cylindrical surface of the shroud receiving portion 572.

Figure 32:
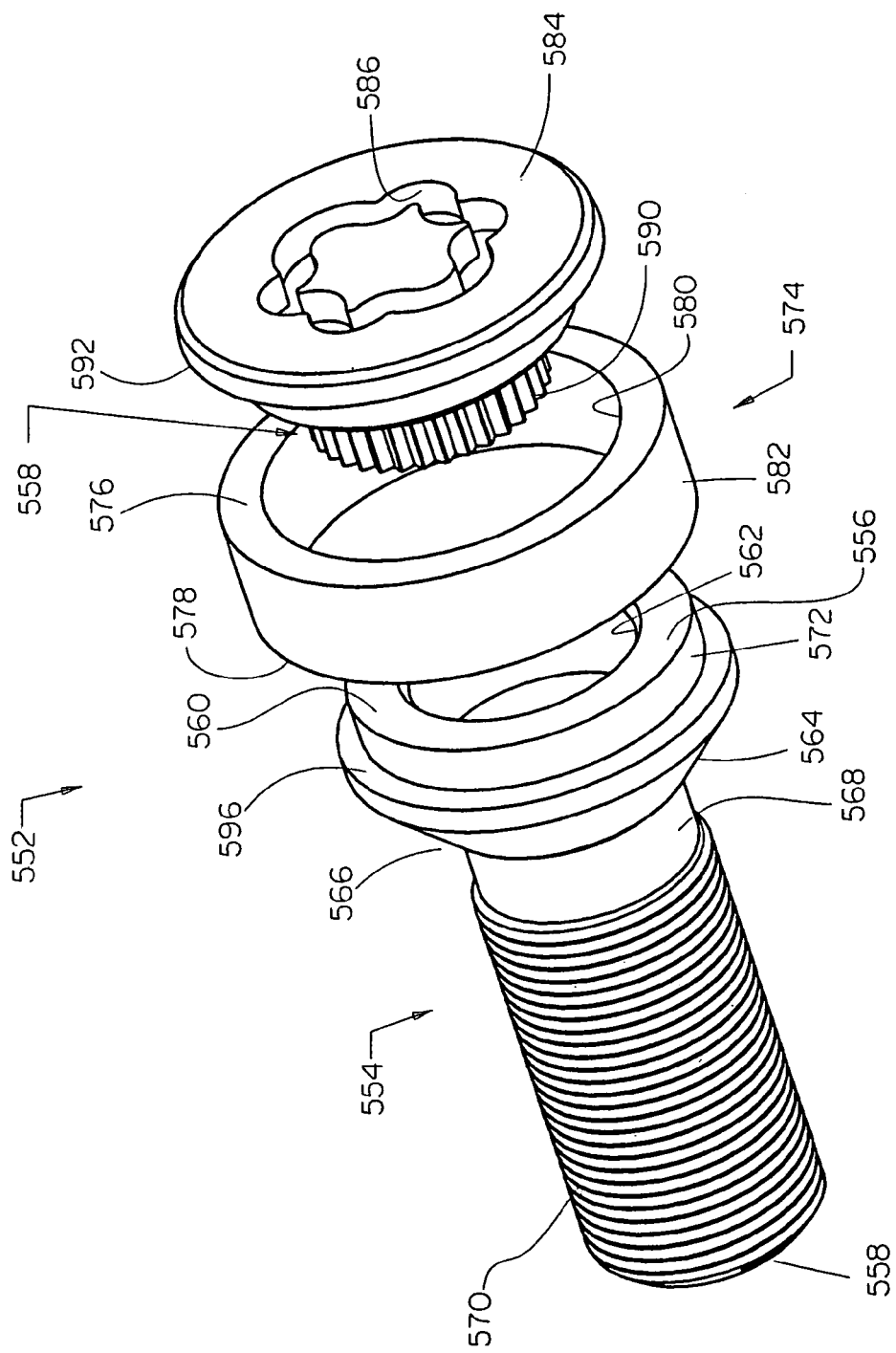
FIG. 32 is an exploded perspective view of the fastener of FIG. 31.

A shroud retaining system is used to retain the shroud 574 for rotation relative to the fastener body 554 such that the shroud will rotate under an applied torque prior to the fastener 552 rotating when it is installed at the design installation torque. The shroud retaining system is provided by first and second shroud retaining members respectively disposed in facing relationship with the shroud first and second annular faces 576 and 578. The first shroud retaining member is implemented as a discrete key receiving member 584 mounted on the first body end 556. The key receiving member 584 has a continuous curvilinear key receiving pattern 586 formed in a generally planar face portion thereof. A shank portion 588 of the key receiving member 584 seats in the bore 562 of the fastener body 554. As shown in FIG. 32, the shank 588 is formed with an axially extending spline pattern 590 that seats the shank 588 in the bore 562 in interfering engagement therewith. Note that this interference connection must be substantial in that it transfers torque from the key receiving member 584 to the fastener body 554 during installation and removal of the fastener 552. The interference connection must also be axially secure to prevent the key receiving member 584 from being pried or pulled off the fastener body 554. The key receiving member 584 further includes a flange providing an annular shoulder 592 that is sized to oppose all or a portion of the shroud first annular face 576 for enhanced security (as earlier described relative to the construction of FIGS. 11-14). The shroud's first annular end face 576 is preferably also in contacting or closely spaced relationship with the annular shoulder 592, for additional security. The key receiving member 584 additionally includes a shroud receiving portion 594 that acts in cooperation with the fastener body's shroud receiving portion 572 to concentrically mount the shroud 574. The second shroud retaining member is implemented as an annular shoulder 596 formed on the back side of the mounting seat 564 of the fastener body 554. The annular shoulder 596 opposes the shroud's second annular end face 578.

Advantageously, it will be seen that the fastener 552 requires only three components, the fastener body 554, the shroud 574 and the key receiving member 584, to provide a fully functional high security fastener construction. It will additionally be seen that the shroud 574 can be formed as a simple tubular structure that requires no additional configuration features to facilitate its mounting on the fastener body 554.

B. Closed End Locking Wheel Nut

Figure 36:
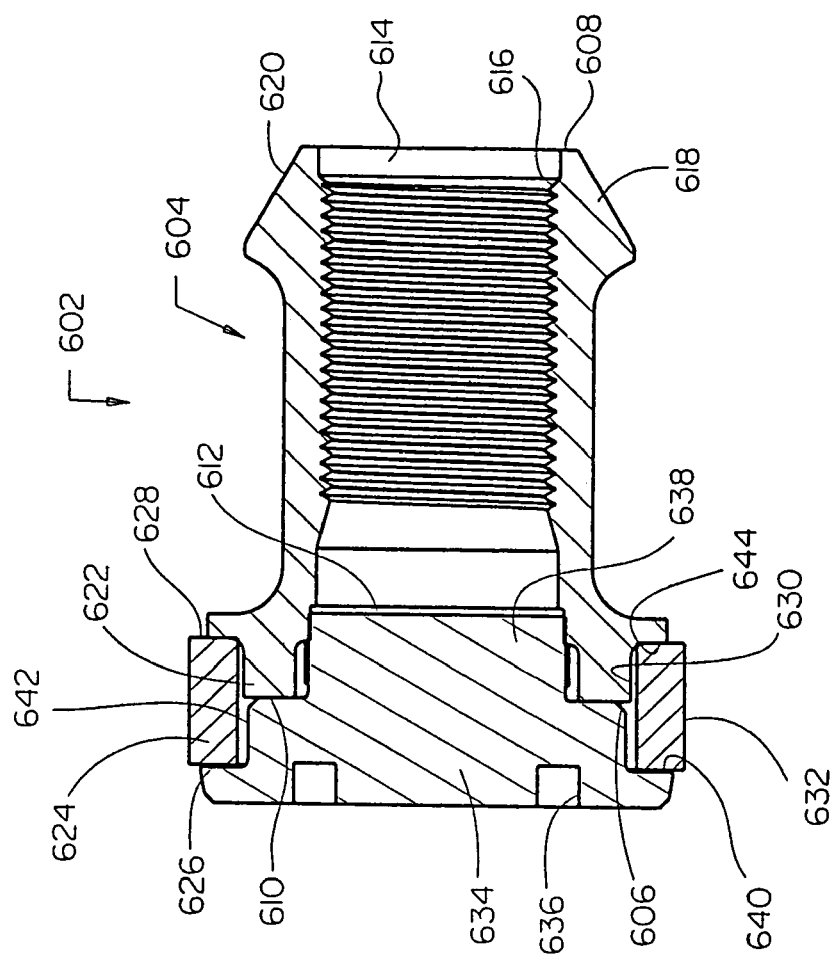
FIG. 36 is a cross-sectional view taken along line 36-36 in FIG. 35.
Figure 35:
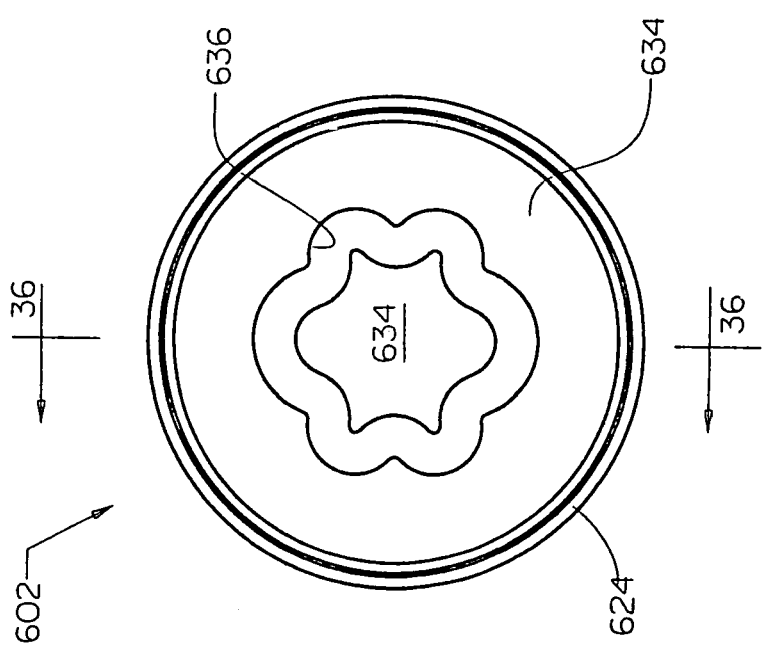
FIG. 35 is an end view of a fastener according to a modification of the high security fastener construction of FIG. 31.

Turning now to FIGS. 35 and 36, a modification of the fifth exemplary fastener construction is shown in which a fastener 602 is configured as a closed-end locking wheel nut. Apart from the fact that the fastener 602 is a nut having an internal bore instead of an externally threaded shank, it is similar in all respects to the fastener 552 of FIGS. 31-34. The fastener 602 thus includes a fastener body 604 having a first body end 606 and a second body end 608. The first body end 606 has a generally planar surface 610 with a short central bore 612 formed therein. A second bore 614 extends from the second body end 608 toward the first body end 606. An internal thread pattern 616 is formed on the wall of the bore 614. The thread pattern 616 begins at the second body end 608 and extends for part (or all) of the length of the bore 614. A mounting seat 618 is formed on the fastener body 604 at the second body end 608, and has a generally frustoconical outer surface 620 (other shapes could also be used).

A shroud receiving portion 622 of the fastener body 604 is situated between the first body end 606 and the second body end 608. The shroud receiving portion 622 is designed to receive an annular anti-theft shroud 624 so that the shroud is concentrically mounted on the shroud receiving portion 622. The shroud 624 has first and second annular end faces 626 and 628, and inner and outer sidewalls 630 and 632. The first annular end face 626 extends beyond the first body end 606 and is located proximate to a first shroud retaining member (see below). The second annular end face 628 is located proximate to a second shroud retaining member (see below). The inner sidewall 630 is concentrically supported on the exterior cylindrical surface of the shroud receiving portion 622.

A shroud retaining system is used to retain the shroud 624 for rotation relative to the fastener body 604 such that the shroud will rotate under an applied torque prior to the fastener 602 rotating when it is installed at the design installation torque. The shroud retaining system is provided by first and second shroud retaining members respectively disposed in facing relationship with the shroud first and second annular faces 626 and 628. The first shroud retaining member is implemented as a discrete key receiving member 634 mounted on the fastener body. The key receiving member 634 has a continuous curvilinear key receiving pattern 636 formed in a generally planar face portion thereof. A shank portion 638 of the key receiving member 634 seats in the bore 612 of the fastener body 604. Although not shown, the shank 638 is formed with an axially extending spline pattern that seats the shank in the bore 612 in interfering engagement therewith in a manner that allows fastener installation and removal torques to be transferred from the key receiving member 634 to the fastener body 604, and which prevents axial removal of the key receiving member. The key receiving member 634 further includes a flange providing annular shoulder 640 that is sized to oppose all or a portion of the shroud first annular face 626 for enhanced security (as earlier described relative to the construction of FIGS. 11-14). The shroud's first annular end face 626 is preferably also in contacting or closely spaced relationship with the annular shoulder 640, for additional security. The key receiving member 634 additionally includes a shroud receiving portion 642 that acts in cooperation with the fastener body's shroud receiving portion 622 to concentrically mount the shroud 624. The second shroud retaining member is implemented as an annular shoulder 644 formed on the fastener body 604 adjacent the shroud receiving portion 622. The annular shoulder 644 opposes the shroud's second annular end face 628.

VI. Sixth Exemplary Fastener Construction

A. Closed-End Locking Wheel Nut

Figure 39:
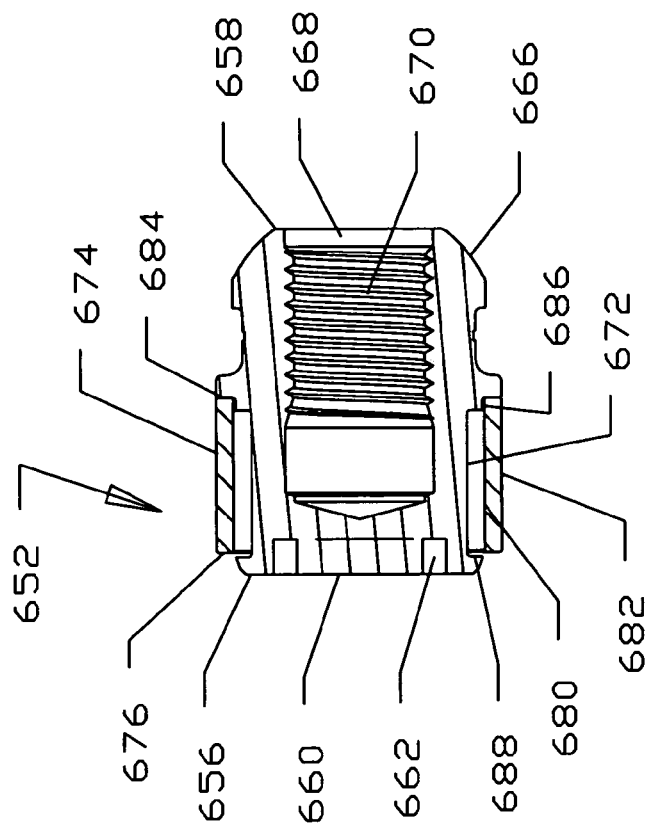
FIG. 39 is a longitudinal cross-sectional view taken along the centerline of the fastener of FIG. 38.

Turning now to FIGS. 37-49, a fastener 652 according to a sixth exemplary fastener construction of the invention is configured as a closed-end locking wheel nut adapted to thread onto a threaded bolt shank extending from a vehicle hub or other wheel mounting structure. The fastener 652 includes a fastener body 654 having a first body end 656 and a second body end 658. The first body end 656 has a generally planar surface 660 in which is formed a continuous curvilinear key receiving pattern 662. The second body end 658 of the fastener 652 is formed with a mounting seat 664 having a generally radial outer surface 666 (other shapes could also be used). As best shown in FIG. 39, an internal bore 668 is formed within the fastener 652 along its axial centerline. The bore 668 extends from the second body end 658 toward the first body end 656 a sufficient distance to accommodate the bolt shank on which the fastener 652 is to be mounted. An internal thread pattern 670 is formed on the wall of the bore 668. The thread pattern 670 begins at the second body end 658 and extends for part (or all) of the length of the bore 668.

A shroud receiving portion 672 of the fastener body 654 is situated between the first body end 656 and the second body end 658. More specifically, the shroud receiving portion 672 extends from a location proximate the first body end 656 to a medial portion of the fastener body 654. The shroud receiving portion 672 is designed to receive an anti-theft shroud 674 so that the shroud is concentrically mounted on the fastener body 654. The shroud 674 has first and second annular end faces 676 and 678, and inner and outer sidewalls 680 and 682. The first annular end face 676 is located proximate the first body end 656 so that very little of the fastener body 654 is exposed to tampering. The second annular end face 678 lies in facing (and preferably contacting) engagement with a first annular shoulder 684 formed at a medial location on the fastener body 654. The shroud's inner sidewall 680 is concentrically supported on a cylindrical shoulder 686 extending from the first annular shoulder 684. If radial stabilization of the shroud 674 is desired, the diameter of the cylindrical shoulder 686 should be only slightly smaller than the diameter of the shroud 674 at its inner surface 680.

Figure 37:
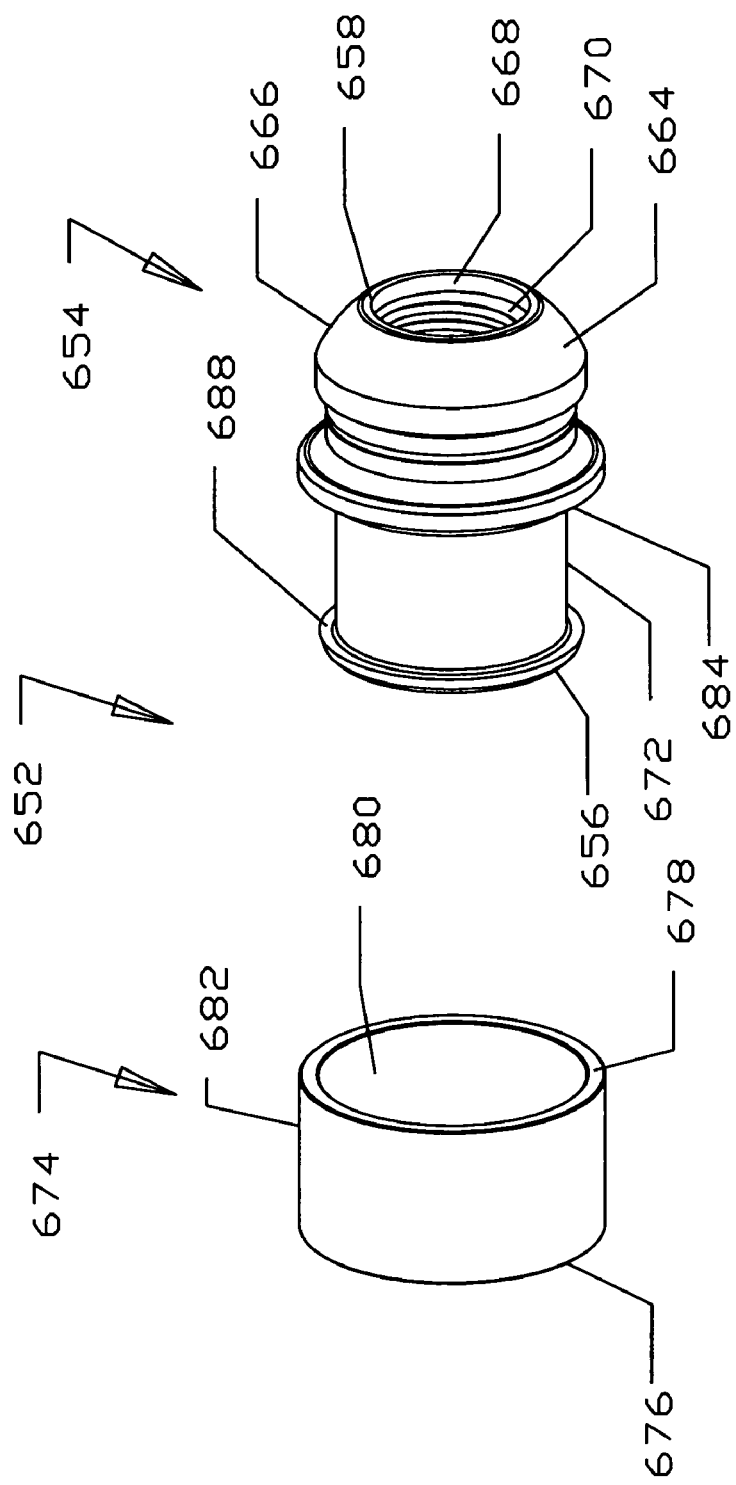
FIG. 37 is an exploded perspective view of a sixth high security fastener construction in accordance with the invention.
Figure 38:
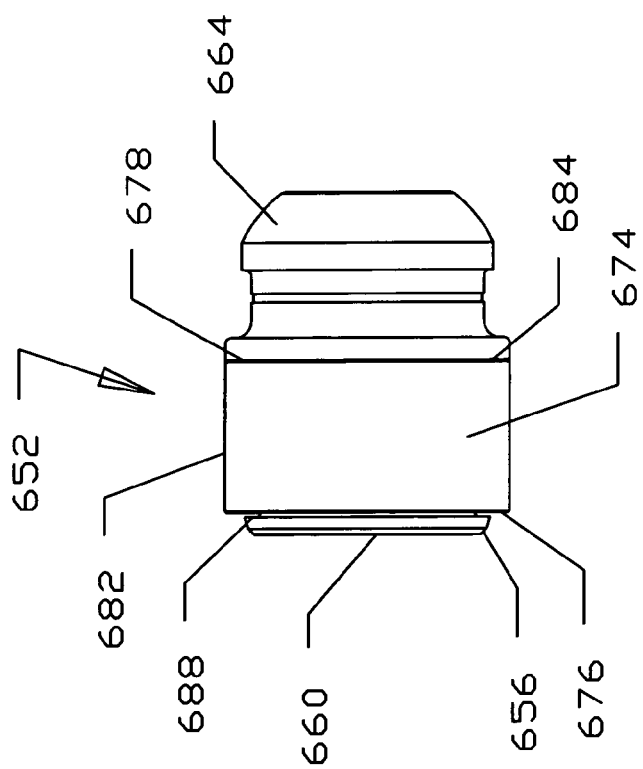
FIG. 38 is a side view of the fastener of FIG. 37 prior to swaging of the fastener's shroud.

A shroud retaining system is used to retain the shroud 674 for rotation relative to the fastener body 654 such that the shroud will rotate under an applied torque prior to the fastener 652 rotating when it is installed at its design installation torque. The shroud retaining system includes a second annular shoulder 688 formed at the first body end 656 of the fastener body 654. As best shown in FIG. 39, the outer diameter of the second annular shoulder 688 is less than the diameter of the shroud 674 at its inner surface 680 so that the shroud can be mounted on the fastener body 654 from an initial unmounted position, as shown in FIG. 37, to a mounted position on the fastener body 654, as shown in FIGS. 38 and 39. As shown in FIGS. 40 and 41, in order to permanently retain the shroud 674 in its mounted position, the end portion 690 of the shroud 674 that is adjacent to the shroud's first annular end face 676 is swaged around its circumference so that at least a portion of the first annular end face opposes at least a portion of the fastener body's second annular shoulder 688. The second annular shoulder 688 thus provides a swaging region of the fastener body 654 that will prevent removal of the shroud 674 when the latter is deformed via swaging into this region.

Figure 43:
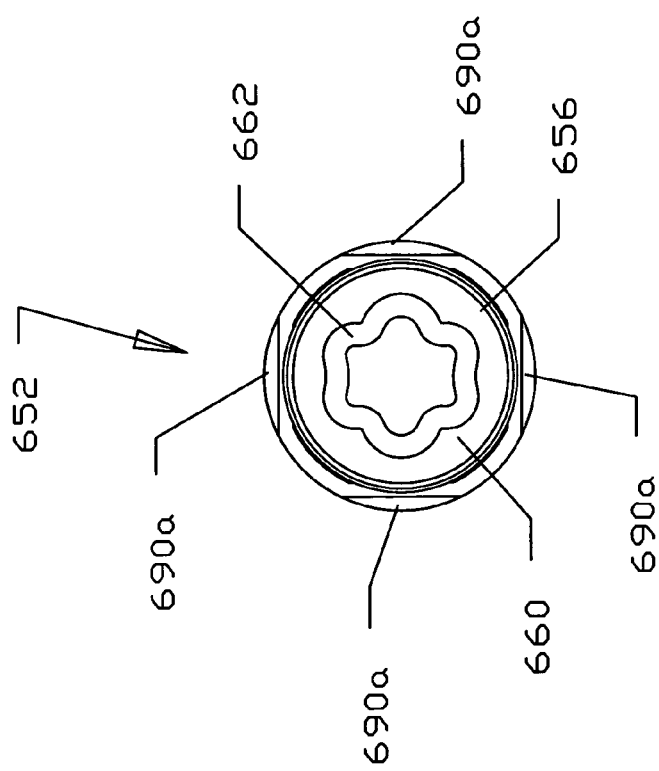
FIG. 43 is an end view of the fastener as shown in FIG. 42.
Figure 42:
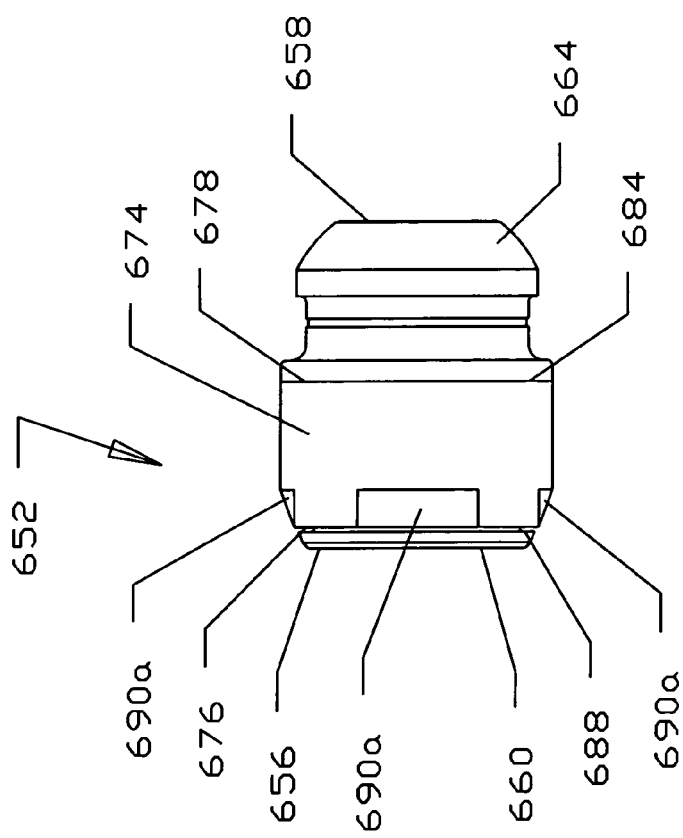
FIG. 42 is a side view of the fastener of FIG. 37 following discrete circumferential swaging of the fastener's shroud.
Figure 45:
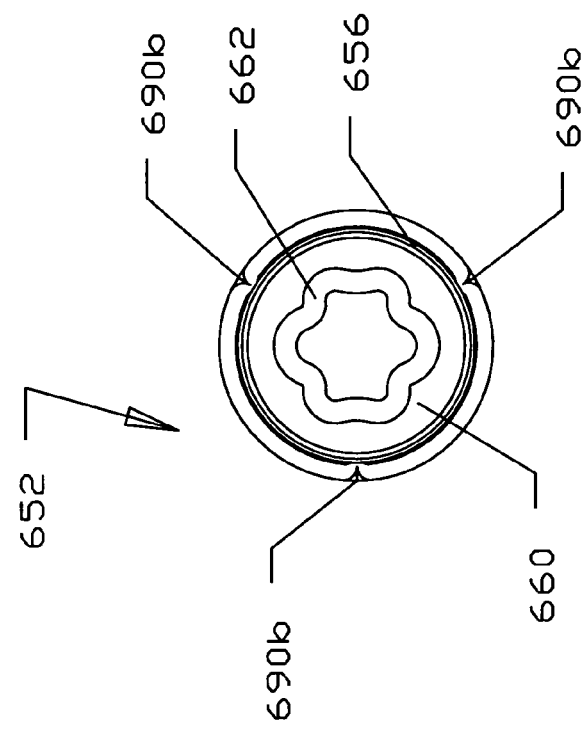
FIG. 45 is an end view of the fastener as shown in FIG. 44.
Figure 44:
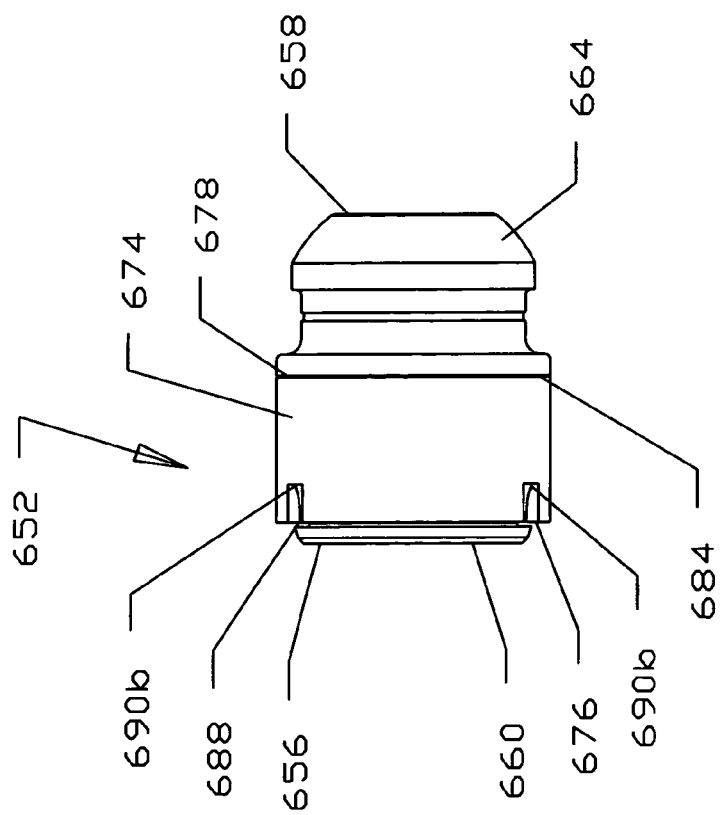
FIG. 44 is a side view of the fastener of FIG. 37 following discrete circumferential swaging/staking of the fastener's shroud.

It will be appreciated that continuous circumferential swaging is only one of several ways to secure the shroud 674 on the fastener body 654. As shown in FIGS. 42 and 43, partial swaging may be used to deform the shroud 674 at discrete locations 690a into the swaging region provided by fastener body's second annular shoulder 688. Alternatively, instead of the relatively wide swaging areas 690a shown in FIGS. 42 and 43, the size of each swaging area could be diminished in the manner shown in FIGS. 44 and 45, so as to effectively become point deformations 690b. Note that the swaging process at this point has now essentially become a staking process. The fastener body's second annular shoulder 688 may correspondingly be thought of as providing a staking region in accordance with the design principles described above in connection with FIGS. 17-24.

Figure 47:
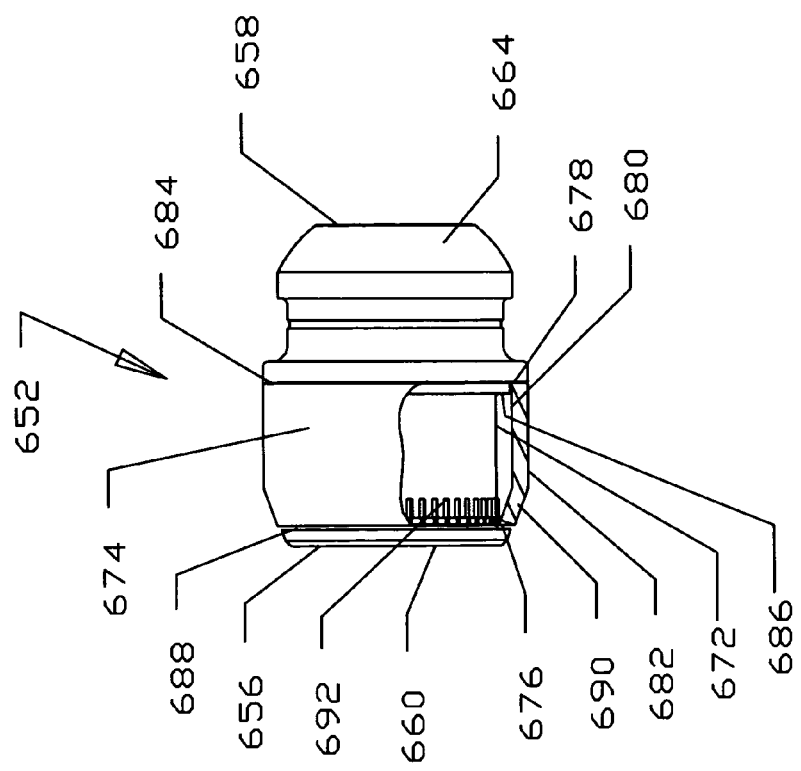
FIG. 47 is a partial sectional view of the fastener as shown in FIG. 46 following swaging of the fastener's shroud.
Figure 46:
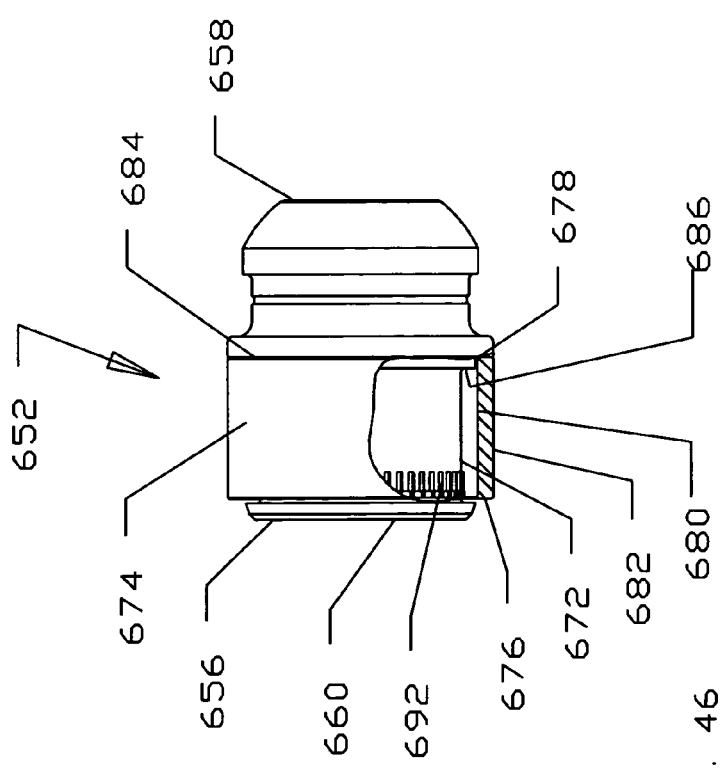
FIG. 46 is a partial sectional view of the fastener of FIG. 37 prior to swaging of the fastener's shroud and showing shroud retaining texturing.

FIGS. 46 and 47 illustrate a further alternative configuration in which the shroud 674 is gripped by a shroud securement structure 692 according to the design principles described above in connection with FIGS. 1-10. The shroud securement structure 692 is generally ring-shaped and has a textured radial outer surface, formed by knurling or the like, to facilitate gripping of the shroud's inner side wall 680 by way of an interference fit generated as a result of the swaging or staking process. The shroud securement structure 692 will prevent the shroud 674 from free-spinning on the fastener body 654, but will yield under the application of the fastener's design installation torque, thereby preventing rotation of the fastener 652 by unauthorized means.

Figures 48, 49:
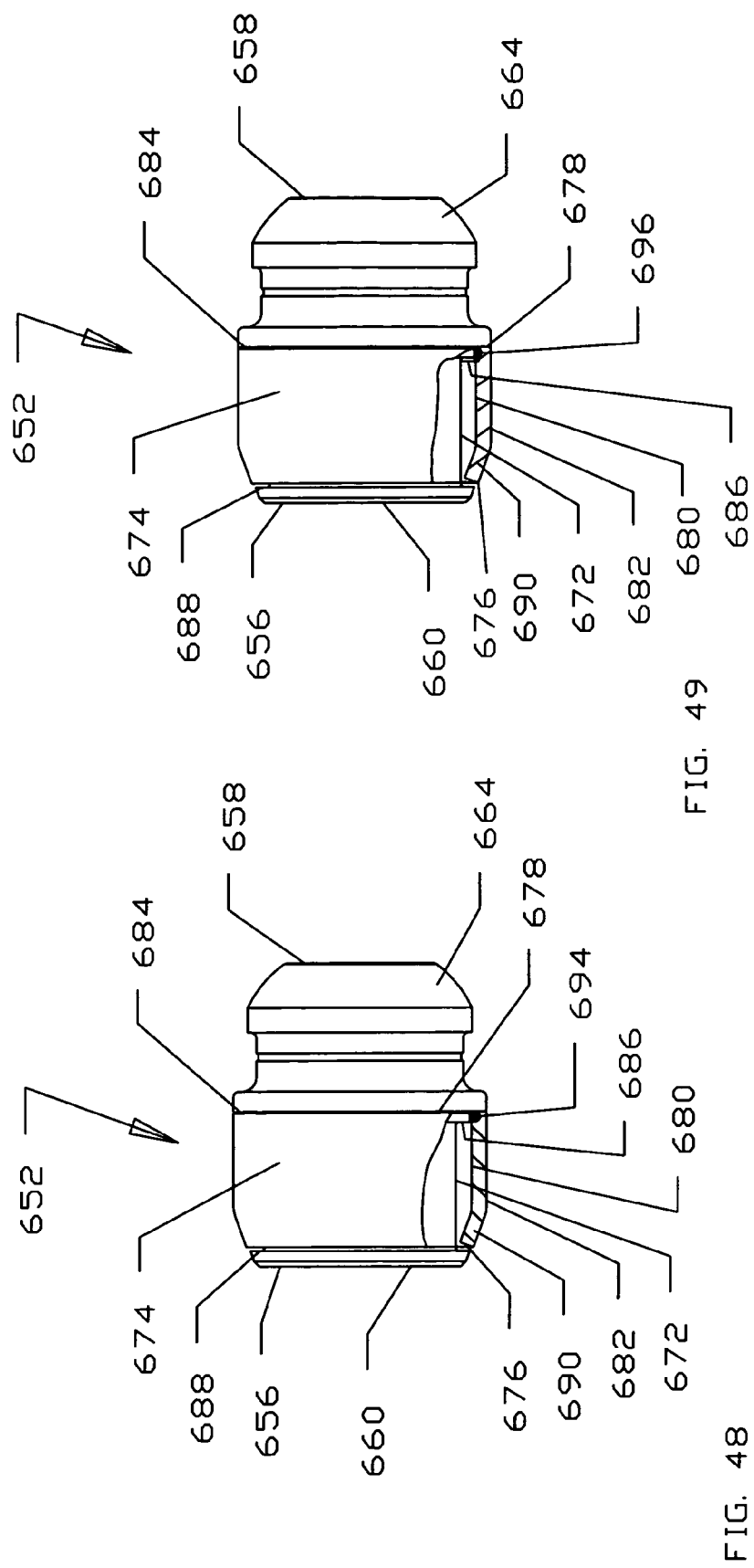
FIG. 48 is a partial sectional view of the fastener of FIG. 37 following swaging of the fastener's shroud and further illustrating a resilient ring anti-rotation device.
FIG. 49 is a partial sectional view of the fastener of FIG. 37 following swaging of the fastener's shroud and further illustrating an adhesive coating anti-rotation device.

FIGS. 48 and 49 illustrate two alternative anti-rotation devices to prevent the shroud 674 from free-spinning while still allowing the shroud to rotate when unauthorized fastener removal is attempted. In FIG. 48, the anti-rotation device is provided by a resilient "O" ring member 694 situated on the cylindrical shoulder 686. If the diameter of the cylindrical shoulder 686 is selected so that the shoulder is spaced from the shroud's inner surface 680 by an amount less than the diameter of the "O" ring 694, the latter will be compressed. This compressive force will act to resist shroud rotation when minimal torque is applied, but will not prevent the shroud from rotating when it is manipulated at the fastener's design installation torque. In FIG. 49, an anti-rotation device is formed by a coating of adhesive 696 on the cylindrical shoulder 686 to form a bond with the shroud's inner surface 680. By using a relatively weak adhesive material, the resultant adhesive bond will break under application of the fastener's design installation torque, thereby providing the desired security function.

Advantageously, it will be seen that the fastener 652 requires only two components, the fastener body 654 and the shroud 674, to provide a fully functional high security fastener construction. The "O" ring 694 or the adhesive 696 can be optionally added. It will additionally be seen that the shroud 674 can be formed as a simple tubular structure that requires no additional configuration features to facilitate its mounting on the fastener body 672.

B. Open-End Locking Wheel Nut

Turning now to FIGS. 50-59, a modification of the sixth exemplary fastener construction is shown in which a fastener 702 is configured as an open-end locking wheel nut. Apart from the fact that the fastener 702 is an open end design, and except for the manner in which its shroud is retained thereon (see below), it is similar in all respects to the fastener 652 of FIGS. 37-49. The fastener 702 thus includes a fastener body 704 having a first body end 706 and a second body end 708. The first body end 706 has a stepped opening 710 in which is formed a continuous curvilinear key receiving pattern 712. The second body end 708 of the fastener 702 is formed with a mounting seat 714 having a generally frustoconical outer surface 716 (other shapes could also be used). An internal bore 718 is formed within the fastener 702 along its axial centerline. The bore 718 extends from the second body end 708 toward the first body end 706. An internal thread pattern 720 is formed on the wall of the bore 718. The thread pattern 720 begins at the second body end 708 and extends for part (or all) of the length of the bore 718.

A shroud receiving portion 722 of the fastener body 704 is situated between the first body end 706 and the second body end 708. More specifically, the shroud receiving portion 722 extends from a location proximate the first body end 706 to medial portion of the fastener body 704. The shroud receiving portion 722 is designed to receive an anti-theft shroud 724 so that the shroud is concentrically mounted on the fastener body 704. The shroud 724 has first and second annular end faces 726 and 728, and inner and outer sidewalls 730 and 732. The first annular end face 726 is located proximate the first body end 706 so that very little of the first body end is exposed to tampering. The first annular end face 726 lies in facing (and preferably contacting) engagement with a first annular shoulder 734 formed at the first body end 706. The shroud's inner sidewall 730 is concentrically supported on the cylindrical shoulder 736 extending from the first annular shoulder 734. If radial stabilization of the shroud is desired, the diameter of the cylindrical shoulder 736 should be only slightly smaller than the diameter of the shroud 724 at its inner surface 730.

Figure 50:
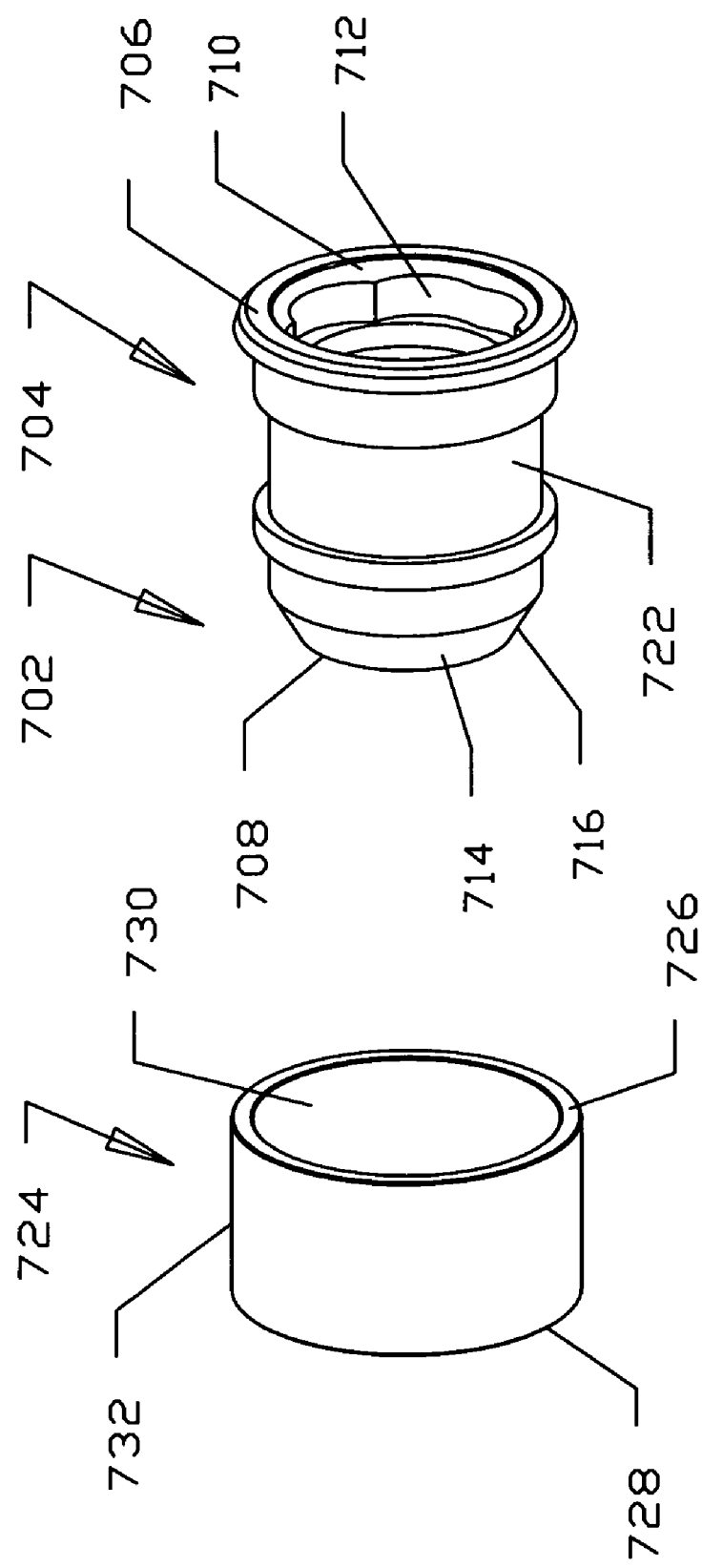
FIG. 50 is an exploded perspective view of a fastener according to a modification of the sixth high security fastener construction of FIG. 37.
Figures 51, 52:
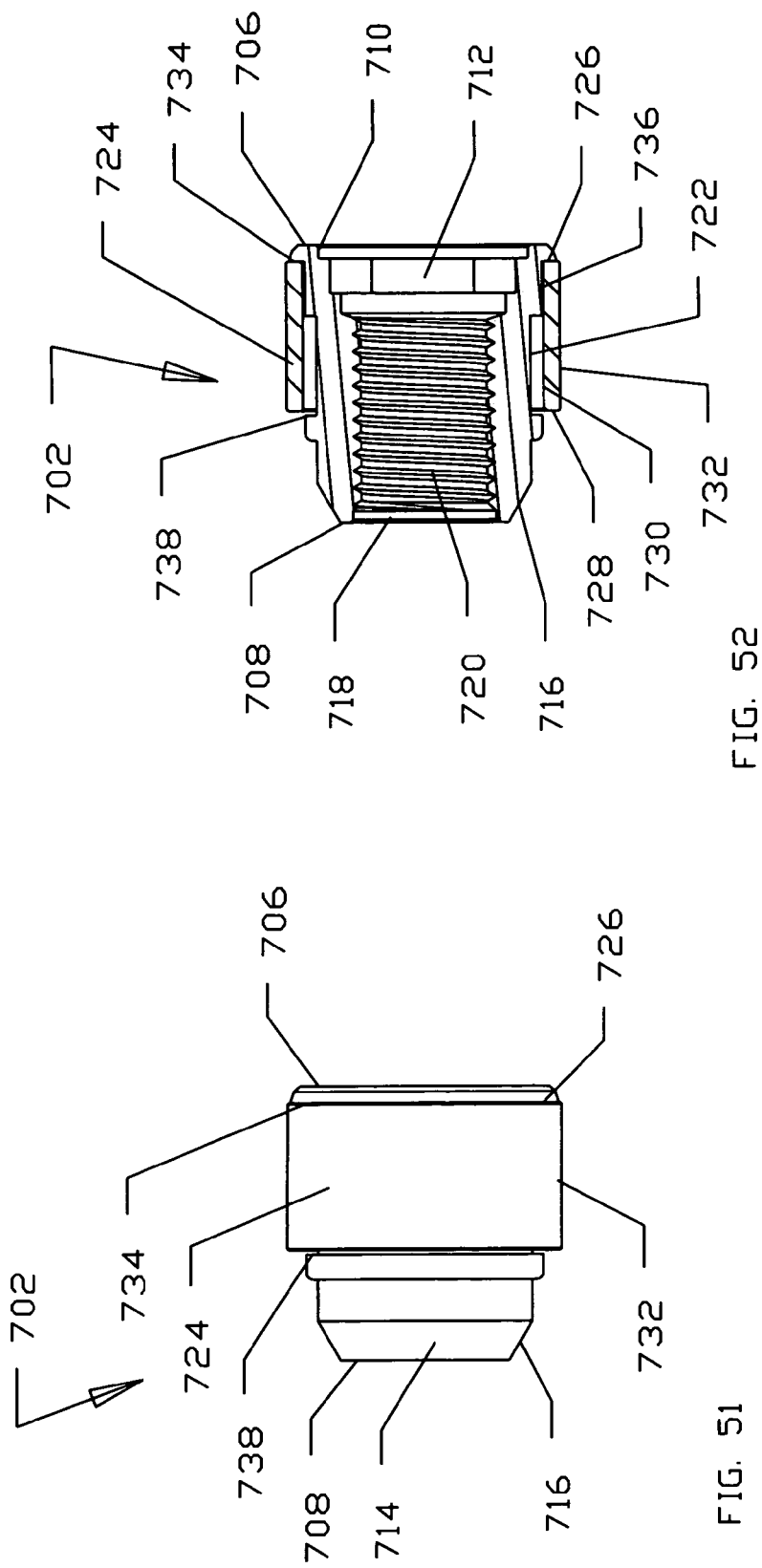
FIG. 51 is a side view of the fastener of FIG. 50 prior to swaging of the fastener's shroud.
FIG. 52 is a longitudinal cross-sectional view taken along the centerline of the fastener of FIG. 51.
Figure 55:
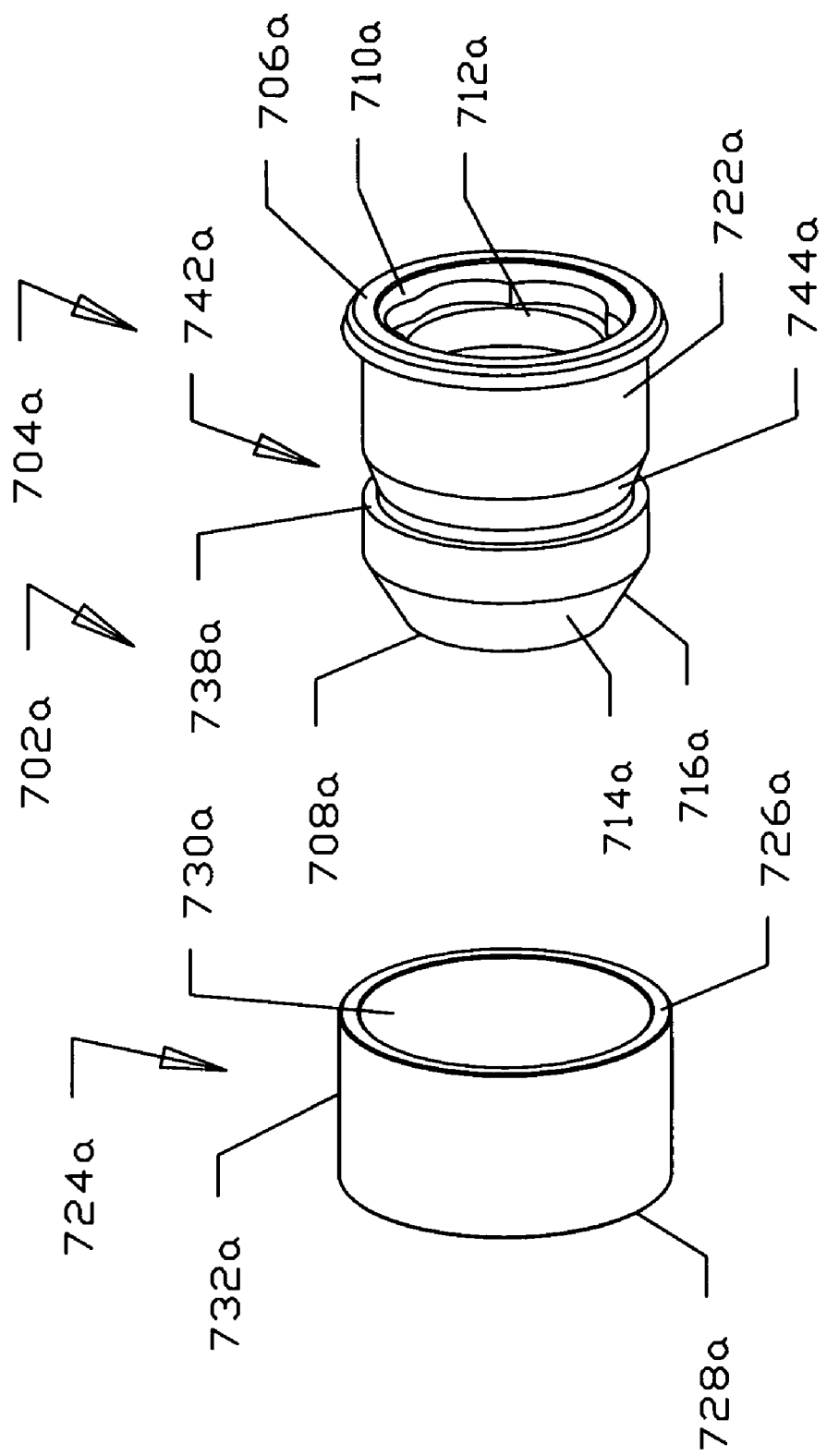
FIG. 55 is an exploded perspective view of a fastener according to a modification of the fastener of FIG. 50.

A shroud retaining system is used to retain the shroud 724 for rotation relative to the fastener body 704 such that the shroud will rotate under an applied torque prior to the fastener 702 rotating when it is installed at the design installation torque. The shroud retaining system includes a second annular shoulder 738 formed at a medial portion of the fastener body 704. As best shown in FIG. 52, the outer diameter of the second annular shoulder 738 is less than the diameter of the shroud 724 at its inner surface 730 so that the shroud can be mounted on the fastener body 704 from an initial unmounted position, as shown in FIG. 50, to a mounted position on the fastener body 704, as shown in FIGS. 51 and 52. In order to permanently retain the shroud 704 in its mounted position, the end portion 740 of the shroud 724 that is adjacent to the shroud's second annular end face 728 is swaged around its circumference so that at least a portion of the second annular end face opposes at least a portion of the fastener body's second annular shoulder 738. The second annular shoulder 738 thus provides a swaging region of the fastener body 704 that will prevent removal of the shroud 724 when the latter is deformed via swaging into this region.

As in the case of the fastener 652 described above, discrete swaging may be used in lieu of continuous circumferential swaging to deform the shroud 724. An "O" ring or adhesive may also be used to restrain shroud rotation.

Figure 59:
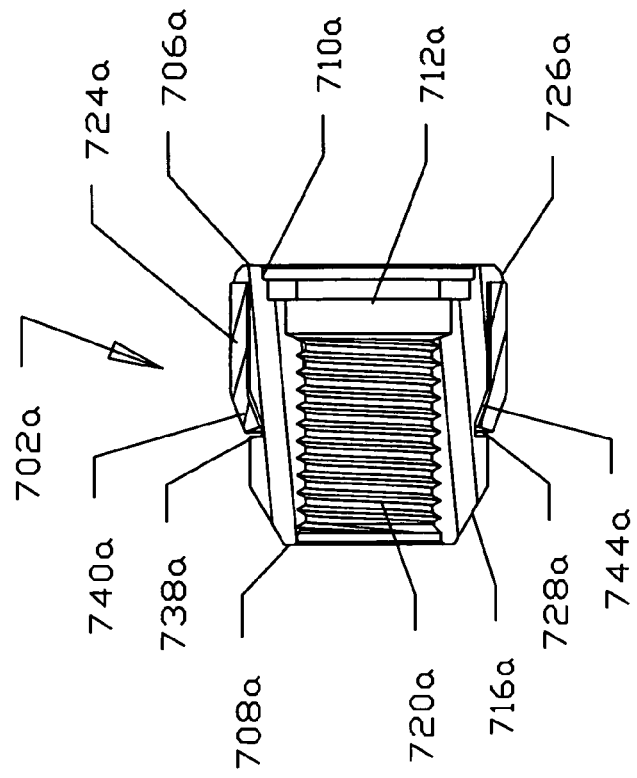
FIG. 59 is a longitudinal cross-sectional view taken along the centerline of the fastener as shown in FIG. 58.
Figure 58:
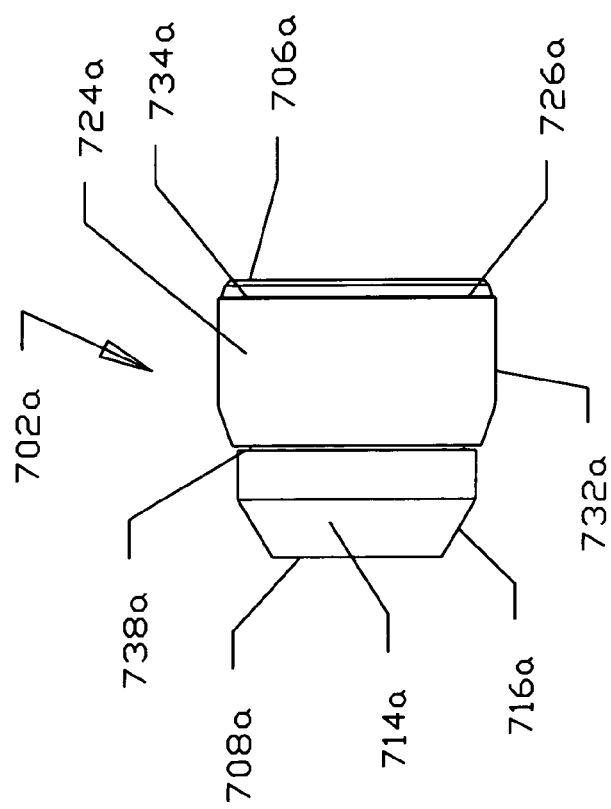
FIG. 58 is a side view of the fastener of FIG. 55 following continuous circumferential swaging of the fastener's shroud.

FIGS. 55-59 illustrate a modified fastener 702a that is identical in all respects to the fastener 702, as shown by the use of corresponding reference numerals, except that a modified swaging region is provided on the fastener body 704a. In particular, the second annular shoulder 738a is not provided by a raised radial flange, as shown in FIGS. 50-54, but is instead provided by forming a trench 742a in the fastener's shroud receiving portion 722a. One side of the trench 742a provides the second annular shoulder 738a. The other side of the trench 742a is formed with a tapered side wall 744a. As shown in FIG. 59, the tapered wall 744a accommodates the shroud's end portion 740a when it is swaged into its deformed position.

C. Locking Wheel Bolt

Turning now to FIGS. 60-64, another modification of the sixth exemplary fastener construction is shown in which a fastener 752 is configured as a locking wheel bolt. Apart from the fact that the fastener 752 has an externally threaded shank instead of an internally threaded bore, and except for the manner in which its shroud is retained thereon (see below), it is similar in all respects to the fastener 652 of FIGS. 37-49. The fastener 752 thus includes a fastener body 754 having a first body end 756 and a second body end 758. The first body end 756 has a generally planar surface 760 in which is formed a continuous curvilinear key receiving pattern 762. A mounting seat portion 764 of the fastener body 754 has a generally frustoconical outer surface 766 (other shapes could also be used). A bolt shank 768 extends from the mounting seat 764 to the second body end 758. An external thread pattern 770 is formed on the surface of the shank 768. The thread pattern 770 begins at the second body end 758 and extends for part (or all) of the length of the shank 768.

A shroud receiving portion 772 of the fastener body 754 is situated between the first body end 756 and the second body end 758. More specifically, the shroud receiving portion 772 extends from a location proximate the first body end 756 to a medial portion of the fastener body 754. The shroud receiving portion 772 is designed to receive an anti-theft shroud 774 so that the shroud is concentrically mounted on the fastener body 754. The shroud 774 has first and second annular end faces 776 and 778, and inner and outer sidewalls 780 and 782. The first annular end face 776 is located proximate the first body end 756 so that very little of the body end is exposed to tampering. The second annular end face 778 is disposed at a medial location on the fastener body 754.

Figure 60:
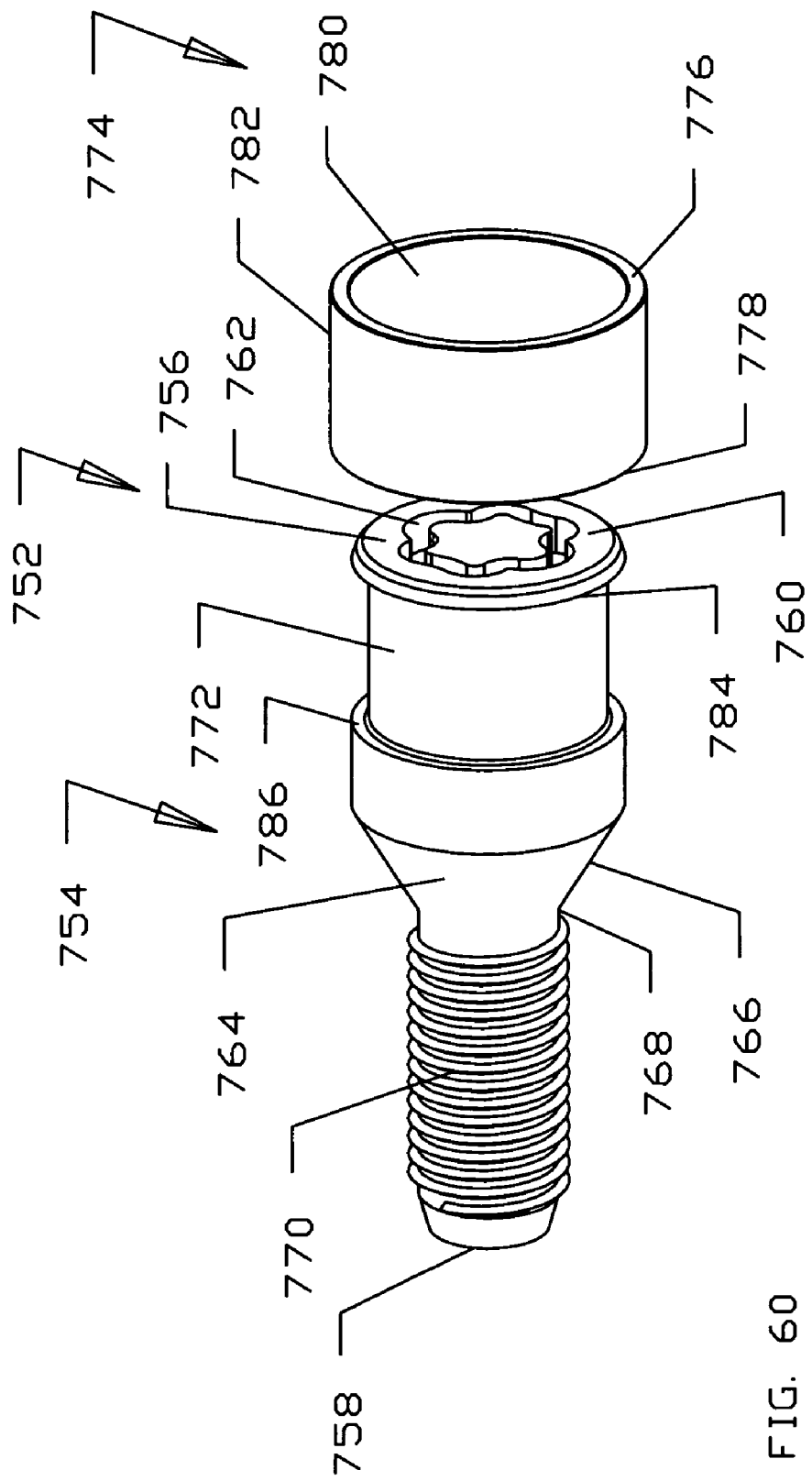
FIG. 60 is an exploded perspective view of a fastener according to another modification of the sixth high security fastener construction of FIG. 37.

A shroud retaining system is used to retain the shroud 774 for rotation relative to the fastener body 754 such that the shroud will rotate under an applied torque prior to the fastener 752 rotating when it is installed at the design installation torque. The shroud retaining system includes a first annular shoulder 784 formed at the first body end 756 of the fastener body 754 and a second annular shoulder 786 formed at a medial portion of the fastener body. As best shown in FIG. 62, the outer diameter of the first and second annular shoulders 784 and 786 is less than the diameter of the shroud 774 at its inner surface 780 so that the shroud can be mounted on the fastener body 754 from an initial unmounted position, as shown in FIG. 60, to a mounted position on the fastener body 754, as shown in FIGS. 61 and 62. In order to permanently retain the shroud 774 in its mounted position, the end portions 788 and 790 of the shroud 774 that are respectively adjacent to the shroud's first and second annular end faces 776 and 778 are swaged around their circumference so that at least a portion of the first and second annular end faces respectively oppose at least a portion of the fastener body's first and second annular shoulders 784 and 786. The first and second annular shoulders 784 and 786 thus provide a pair of swaging regions of the fastener body 754 that will prevent removal of the shroud 774 when the latter is deformed via swaging into these regions. Note that the swaging regions could also be provided by a pair of grooves in lieu of the first and second annular shoulders 784 and 786, as described above with reference to the fastener 702a.

As in the case of the fastener 652 described above, discrete swaging may be used in lieu of continuous circumferential swaging to deform the shroud 774. An "O" ring or adhesive may also be used to restrain shroud rotation.

Accordingly, a series of high security fasteners for vehicular use have been described. The disclosed constructions include (1) fasteners in which the shroud is retained by interference engagement of its inner side with the fastener body, (2) fasteners in which the shroud is retained by staking or swaging to the fastener body, and (3) fasteners in which the shroud is retained by retaining members that are mounted on the fastener body in facing relationship with the shroud's end faces. In each of the foregoing fastener constructions, the shroud can be formed as a substantially tubular member in order to simplify the construction and reduce manufacturing costs. Relatedly, the invention additionally contemplates a high security fastener construction in which an annular anti-theft shroud is retained on the fastener body in a manner that does not require the shroud to be anything more than a tube. On the other hand, the use of non-tubular shrouds is not precluded, and other shroud designs may be used.

Thus, while various embodiments have been disclosed, many other variations would also be possible within the scope of the invention. It is understood, therefore, that the invention is not to be in any way limited except in accordance with the spirit of the appended claims and their equivalents.

What is claimed is:

1. A high security fastener, comprising:
   a fastener body;
   a first body end on said fastener body;
   a key receiving pattern at said first body end;
   a second body end on said fastener body;
   a thread pattern extending from said second body end;
   a mounting seat on said body having a surface positioned to face and engage a mating surface formed in an external structure to be fastened by said fastener;
   a shroud receiving body portion on said fastener body between said first body end and said mounting seat;
   a shroud concentrically mounted on said shroud receiving portion;
   said shroud having a first shroud end terminating substantially at said first body end and a second shroud end terminating between said first body end and said mounting seat;
   a first shoulder on said shroud receiving portion adapted to retain said shroud against movement toward said first body end;
   a second shoulder on said shroud receiving portion adapted to retain said shroud against movement toward said second body end;
   said first and second shoulders facing each other;
   at least one of said shoulders being a reduced shoulder that is sized to allow said shroud to slide over said reduced shoulder when said shroud is in an undeformed condition;
   said shroud extending from said first shoulder to said second shoulder and at least one of said shoulders facing an end face of said shroud;
   a region provided by said reduced shoulder to facilitate deformation of said shroud and retention thereof on said fastener body; and
   said shroud being deformed at said region so that said shroud is captured by said reduced shoulder to retain said shroud in rotatable relationship with said shroud receiving portion such that said shroud will rotate relative to said fastener body under an applied external torque prior to said fastener rotating when said fastener is engaged with an external structure at a design installation torque.

2. A fastener in accordance with claim 1 wherein said fastener is implemented as a two-piece design consisting of said fastener body and said shroud.

3. A fastener in accordance with claim 1 wherein said shroud is a substantially tubular structure.

4. A fastener in accordance with claim 1 wherein said region is disposed at a single location on said shroud receiving portion.

5. A fastener in accordance with claim 1 wherein said region is disposed at a pair of locations on said shroud receiving portion.

6. A fastener in accordance with claim 1 wherein said region is provided by a groove in said shroud receiving portion.

7. A fastener in accordance with claim 6 wherein one side of said groove is tapered.

8. A fastener in accordance with claim 1 wherein said reduced shoulder comprises an annular shoulder.

9. A fastener in accordance with claim 8 wherein said annular shoulder has a diameter that is less than a diameter of an inner surface of said shroud in order to facilitate mounting of said shroud on said shroud receiving portion.

10. A fastener in accordance with claim 1 wherein said region is proximate to said first body end of said fastener.

11. A fastener in accordance with claim 1 wherein said region is proximate to a medial portion of said fastener.

12. A fastener in accordance with claim 1 wherein said region is proximate to a seat portion of said fastener.

13. A fastener in accordance with claim 1 wherein said region is a staking region and said shroud is staked at plural locations around a circumferential portion of said shroud in said region.

14. A fastener in accordance with claim 1 wherein said region is a swaging region and said shroud is swaged at plural locations around a circumferential portion of said shroud in said region.

15. A fastener in accordance with claim 1 wherein said region is a swaging region and said shroud is continuously swaged around a circumferential portion of said shroud in said region.

16. A fastener in accordance with claim 1 wherein said region is a swaging region provided at a pair of locations on said shroud receiving portion, and said shroud is swaged at both ends thereof at said locations.

17. A fastener in accordance with claim 1 wherein said shroud receiving portion is configured to resist rotation of said shroud.

18. A fastener in accordance with claim 17 wherein said shroud receiving portion is textured to resist rotation of said shroud.

19. A fastener in accordance with claim 1 wherein an anti-rotation device is disposed between said fastener receiving portion and said shroud in order to resist rotation of said shroud.

20. A fastener in accordance with claim 19 wherein said anti-rotation device is a resilient member.

21. A fastener in accordance with claim 19 wherein said anti-rotation device is an adhesive coating.

22. A fastener in accordance with claim 1 wherein said fastener is a closed-end locking wheel nut.

23. A fastener in accordance with claim 1 wherein said fastener is an open-end locking wheel nut.

24. A fastener in accordance with claim 1 wherein said fastener is a locking wheel bolt.

25. A high security fastener, comprising:
a fastener body;
a first body end on said fastener body;
a key receiving pattern at said first body end;
a second body end on said fastener body;
a thread pattern extending from said second body end;
a mounting seat on said body having a surface positioned to face and engage a mating surface formed in an external structure to be fastened by said fastener;
a shroud receiving body portion on said fastener body between said first body end and said mounting seat;
a shroud concentrically mounted on said shroud receiving portion;
said shroud having a first shroud end terminating substantially at said first body end and a second shroud end terminating between said first body end and said mounting seat;
a first shoulder on said shroud receiving portion adapted to retain said shroud against movement toward said first body end;
a second shoulder on said shroud receiving portion adapted to retain said shroud against movement toward said second body end;
said first and second shoulders facing each other;
at least one of said shoulders being a reduced shoulder that is sized to allow said shroud to slide over said reduced shoulder when said shroud is in an undeformed condition;
said shroud extending from said first shoulder to said second shoulder and at least one of said shoulders facing an end face of said shroud;
a staking region provided by said reduced shoulder to facilitate staking of said shroud and retention thereof on said fastener body; and
said shroud being staked at said staking region so that said shroud is captured by said reduced shoulder to retain said shroud in axially secured rotatable relationship with said shroud receiving portion such that said shroud will rotate relative to said fastener body under an applied external torque prior to said fastener rotating when said fastener is engaged with an external structure at a design installation torque.

26. A fastener in accordance with claim 25 wherein said staking region comprises an annular groove formed in said shroud receiving portion.

27. A high security fastener, comprising:
a fastener body;
a first body end on said fastener body;
a key receiving pattern at said first body end;
a second body end on said fastener body;
a thread pattern extending from said second body end;
a mounting seat on said body having a surface positioned to face and engage a mating surface formed in an external structure to be fastened by said fastener;
a shroud receiving body portion on said fastener body between said first body end and said mounting seat;
a shroud concentrically mounted on said shroud receiving portion;
said shroud having a first shroud end terminating substantially at said first body end and a second shroud end terminating between said first body end and said mounting seat;
a first shoulder on said shroud receiving portion adapted to retain said shroud against movement toward said first body end;
a second shoulder on said shroud receiving portion adapted to retain said shroud against movement toward said second body end;
said first and second shoulders facing each other;
at least one of said shoulders being a reduced shoulder that is sized to allow said shroud to slide over said reduced shoulder when said shroud is in an undeformed condition;
said shroud extending from said first shoulder to said second shoulder and at least one of said shoulders facing an end face of said shroud;
a swaging region provided by said reduced shoulder to facilitate swaging of said shroud and retention thereof on said fastener body; and
said shroud being swaged at said swaging region so that said shroud is captured by said reduced shoulder to retain said shroud in axially secured rotatable relationship with said shroud receiving portion such that said shroud will rotate relative to said fastener body under an applied external torque prior to said fastener rotating when said fastener is engaged with an external structure at a design installation torque.

28. A fastener in accordance with claim 27 wherein said swaging region further comprises a groove having a tapered side wall formed in said shroud receiving portion.

29. A fastener in accordance with claim 27 wherein said reduced shoulder comprises an annular shoulder formed on said shroud receiving portion.

30. A high security fastener, comprising:
- a fastener body;
- a first body end on said fastener body;
- a key receiving pattern at said first body end;
- a second body end on said fastener body;
- a thread pattern extending from said second body end;
- a mounting seat on said body having a surface positioned to face and engage a mating surface formed in an external structure to be fastened by said fastener;
- a shroud receiving body portion on said fastener body between said first body end and said mounting seat;
- a substantially tubular shroud concentrically mounted on said shroud receiving portion, said shroud having a first end face and a second end face;
- said shroud having a first shroud end terminating substantially at said first body end and a second shroud end terminating between said first body end and said mounting seat;
- a first shoulder on said shroud receiving portion adapted to retain said shroud against movement toward said first body end;
- a second shoulder on said shroud receiving portion adapted to retain said shroud against movement toward said second body end;
- said first and second shoulders facing each other;
- at least one of said shoulders being a reduced shoulder that is sized to allow said shroud to slide over said reduced shoulder when said shroud is in an undeformed condition;
- said shroud extending from said first shoulder to said second shoulder and at least one of said shoulders facing an end face of said shroud; and
- said shroud being deformed so that said shroud is captured by said reduced shoulder to retain said shroud in rotatable relationship with said shroud receiving portion such that said shroud will rotate relative to said fastener body under an applied external torque prior to said fastener rotating when said fastener is engaged with an external structure at a design installation torque.

* * * * *